US012683742B2

(12) United States Patent
Abdelghaffar et al.

(10) Patent No.: US 12,683,742 B2
(45) Date of Patent: Jul. 14, 2026

(54) UPLINK TRANSMISSION REPETITION FOR FULL-DUPLEX AND NON FULL-DUPLEX SETS OF SYMBOLS

(71) Applicant: QUALCOMM Incorporated, San Diego, CA (US)

(72) Inventors: Muhammad Sayed Khairy Abdelghaffar, San Jose, CA (US); Mostafa Khoshnevisan, San Diego, CA (US); Abdelrahman Mohamed Ahmed Mohamed Ibrahim, San Diego, CA (US); Gokul Sridharan, Sunnyvale, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 483 days.

(21) Appl. No.: 18/321,559

(22) Filed: May 22, 2023

(65) Prior Publication Data

US 2024/0396687 A1 Nov. 28, 2024

(51) Int. Cl.
*H04W 72/23* (2023.01)
*H04L 5/00* (2006.01)
(Continued)

(52) U.S. Cl.
CPC .............. *H04L 5/0051* (2013.01); *H04L 5/14* (2013.01); *H04W 72/23* (2023.01); *H04W 76/20* (2018.02)

(58) Field of Classification Search
CPC . H04L 5/0051; H04L 5/14; H04L 1/08; H04L 5/0092; H04L 5/1469; H04W 72/23; H04W 76/20
See application file for complete search history.

(56) References Cited

U.S. PATENT DOCUMENTS

2024/0107541 A1* 3/2024 Mahama ............... H04L 5/0051

FOREIGN PATENT DOCUMENTS

| CN | 118785459 A | * 10/2024 | ........... H04L 5/0053 |
| JP | WO2022130639 A5 | * 6/2024 | |
| WO | WO-2024208299 A1 | * 10/2024 | ........... H04L 5/0053 |

OTHER PUBLICATIONS

Qualcomm Incorporated: "Feasibility and techniques for subband non-overlapping full duplex",3GPP Draft; R1-2305335, [retrieved on May 14, 2023].*

(Continued)

*Primary Examiner* — Sujoy K Kundu
*Assistant Examiner* — Samuel Dilan Rutnam
(74) *Attorney, Agent, or Firm* — Harrity & Harrity, LLP\Qualcomm

(57) ABSTRACT

Various aspects of the present disclosure generally relate to wireless communication. In some aspects, a user equipment (UE) may receive configuration information that configures one or more sounding reference signal (SRS) resource sets that includes one or more SRS resources associated with a full duplex (FD) set of symbols and one or more SRS resources associated with a non-FD set of symbols. The UE may receive at least one of a radio resource control communication or a downlink control information communication indicating at least one of the one or more SRS resources that are to be used for an uplink transmission repetition. The UE may transmit the uplink transmission repetition in one of: only the FD set of symbols, only the non-FD set of symbols, or both the FD set of symbols and the non-FD set of symbols. Numerous other aspects are described.

30 Claims, 20 Drawing Sheets

(51) Int. Cl.
    *H04L 5/14*         (2006.01)
    *H04W 76/20*     (2018.01)

(56)                References Cited

OTHER PUBLICATIONS

ZTE: "Discussion of subband non-overlapping full duplex", 3GPP Draft; R1-2304596, [retrieved on May 15, 2023].*

International Search Report and Written Opinion—PCT/US2024/023839—ISA/EPO—Sep. 16, 2024.

Qualcomm Incorporated: "Feasibility and Techniques for Subband Non-overlapping Full Duplex", 3GPP TSG RAN WG1, Meeting #113, R1-2305335, 3rd Generation Partnership Project, Mobile Competence Centre, 650, Route Des Lucioles, F-06921 Sophia-Antipolis Cedex, France, vol. RAN WG1, No. Incheon, Korea, May 22, 2023-May 26, 2023, May 14, 2023, 68 Pages, XP052376413, section 3.2.2 and 3.2.5, pp. 32, 34.

ZTE: "Discussion of Subband Non-overlapping Full Duplex", 3GPP TSG RAN WG1 #113, R1-2304596, 3rd Generation Partnership Project, Mobile Competence Centre, 650, Route Des Lucioles, F-06921 Sophia-Antipolis Cedex, France, vol. RAN WG1, No. Incheon, Korea, May 22, 2023-May 26, 2023, May 15, 2023, 25 Pages, XP052385135, section 2.4, p. 11-p. 16.

* cited by examiner

500

First set of repetitions using a first beam/ first set of power control parameters (e.g., targeted toward first TRP)

Second set of repetitions using a second beam/second set of power control parameters (e.g., targeted toward a second TRP)

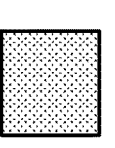

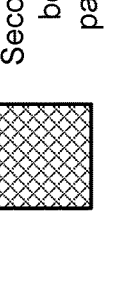

514
Associated with a second SRS resource set: Second uplink beam/set of uplink power control parameters are used 512
Associated with a first SRS resource set: First uplink beam/ set of uplink power control parameters are used 1st PUSCH Repetition

504

2nd PUSCH Repetition

506

3rd PUSCH Repetition

508

4th PUSCH Repetition

510

DCI

502

Uplink DCI schedules four PUSCH repetitions

| Codepoint | SRS resource set(s) | SRI (for both CB and NCB)/TPMI (CB only) fields |
|---|---|---|
| 00 | sTRP mode with 1st SRS resource set (TRP1) | 1st SRI/TPMI field (2nd field is unused) |
| 01 | sTRP mode with 2nd SRS resource set (TRP2) | 1st SRI/TPMI field (2nd field is unused) |
| 10 | mTRP mode with (TRP1, TRP2 order) 1st SRI/TPMI field: 1st SRS resource set 2nd SRI/TPMI field: 2nd SRS resource set | Both 1st and 2nd SRI/TPMI fields |
| 11 | mTRP mode with (TRP2, TRP1 order) 1st SRI/TPMI field: 1st SRS resource set 2nd SRI/TPMI field: 2nd SRS resource set | Both 1st and 2nd SRI/TPMI fields |

FIG. 6B

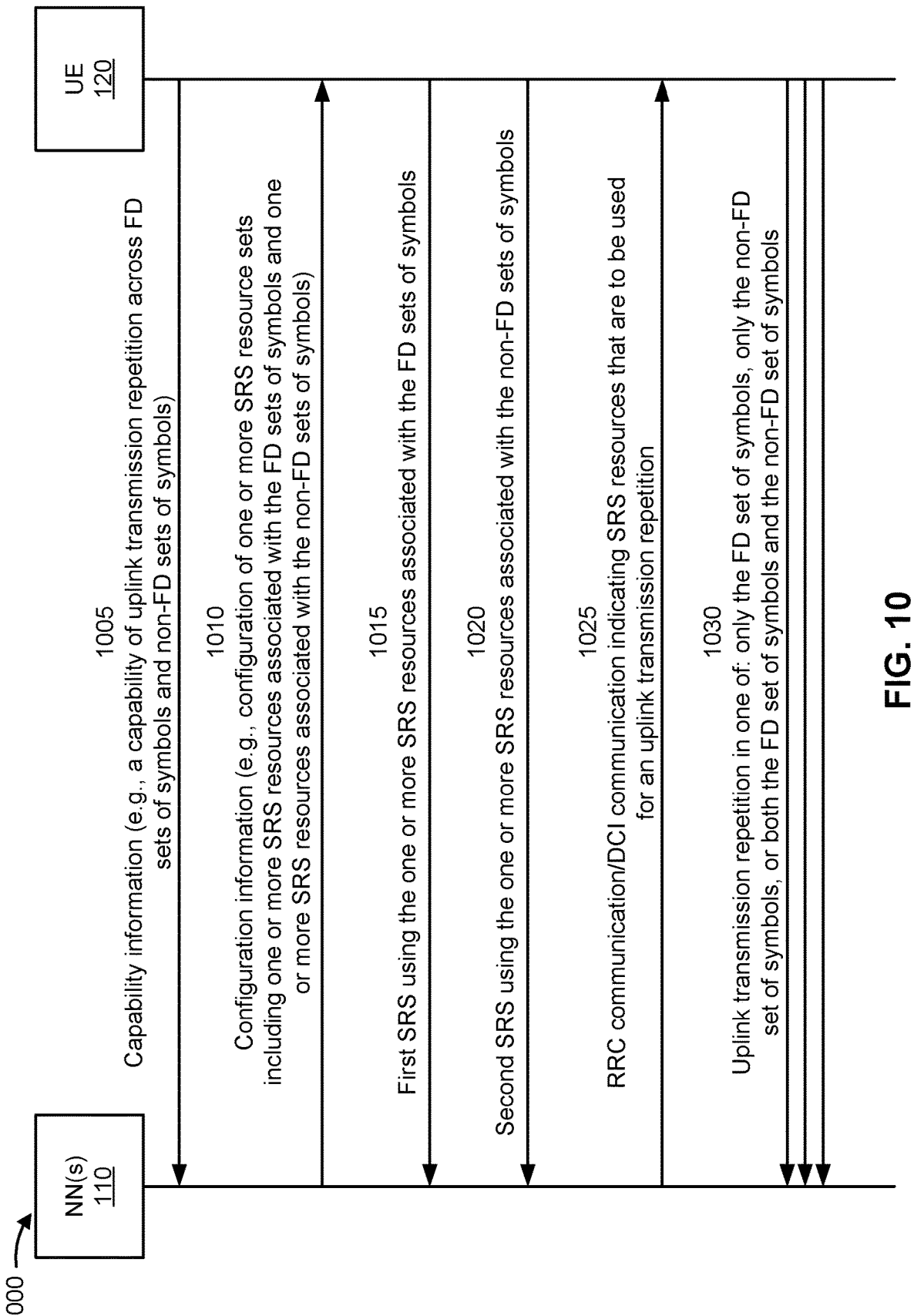

1005

Capability information (e.g., a capability of uplink transmission repetition across FD sets of symbols and non-FD sets of symbols)

1010

Configuration information (e.g., configuration of one or more SRS resource sets including one or more SRS resources associated with the FD sets of symbols and one or more SRS resources associated with the non-FD sets of symbols)

1015

First SRS using the one or more SRS resources associated with the FD sets of symbols

1020

Second SRS using the one or more SRS resources associated with the non-FD sets of symbols

1025

RRC communication/DCI communication indicating SRS resources that are to be used for an uplink transmission repetition

1030

Uplink transmission repetition in one of: only the FD set of symbols, only the non-FD set of symbols, or both the FD set of symbols and the non-FD set of symbols

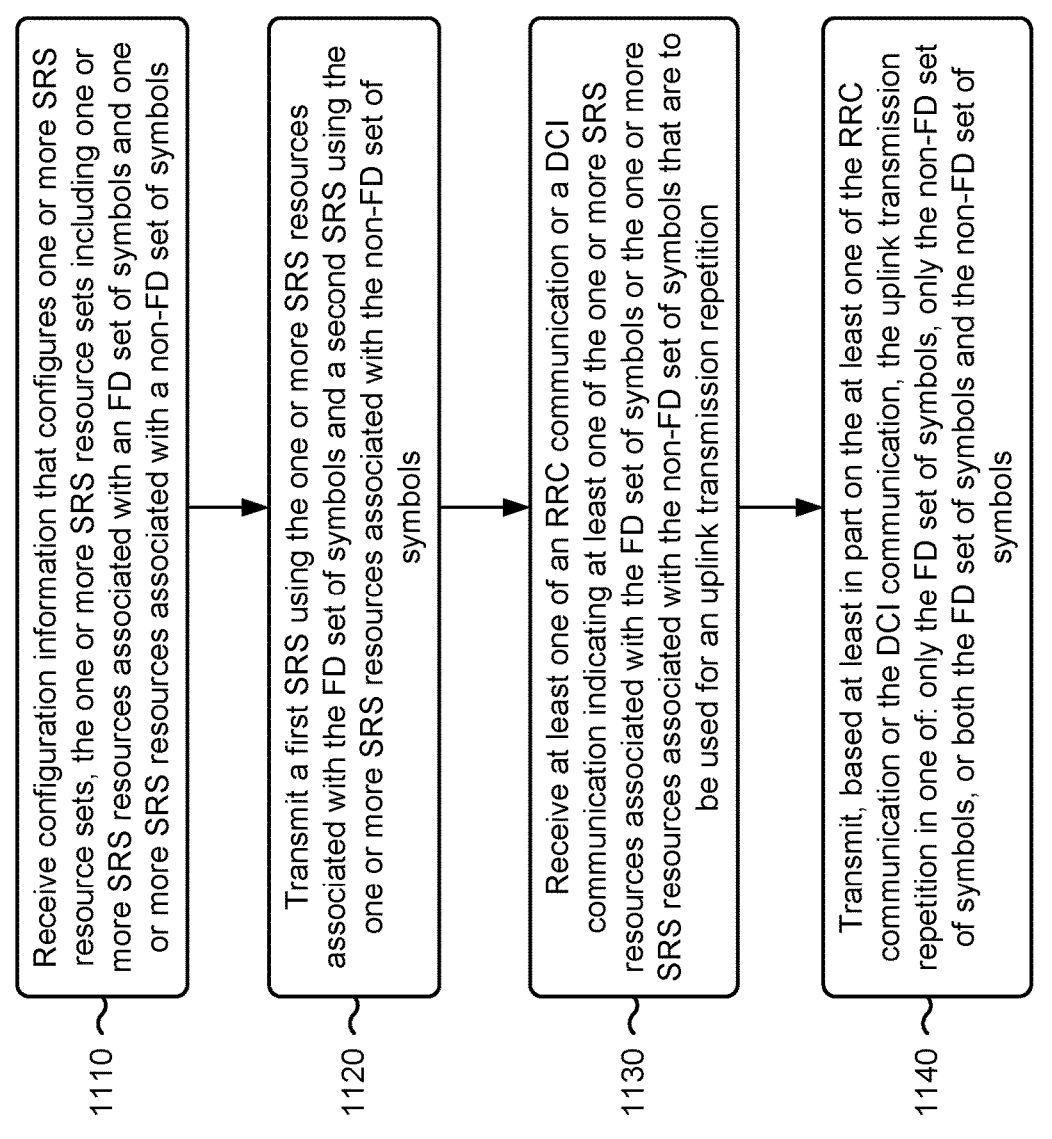

1110 — Receive configuration information that configures one or more SRS resource sets, the one or more SRS resource sets including one or more SRS resources associated with an FD set of symbols and one or more SRS resources associated with a non-FD set of symbols 1120 — Transmit a first SRS using the one or more SRS resources associated with the FD set of symbols and a second SRS using the one or more SRS resources associated with the non-FD set of symbols 1130 — Receive at least one of an RRC communication or a DCI communication indicating at least one of the one or more SRS resources associated with the FD set of symbols or the one or more SRS resources associated with the non-FD set of symbols that are to be used for an uplink transmission repetition 1140 — Transmit, based at least in part on the at least one of the RRC communication or the DCI communication, the uplink transmission repetition in one of: only the FD set of symbols, only the non-FD set of symbols, or both the FD set of symbols and the non-FD set of symbols

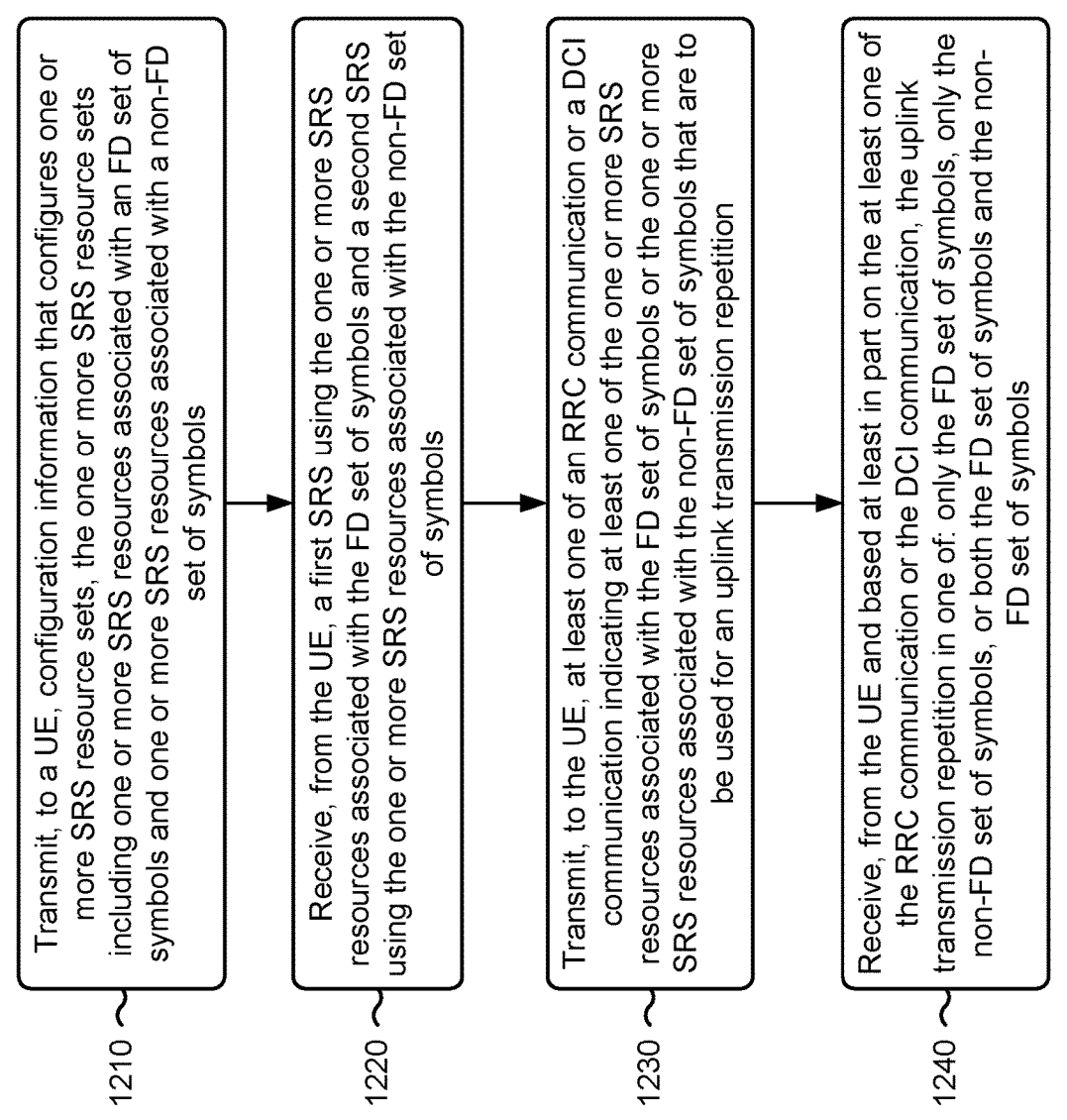

1210 — Transmit, to a UE, configuration information that configures one or more SRS resource sets, the one or more SRS resource sets including one or more SRS resources associated with an FD set of symbols and one or more SRS resources associated with a non-FD set of symbols 1220 — Receive, from the UE, a first SRS using the one or more SRS resources associated with the FD set of symbols and a second SRS using the one or more SRS resources associated with the non-FD set of symbols 1230 — Transmit, to the UE, at least one of an RRC communication or a DCI communication indicating at least one of the one or more SRS resources associated with the FD set of symbols or the one or more SRS resources associated with the non-FD set of symbols that are to be used for an uplink transmission repetition 1240 — Receive, from the UE and based at least in part on the at least one of the RRC communication or the DCI communication, the uplink transmission repetition in one of: only the FD set of symbols, only the non-FD set of symbols, or both the FD set of symbols and the non-FD set of symbols

Reception Component 1302

Communication Manager 1306

Transmission Component 1304

1308

UPLINK TRANSMISSION REPETITION FOR FULL-DUPLEX AND NON FULL-DUPLEX SETS OF SYMBOLS

FIELD OF THE DISCLOSURE

Aspects of the present disclosure generally relate to wireless communication and to techniques and apparatuses for uplink transmission repetition for full-duplex and non-full-duplex sets of symbols.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving configuration information that configures one or more sounding reference signal (SRS) resource sets, the one or more SRS resource sets including one or more SRS resources associated with a full duplex (FD) set of symbols and one or more SRS resources associated with a non-FD set of symbols. The method may include transmitting a first SRS using the one or more SRS resources associated with the FD set of symbols and a second SRS using the one or more SRS resources associated with the non-FD set of symbols. The method may include receiving at least one of a radio resource control (RRC) communication or a downlink control information (DCI) communication indicating at least one of the one or more SRS resources associated with the FD set of symbols or the one or more SRS resources associated with the non-FD set of symbols that are to be used for an uplink transmission repetition. The method may include transmitting, based at least in part on the at least one of the RRC communication or the DCI communication, the uplink transmission repetition in one of: only the FD set of symbols, only the non-FD set of symbols, or both the FD set of symbols and the non-FD set of symbols.

Some aspects described herein relate to a method of wireless communication performed by a network node. The method may include transmitting, to a UE, configuration information that configures one or more SRS resource sets, the one or more SRS resource sets including one or more SRS resources associated with an FD set of symbols and one or more SRS resources associated with a non-FD set of symbols. The method may include receiving, from the UE, a first SRS using the one or more SRS resources associated with the FD set of symbols and a second SRS using the one or more SRS resources associated with the non-FD set of symbols. The method may include transmitting, to the UE, at least one of an RRC communication or a DCI communication indicating at least one of the one or more SRS resources associated with the FD set of symbols or the one or more SRS resources associated with the non-FD set of symbols that are to be used for an uplink transmission repetition. The method may include receiving, from the UE and based at least in part on the at least one of the RRC communication or the DCI communication, the uplink transmission repetition in one of: only the FD set of symbols, only the non-FD set of symbols, or both the FD set of symbols and the non-FD set of symbols.

Some aspects described herein relate to a UE for wireless communication. The UE may include one or more memories and one or more processors coupled to the one or more memories. The one or more processors, individually or in any combination, may be operable to cause the UE to receive configuration information that configures one or more SRS resource sets, the one or more SRS resource sets including one or more SRS resources associated with an FD set of symbols and one or more SRS resources associated with a non-FD set of symbols. The one or more processors, individually or in any combination, may be operable to cause the UE to transmit a first SRS using the one or more SRS resources associated with the FD set of symbols and a second SRS using the one or more SRS resources associated with the non-FD set of symbols. The one or more processors, individually or in any combination, may be operable to cause the UE to receive at least one of an RRC communication or a DCI communication indicating at least one of the one or more SRS resources associated with the FD set of symbols or the one or more SRS resources associated with the non-FD set of symbols that are to be used for an uplink transmission repetition. The one or more processors, individually or in any combination, may be operable to cause the UE to transmit, based at least in part on the at least one of the RRC communication or the DCI communication, the uplink transmission repetition in one of: only the FD set of symbols, only the non-FD set of symbols, or both the FD set of symbols and the non-FD set of symbols.

Some aspects described herein relate to a network node for wireless communication. The network node may include one or more memories and one or more processors coupled to the one or more memories. The one or more processors, individually or in any combination, may be operable to cause the network node to transmit, to a UE, configuration information that configures one or more SRS resource sets, the one or more SRS resource sets including one or more SRS resources associated with an FD set of symbols and one or more SRS resources associated with a non-FD set of symbols. The one or more processors, individually or in any combination, may be operable to cause the network node to receive, from the UE, a first SRS using the one or more SRS resources associated with the FD set of symbols and a second SRS using the one or more SRS resources associated with the non-FD set of symbols. The one or more processors, individually or in any combination, may be operable to cause the network node to transmit, to the UE, at least one of an RRC communication or a DCI communication indicating at least one of the one or more SRS resources associated with the FD set of symbols or the one or more SRS resources associated with the non-FD set of symbols that are to be used for an uplink transmission repetition. The one or more processors, individually or in any combination, may be operable to cause the network node to receive, from the UE and based at least in part on the at least one of the RRC communication or the DCI communication, the uplink transmission repetition in one of: only the FD set of symbols, only the non-FD set of symbols, or both the FD set of symbols and the non-FD set of symbols.

Some aspects described herein relate to a non-transitory computer-readable medium that stores a set of instructions for wireless communication by a UE. The set of instructions, when executed by one or more processors of the UE, may cause the UE to receive configuration information that configures one or more SRS resource sets, the one or more SRS resource sets including one or more SRS resources associated with an FD set of symbols and one or more SRS resources associated with a non-FD set of symbols. The set of instructions, when executed by one or more processors of the UE, may cause the UE to transmit a first SRS using the one or more SRS resources associated with the FD set of symbols and a second SRS using the one or more SRS resources associated with the non-FD set of symbols. The set of instructions, when executed by one or more processors of the UE, may cause the UE to receive at least one of an RRC communication or a DCI communication indicating at least one of the one or more SRS resources associated with the FD set of symbols or the one or more SRS resources associated with the non-FD set of symbols that are to be used for an uplink transmission repetition. The set of instructions, when executed by one or more processors of the UE, may cause the UE to transmit, based at least in part on the at least one of the RRC communication or the DCI communication, the uplink transmission repetition in one of: only the FD set of symbols, only the non-FD set of symbols, or both the FD set of symbols and the non-FD set of symbols.

Some aspects described herein relate to a non-transitory computer-readable medium that stores a set of instructions for wireless communication by a network node. The set of instructions, when executed by one or more processors of the network node, may cause the network node to transmit, to a UE, configuration information that configures one or more SRS resource sets, the one or more SRS resource sets including one or more SRS resources associated with an FD set of symbols and one or more SRS resources associated with a non-FD set of symbols. The set of instructions, when executed by one or more processors of the network node, may cause the network node to receive, from the UE, a first SRS using the one or more SRS resources associated with the FD set of symbols and a second SRS using the one or more SRS resources associated with the non-FD set of symbols. The set of instructions, when executed by one or more processors of the network node, may cause the network node to transmit, to the UE, at least one of an RRC communication or a DCI communication indicating at least one of the one or more SRS resources associated with the FD set of symbols or the one or more SRS resources associated with the non-FD set of symbols that are to be used for an uplink transmission repetition. The set of instructions, when executed by one or more processors of the network node, may cause the network node to receive, from the UE and based at least in part on the at least one of the RRC communication or the DCI communication, the uplink transmission repetition in one of: only the FD set of symbols, only the non-FD set of symbols, or both the FD set of symbols and the non-FD set of symbols.

Some aspects described herein relate to an apparatus for wireless communication. The apparatus may include means for receiving configuration information that configures one or more SRS resource sets, the one or more SRS resource sets including one or more SRS resources associated with an FD set of symbols and one or more SRS resources associated with a non-FD set of symbols. The apparatus may include means for transmitting a first SRS using the one or more SRS resources associated with the FD set of symbols and a second SRS using the one or more SRS resources associated with the non-FD set of symbols. The apparatus may include means for receiving at least one of an RRC communication or a DCI communication indicating at least one of the one or more SRS resources associated with the FD set of symbols or the one or more SRS resources associated with the non-FD set of symbols that are to be used for an uplink transmission repetition. The apparatus may include means for transmitting, based at least in part on the at least one of the RRC communication or the DCI communication, the uplink transmission repetition in one of: only the FD set of symbols, only the non-FD set of symbols, or both the FD set of symbols and the non-FD set of symbols.

Some aspects described herein relate to an apparatus for wireless communication. The apparatus may include means for transmitting, to a UE, configuration information that configures one or more SRS resource sets, the one or more SRS resource sets including one or more SRS resources associated with an FD set of symbols and one or more SRS resources associated with a non-FD set of symbols. The apparatus may include means for receiving, from the UE, a first SRS using the one or more SRS resources associated with the FD set of symbols and a second SRS using the one or more SRS resources associated with the non-FD set of symbols. The apparatus may include means for transmitting, to the UE, at least one of an RRC communication or a DCI communication indicating at least one of the one or more SRS resources associated with the FD set of symbols or the one or more SRS resources associated with the non-FD set of symbols that are to be used for an uplink transmission repetition. The apparatus may include means for receiving, from the UE and based at least in part on the at least one of the RRC communication or the DCI communication, the uplink transmission repetition in one of: only the FD set of symbols, only the non-FD set of symbols, or both the FD set of symbols and the non-FD set of symbols.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example associated with single downlink control information (DCI) based time division multiplex SRS transmission, in accordance with the present disclosure.

FIGS. 6A-6B are diagrams illustrating an example associated with an SRS resource set indicator field, in accordance with the present disclosure.

FIG. 10 is a diagram of an example associated with uplink transmission repetition for FD and non-FD sets of symbols, in accordance with the present disclosure.

FIG. 11 is a diagram illustrating an example process performed, for example, by a UE, in accordance with the present disclosure.

FIG. 12 is a diagram illustrating an example process performed, for example, by a network node, in accordance with the present disclosure.

DETAILED DESCRIPTION

Figure 1:
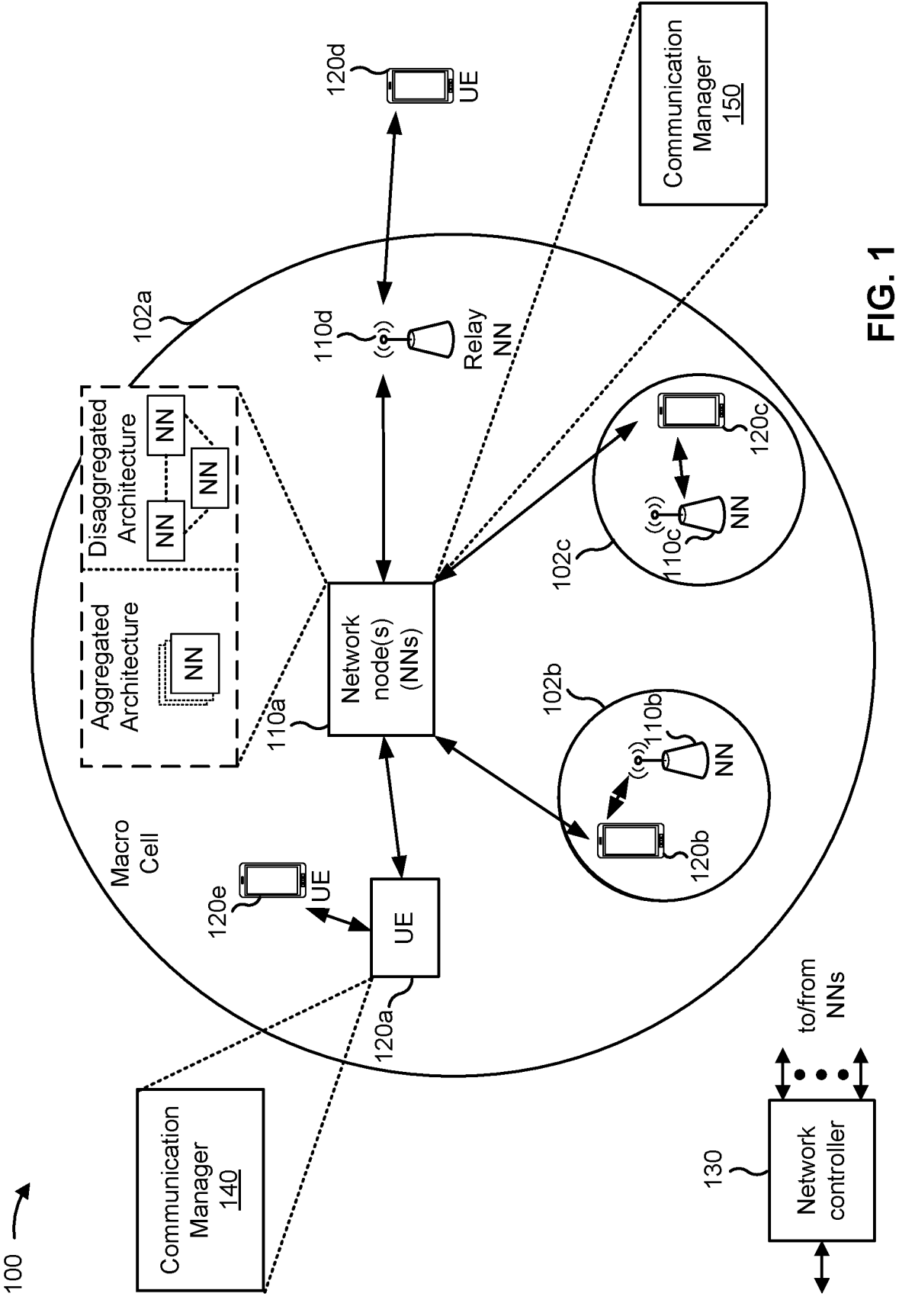
FIG. 1 is a diagram illustrating an example of a wireless network, in accordance with the present disclosure.

Various aspects relate generally to wireless communication and more particularly to full duplex (FD) communication. Some aspects more specifically relate to rules and/or signaling used to enable uplink transmission repetition across FD sets of symbols and non-FD sets of symbols. In some examples, a network node may configure a user equipment (UE) with multiple groups of sounding reference signal (SRS) resources, with a first group of SRS resources being associated with FD sets of symbols and a second group of SRS resources being associated with non-FD sets of symbols. In some aspects, the network node may configure the UE with two SRS resource sets, with a first SRS resource set corresponding to the FD set of symbols and the second SRS resource set corresponding to the non-FD set of symbols. In some other aspects, the network node may configure the UE with a single SRS resource set, with a first group of SRS resources of the SRS resource set being associated with the FD set of symbols and a second group of SRS resources of the SRS resource set being associated with the non-FD set of symbols. The network node may signal, to the UE, which groups of SRS resources are associated with an uplink transmission repetition (e.g., a physical uplink shared channel (PUSCH) repetition or a physical uplink control channel (PUCCH) repetition), such as by signaling a codepoint in a radio resource control (RRC) communication and/or a downlink control information (DCI) communication. Based at least in part on the signaling, the UE may identify whether the uplink transmission repetition is to span repetition occasions in the FD set of symbols and the non-FD set of symbols, or whether the uplink transmission repetition is to be transmitted in only the FD set of symbols or only the non-FD set of symbols.

Particular aspects of the subject matter described in this disclosure can implemented to realize one or more of the following potential advantages. In some examples, by enabling signaling of SRS resources to be used for an uplink transmission repetition across FD and non-FD sets of symbols, the described techniques can be used to flexibly configure a UE to perform uplink transmission repetitions across FD sets of symbols or not across FD sets of symbols according to channel conditions, network congestion, or other variables, thereby resulting in more efficient allocation of network resources. Moreover, by enabling signaling of SRS resources to be used for an uplink transmission repetition across FD and non-FD sets of symbols, the described techniques can be used to improve uplink coverage, improve uplink latency, and reduce communication errors between a network node and a UE for FD communication modes, thereby reducing power, computing, and network resource consumption that may otherwise be required to correct communication errors.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an CNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120c) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHZ-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHZ) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive configuration information that configures one or more SRS resource sets, the one or more SRS resource sets including one or more SRS resources associated with an FD set of symbols and one or more SRS resources associated with a non-FD set of symbols; transmit a first SRS using the one or more SRS resources associated with the FD set of symbols and a second SRS using the one or more SRS resources associated with the non-FD set of symbols; receive at least one of an RRC communication or a DCI communication indicating at least one of the one or more SRS resources associated with the FD set of symbols or the one or more SRS resources associated with the non-FD set of symbols that are to be used for an uplink transmission repetition; and transmit, based at least in part on the at least one of the RRC communication or the DCI communication, the uplink transmission repetition in one of: only the FD set of symbols, only the non-FD set of symbols, or both the FD set of symbols and the non-FD set of symbols. Additionally, or alternatively, the communication manager 140 may perform one or more other operations described herein.

In some aspects, the network node 110 may include a communication manager 150. As described in more detail elsewhere herein, the communication manager 150 may transmit, to a UE, configuration information that configures one or more SRS resource sets, the one or more SRS resource sets including one or more SRS resources associated with an FD set of symbols and one or more SRS resources associated with a non-FD set of symbols; receive, from the UE, a first SRS using the one or more SRS resources associated with the FD set of symbols and a second SRS using the one or more SRS resources associated with the non-FD set of symbols; transmit, to the UE, at least one of an RRC communication or a DCI communication indicating at least one of the one or more SRS resources associated with the FD set of symbols or the one or more SRS resources associated with the non-FD set of symbols that are to be used for an uplink transmission repetition; and receive, from the UE and based at least in part on the at least one of the RRC communication or the DCI communication, the uplink transmission repetition in one of: only the FD set of symbols, only the non-FD set of symbols, or both the FD set of symbols and the non-FD set of symbols. Additionally, or alternatively, the communication manager 150 may perform one or more other operations described herein.

As indicated above, FIG. 1 is provided as an example. Other examples may differ from what is described with regard to FIG. 1.

Figure 2:
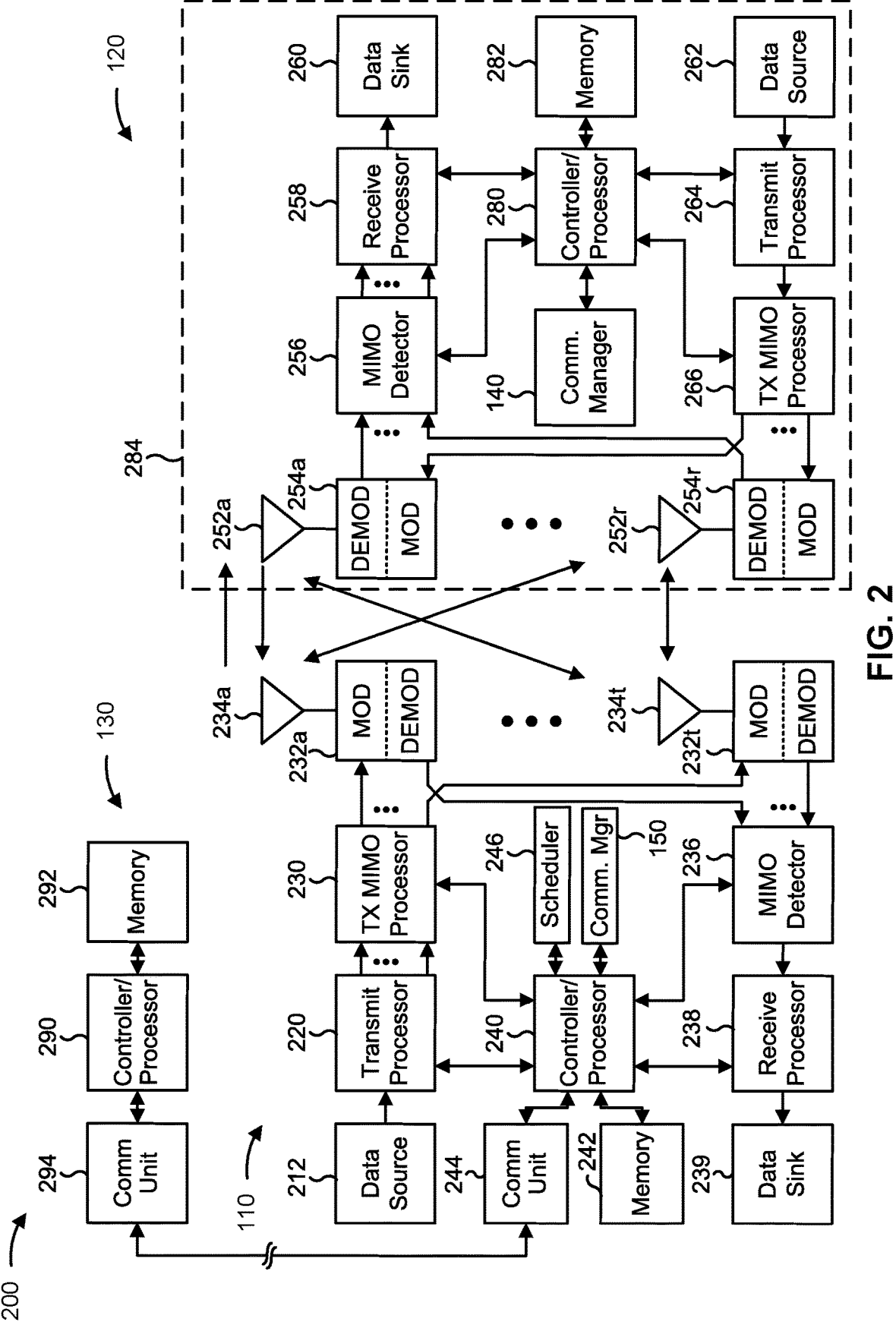
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 9A-14).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 9A-14).

The controller/processor 240 of the network node 110, the controller/processor 280 of the UE 120, and/or any other component(s) of FIG. 2 may perform one or more techniques associated with uplink transmission repetition for FD and non-FD sets of symbols, as described in more detail elsewhere herein. For example, the controller/processor 240 of the network node 110, the controller/processor 280 of the UE 120, and/or any other component(s) of FIG. 2 may perform or direct operations of, for example, process 1100 of FIG. 11, process 1200 of FIG. 12, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, the UE 120 includes means for receiving configuration information that configures one or more SRS resource sets, the one or more SRS resource sets including one or more SRS resources associated with an FD set of symbols and one or more SRS resources associated with a non-FD set of symbols; means for transmitting a first SRS using the one or more SRS resources associated with the FD set of symbols and a second SRS using the one or more SRS resources associated with the non-FD set of symbols; means for receiving at least one of an RRC communication or a DCI communication indicating at least one of the one or more SRS resources associated with the FD set of symbols or the one or more SRS resources associated with the non-FD set of symbols that are to be used for an uplink transmission repetition; and/or means for transmitting, based at least in part on the at least one of the RRC communication or the DCI communication, the uplink transmission repetition in one of: only the FD set of symbols, only the non-FD set of symbols, or both the FD set of symbols and the non-FD set of symbols. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting, to a UE, configuration information that configures one or more SRS resource sets, the one or more SRS resource sets including one or more SRS resources associated with an FD set of symbols and one or more SRS resources associated with a non-FD set of symbols; means for receiving, from the UE, a first SRS using the one or more SRS resources associated with the FD set of symbols and a second SRS using the one or more SRS resources associated with the non-FD set of symbols; means for transmitting, to the UE, at least one of an RRC communication or a DCI communication indicating at least one of the one or more SRS resources associated with the FD set of symbols or the one or more SRS resources associated with the non-FD set of symbols that are to be used for an uplink transmission repetition; and/or means for receiving, from the UE and based at least in part on the at least one of the RRC communication or the DCI communication, the uplink transmission repetition in one of: only the FD set of symbols, only the non-FD set of symbols, or both the FD set of symbols and the non-FD set of symbols. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
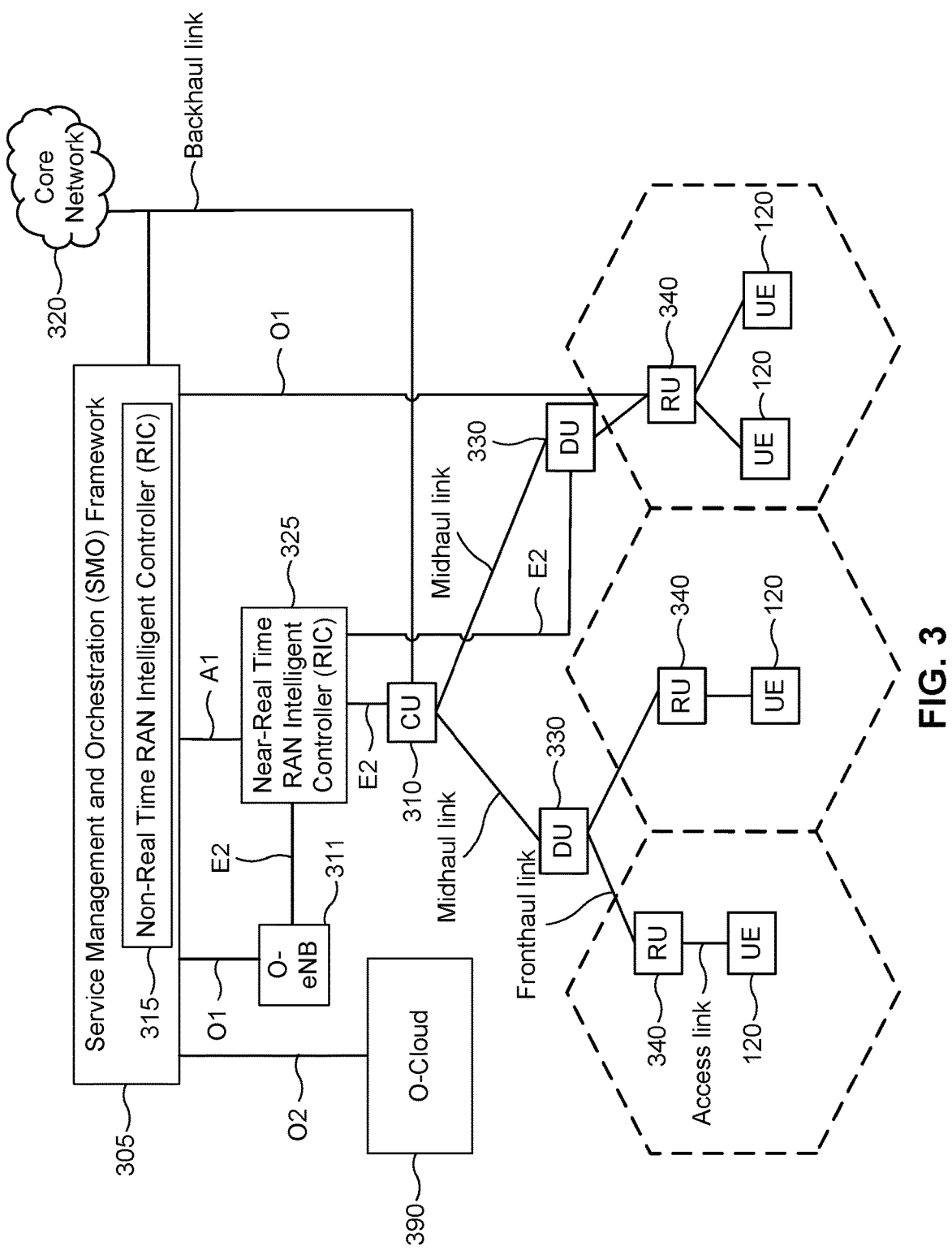
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include RRC functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC)

layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
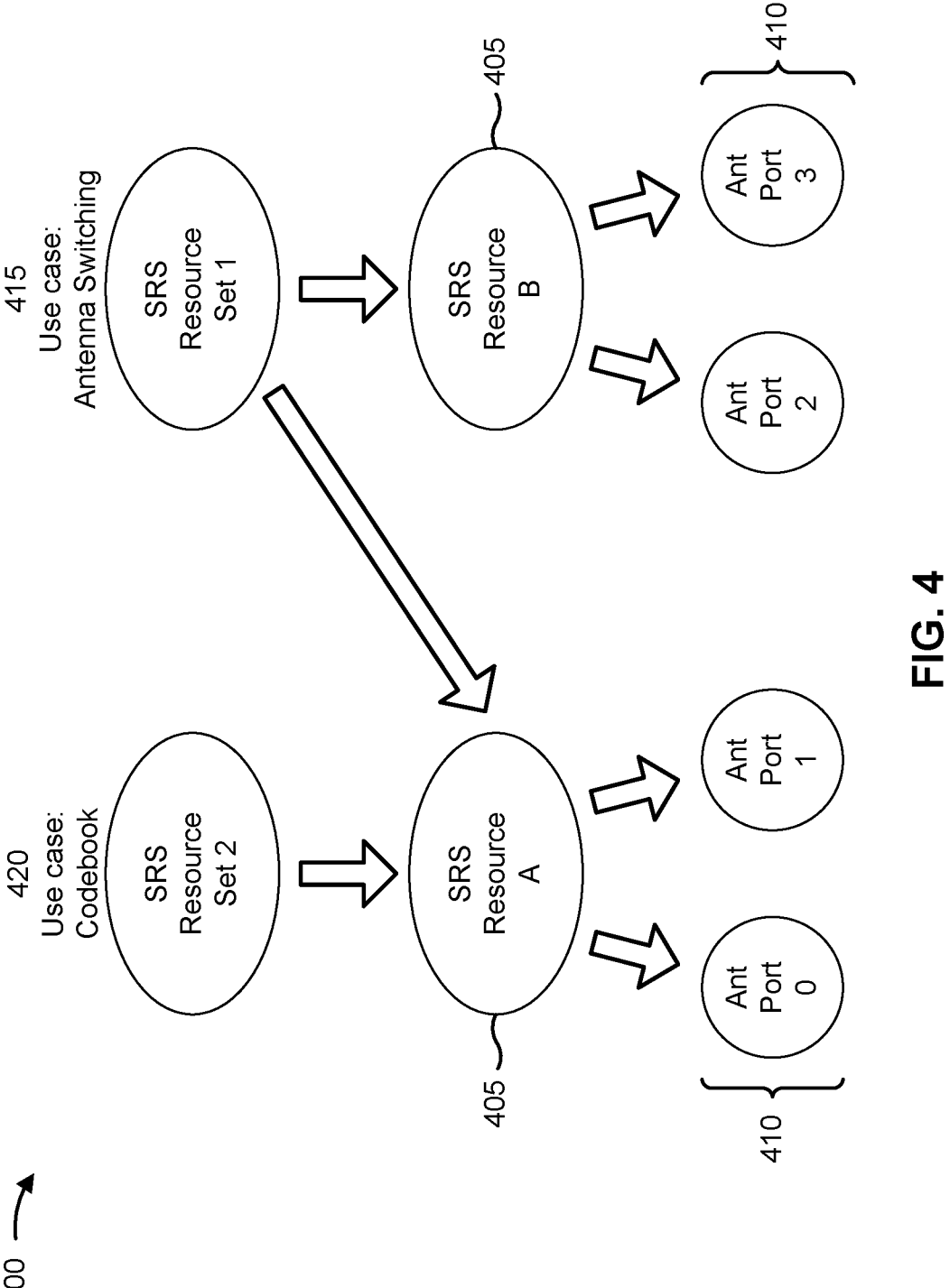
FIG. 4 is a diagram illustrating an example of sounding reference signal (SRS) resource sets, in accordance with the present disclosure.

FIG. 4 is a diagram illustrating an example 400 of SRS resource sets, in accordance with the present disclosure.

A UE 120 may be configured with one or more SRS resource sets to allocate resources for SRS transmissions by the UE 120. For example, a configuration for SRS resource sets may be indicated in an RRC message (e.g., an RRC configuration message or an RRC reconfiguration message). As shown by reference number 405, an SRS resource set may include one or more resources (e.g., shown as SRS resources), which may include time resources and/or frequency resources (e.g., a slot, a symbol, a resource block, and/or a periodicity for the time resources).

As shown by reference number 410, an SRS resource may include one or more antenna ports on which an SRS is to be transmitted (e.g., in a time-frequency resource). Thus, a configuration for an SRS resource set may indicate one or more time-frequency resources in which an SRS is to be transmitted and may indicate one or more antenna ports on which the SRS is to be transmitted in those time-frequency resources. In some aspects, the configuration for an SRS resource set may indicate a use case (e.g., in an SRS-SetUse information element) for the SRS resource set. For example, an SRS resource set may have a use case of antenna switching, codebook, non-codebook, or beam management.

An antenna switching SRS resource set may be used to indicate downlink channel state information (CSI) with reciprocity between an uplink and downlink channel. For example, when there is reciprocity between an uplink channel and a downlink channel, a network node 110 may use an antenna switching SRS (e.g., an SRS transmitted using a resource of an antenna switching SRS resource set) to acquire downlink CSI (e.g., to determine a downlink precoder to be used to communicate with the UE 120).

A codebook SRS resource set may be used to indicate uplink CSI when a network node 110 indicates an uplink precoder to the UE 120. For example, when the network node 110 is configured to indicate an uplink precoder to the UE 120 (e.g., using a precoder codebook), the network node 110 may use a codebook SRS (e.g., an SRS transmitted using a resource of a codebook SRS resource set) to acquire uplink CSI (e.g., to determine an uplink precoder to be indicated to the UE 120 and used by the UE 120 to communicate with the network node 110). In some aspects, virtual ports (e.g., a combination of two or more antenna ports) with a maximum transmit power may be supported at least for a codebook SRS.

A non-codebook SRS resource set may be used to indicate uplink CSI when the UE 120 selects an uplink precoder (e.g., instead of the network node 110 indicated an uplink precoder to be used by the UE 120). For example, when the UE 120 is configured to select an uplink precoder, the network node 110 may use a non-codebook SRS (e.g., an SRS transmitted using a resource of a non-codebook SRS resource set) to acquire uplink CSI. In this case, the non-codebook SRS may be precoded using a precoder selected by the UE 120 (e.g., which may be indicated to the network node 110).

A beam management SRS resource set may be used for indicating CSI for millimeter wave communications.

An SRS resource can be configured as periodic, semi-persistent (sometimes referred to as semi-persistent scheduling (SPS)), or aperiodic. A periodic SRS resource may be configured via a configuration message that indicates a periodicity of the SRS resource (e.g., a slot-level periodicity, where the SRS resources occurs every Y slots) and a slot offset. In some cases, a periodic SRS resource may always be activated, and may not be dynamically activated or deactivated. A semi-persistent SRS resource may also be configured via a configuration message that indicates a periodicity and a slot offset for the semi-persistent SRS resource, and may be dynamically activated and deactivated (e.g., using DCI or a MAC control element (MAC-CE)). An aperiodic SRS resource may be triggered dynamically, such as via DCI (e.g., UE-specific DCI or group common DCI) or a MAC-CE.

In some aspects, the UE 120 may be configured with a mapping between SRS ports (e.g., antenna ports) and corresponding SRS resources. The UE 120 may transmit an SRS on a particular SRS resource using an SRS port indicated in the configuration. In some aspects, an SRS resource may span N adjacent symbols within a slot (e.g., where N equals 1, 2, or 4). The UE 120 may be configured with X SRS ports (e.g., where X≤4). In some aspects, each of the X SRS ports may mapped to a corresponding symbol of the SRS resource and used for transmission of an SRS in that symbol.

As shown in FIG. 4, in some aspects, different SRS resource sets indicated to the UE 120 (e.g., having different use cases) may overlap (e.g., in time and/or in frequency, such as in the same slot). For example, as shown by reference number 415, a first SRS resource set (e.g., shown as SRS Resource Set 1) is shown as having an antenna switching use case. As shown, this example antenna switching SRS resource set includes a first SRS resource (shown as SRS Resource A) and a second SRS resource (shown as SRS Resource B). Thus, antenna switching SRS may be transmitted in SRS Resource A (e.g., a first time-frequency resource) using antenna port 0 and antenna port 1 and may be transmitted in SRS Resource B (e.g., a second time-frequency resource) using antenna port 2 and antenna port 3.

As shown by reference number 420, a second SRS resource set (e.g., shown as SRS Resource Set 2) may be a codebook use case. As shown, this example codebook SRS resource set includes only the first SRS resource (shown as SRS Resource A). Thus, codebook SRSs may be transmitted in SRS Resource A (e.g., the first time-frequency resource) using antenna port 0 and antenna port 1. In this case, the UE 120 may not transmit codebook SRSs in SRS Resource B (e.g., the second time-frequency resource) using antenna port 2 and antenna port 3.

In some examples, a UE 120 and/or a network node 110 may support codebook (CB) based PUSCH transmissions and non-codebook (NCB) based PUSCH transmissions. For CB based PUSCH transmissions, a UE 120 may be configured with one SRS resource set with the use case (sometimes referred to as "usage") set to codebook. In such examples, a maximum of four SRS resources within the SRS resource set may be configured for the UE 120. In some examples, each SRS resource may be RRC configured with a number of ports (e.g., using a nrofSRS-Ports information element). An SRS resource indicator field (SRI) of an uplink DCI (e.g., a DCI scheduling a PUSCH transmission) associated with a CB based PUSCH transmission may indicate one SRS resource. A number of ports configured for the indicated SRS resource determines the number of antenna ports for the PUSCH transmission. Moreover, the UE 120 may transmit the PUSCH transmission using a same spatial domain filter (e.g., uplink beam) as the indicated SRS resource. A "precoding information and number of layers" field of the uplink DCI may indicate number of layers (e.g., rank) and a transmitted precoding matrix indicator (TPMI) for the scheduled PUSCH transmission.

For NCB based transmissions, a UE 120 may be configured with one SRS resource set with the use case set to non-codebook. In such examples, a maximum of four SRS resources within the SRS resource set may be configured for the UE 120, with each SRS resource having one port. The SRI of an uplink DCI associated with a NCB based SRS transmission may indicate one or multiples SRS resources, with the number of indicated SRS resources corresponding to the rank (e.g., number of layers) for the scheduled PUSCH. In such examples, a scheduled PUSCH transmission may be transmitted with the same precoder as well as spatial domain filter (e.g., uplink beam) as the indicated SRS resources.

In some examples, for both CB based transmissions and NCB based transmissions, a size of the SRI field may be a function of a quantity of SRS resources within the SRS resource set. The indicated SRI in slot n may be associated with the most recent transmission of one or more SRS resources identified by the SRI that occurred prior to a physical downlink control channel (PDCCH) communication carrying the SRI. Additional details of associating SRS resources and/or SRS resource sets with SRS transmissions are described in more detail below in connection with FIGS. 5-6B.

As indicated above, FIG. 4 is provided as an example. Other examples may differ from what is described with regard to FIG. 4.

FIG. 5 is a diagram illustrating an example 500 associated with single DCI based time division multiplex (TDM) SRS transmission, in accordance with the present disclosure. In some aspects, the features shown and described in connection with FIG. 5 may be referred to an sDCI transmission mode or, more simply, an sDCI mode.

In some examples, a UE 120 may be scheduled by a single DCI to transmit multiple SRS repetitions in a TDM manner. Each SRS repetition may be associated with the same transport block (TB) (e.g., each of the different repetitions may be used to transmit the same data packet), but each SRS repetition may correspond to different transmission parameters, such as a beam parameter, a spatial relation parameter, a transmission configuration indicator (TCI) state parameter, a power control parameter, a precoding parameter, or a similar parameter. In some cases, SRS repetitions scheduled by a single DCI may belong to two sets of SRS repetitions, with each set of SRS repetitions corresponding to a different set of transmission parameters (e.g., beam, spatial relation, TCI, power control, or precoding).

More particularly, FIG. 5 shows an example in which an uplink DCI 502 schedules four SRS repetitions, including a first SRS repetition 504, a second SRS repetition 506, a third SRS repetition 508, and a fourth SRS repetition 510. The SRS repetitions 504, 506, 508, 510 may be associated with two sets of transmission parameters, indicated using stippling and cross-hatching in FIG. 5. For example, as shown using stippling, the first SRS repetition 504 and the third SRS repetition 508 may be associated with a first set of repetitions using a first beam and/or a first set of power control parameters, among other parameters. In some cases, the SRS repetitions associated with the first set of SRS repetitions may be targeted toward a first network node 110 (e.g., a first TRP). As shown using cross-hatching, the second SRS repetition 506 and the fourth SRS repetition 510 may be associated with a second set of repetitions using a second beam and/or a second set of power control parameters, among other parameters. In some cases, the SRS repetitions associated with the second set of SRS repetitions may be targeted toward a second network node 110 (e.g., a second TRP) different from the first network node 110.

To enable the single DCI based TDM SRS transmissions shown in FIG. 5, the two sets of SRS repetitions may correspond to two SRS resource sets. More particularly, the uplink DCI 502 may indicate two beams, two power control parameters, or two of similar transmission parameters by using two corresponding SRI fields in the uplink DCI 502 for both CB based SRS transmissions and NCB based SRS transmissions. For CB based SRS transmissions, the uplink DCI 502 may also include two TPMI fields indicating two precoders for the two sets of SRS repetitions. In the example shown in FIG. 5, and as indicated by reference number 512, the first set of PUSCH repetitions (e.g., the first SRS repetition 504 and the third SRS repetition 508) may be associated with a first SRS resource set, which may be indicated by the first SRI field included in the uplink DCI 502. Similarly, and as indicated by reference number 514, the second set of SRS repetitions (e.g., the second SRS repetition 506 and the fourth SRS repetition 510) may be associated with a second SRS resource set, which may be indicated by the second SRI field included in the uplink DCI 502.

In some cases, a UE 120 may be scheduled by a single DCI (e.g., uplink DCI 502) to transmit multiple SRS repetitions associated with spatial division multiplex (SDM) transmissions, frequency division multiplex (FDM) transmissions, or single frequency network (SFN) transmissions. In such cases, the DCI signaling associated with the multiple SRS repetitions associated with SDM transmissions, FDM transmissions, or SFN transmissions may be similar to the signaling described above in connection with the multiple SRS repetitions associated with TDM transmissions. For example, for multiple SRS repetitions associated with SDM transmissions, different sets of layers associated with SRS transmissions may be associated with different SRS resource sets. For multiple SRS repetitions associated with FDM transmissions, different sets of resource blocks (RBs) associated with the SRS transmissions may be associated with different SRS resource sets. And for multiple SRS repetitions associated with SFN transmissions, each layer and/or DMRS may be associated with both SRS resource sets.

Although the example shown and described in connection with FIG. 5 includes SRS repetitions associated with two network nodes and/or TRPs (e.g., associated with two SRS resource sets), in some other examples an uplink DCI may schedule SRS repetitions associated with a single network node and/or TRP (e.g., associated with one SRS resource set). Examples of dynamic switching between a multi-network-node and/or a multi-TRP scenario and a single-network-node and/or a single-TRP scenario are described in more detail below in connection with FIGS. 6A and 6B.

As indicated above, FIG. 5 is provided as an example. Other examples may differ from what is described with respect to FIG. 5.

Figure 6A:
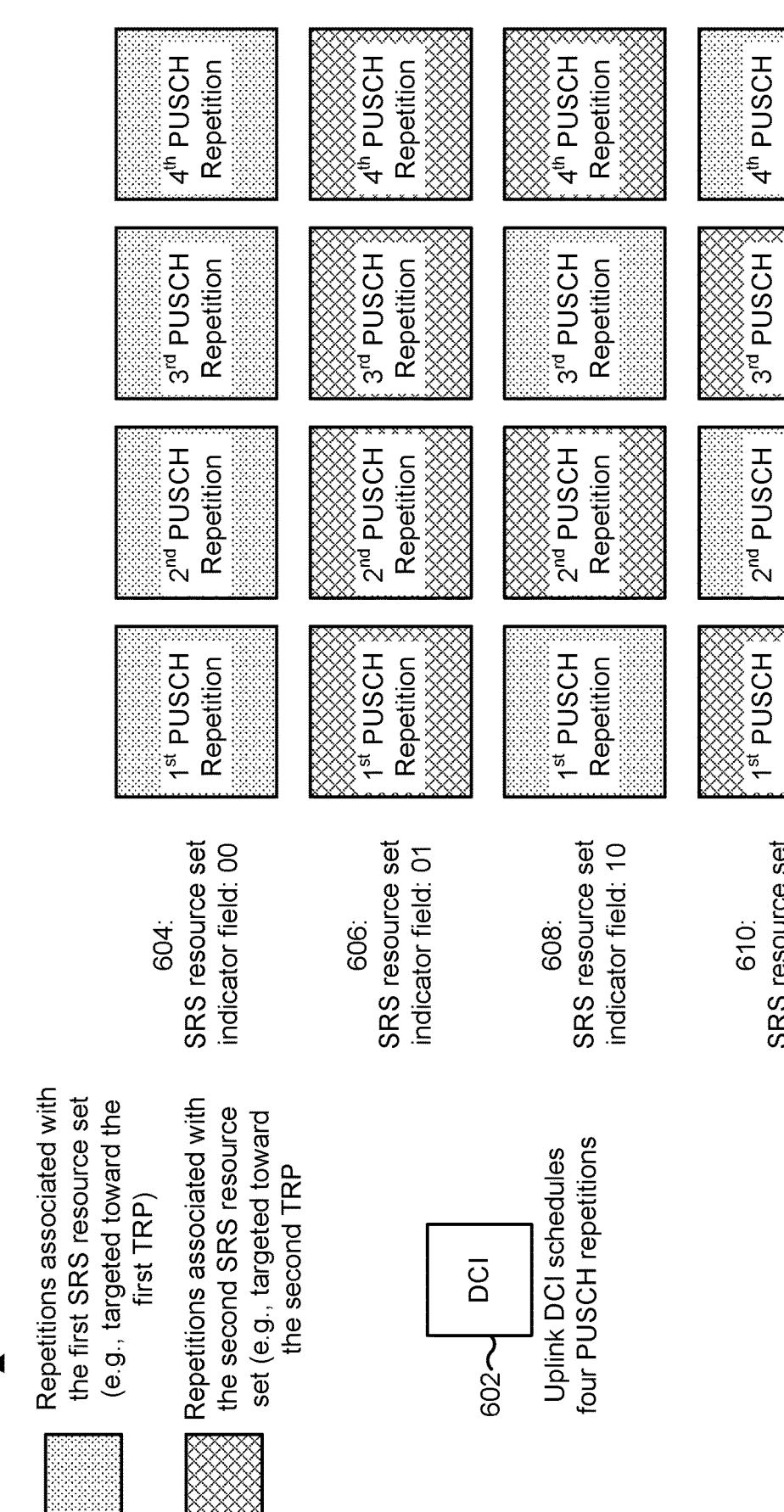

FIGS. 6A-6B are diagrams illustrating an example 600 associated with an SRS resource set indicator field, in accordance with the present disclosure.

In some examples, an uplink DCI may include an SRS resource set indicator field, indicating whether SRS repetitions are associated with a single network node and/or TRP (sometimes referred to as a single TRP (sTRP) mode) or with multiple network nodes and/or TRPs (sometimes referred to as a multiple TRP (mTRP) mode). An mTRP mode may provide support for both dynamic grant (DG) PUSCH repetition and configured grant (CG) PUSCH repetition. The SRS resource set indicator field May be a field included in an uplink DCI (e.g., a DCI format 0_1 communication or a DCI format 0_2 communication), and the presence of the field in the uplink DCI may be based on whether two SRS resource sets are configured corresponding to the DCI format. Additionally, a presence of a second SRI field and/or second TPMI field (e.g., for CB based transmissions) may be conditioned on the presence of the SRS resource set indicator field.

More particularly, as shown in FIG. 6A, an uplink DCI 602 may schedule four SRS repetitions, in a similar manner as described above in connection with uplink DCI 502. In this example, the four SRS repetitions may be associated with one of four repetition patterns, indicated by reference numbers 604, 606, 608, and 610. In the first example, indicated by reference number 604, each SRS repetition is associated with the same SRS resource set (e.g., the first SRS resource set), and thus all SRS repetitions may be targeted toward the same network node and/or TRP (e.g., the example shown by reference number 604 may correspond to an sTRP mode). In such examples, the SRS resource set indicator field may indicate a codepoint of "00." Similarly, in the second example, indicated by reference number 606, each SRS repetition is associated with the same SRS resource set, but in this example the SRS resource set is the second SRS resource set. Thus, all SRS repetitions in the example depicted by reference number 606 may be targeted toward the same network node and/or TRP (e.g., an sTRP mode), which may be a different network node and/or TRP than is associated with the first example indicated by reference number 604. In such examples, the SRS resource set indicator field may indicate a codepoint of "01."

In the third example, indicated by reference number 608, two of the SRS repetitions (e.g., the first and the third SRS repetitions) are associated with the first SRS resource set (e.g., targeted toward a first network node and/or TRP), and the other two SRS repetitions (e.g., the second and the fourth SRS repetitions) are associated with the second SRS resource set (e.g., targeted toward a second network node and/or TRP). In that regard, the third example may be associated with an mTRP mode and may be substantially similar to the example described above in connection with FIG. 5. In such examples, the SRS resource set indicator field may indicate a codepoint of "10." The fourth example, indicated by reference number 610, may be similar to the third example but with the SRS repetitions in a different order. More particularly, in this example the first and the third SRS repetitions are associated with the second SRS resource set (e.g., targeted toward the second network node and/or TRP), and the other two SRS repetitions (e.g., the second and the fourth SRS repetitions) are associated with a first SRS resource set (e.g., targeted toward the first network node and/or TRP). In such examples, the SRS resource set indicator field may indicate a codepoint of "11."

In this way, a network node 110 may dynamically switch between sTRP modes and mTRP modes by indicating a corresponding codepoint (e.g., one of 00, 01, 10, or 11) in the SRS resource set indicator field of an uplink DCI. Moreover, as shown by the table indicated by reference number 612 in FIG. 6B, the codepoint indicated by the SRS resource set indicator field may indicate which SRS resource sets are to be used, and/or which SRI and/or TPMI fields are used in the uplink DCI 602. More particularly, as described above in connection with the first example indicated by reference number 604, a codepoint of 00 may indicate an sTRP mode associated with the first SRS resource set (e.g., all SRS repetitions are associated with the first SRS resource set and/or targeted toward the same network node and/or TRP, shown as TRP1 in FIG. 6B). In such examples, only a first SRI field (for both CB and NCB based transmissions) and/or a first TPMI field (for CB based transmissions) may be used in the uplink DCI 602 (e.g., a second SRI field and a first TPMI field in the uplink DCI 602 may be unused in this example). As described above in connection with the second example indicated by reference number 606, a codepoint of 01 may indicate an sTRP mode associated with the second SRS resource set (e.g., all PUSCH repetitions are associated with the second SRS resource set and/or targeted toward the same network node and/or TRP, shown as TRP2 in FIG. 6B). In such examples, only the first SRI field and/or the first TPMI field may be used in the uplink DCI 602 (e.g., the second SRI field and the first TPMI field in the uplink DCI 602 may be unused in this example).

As described above in connection with the third example indicated by reference number 608, a codepoint of 10 may indicate an mTRP mode associated with a transmission order of TRP1, TRP2 (e.g., the first and third PUSCH repetitions are associated with the first SRS resource set and/or targeted toward TRP1, and the second and fourth PUSCH repetitions are associated with the second SRS resource set and/or targeted toward TRP2). In such examples, both the first SRI field and/or the first TPMI field and the second SRS field and/or the second TPMI field may be used in the uplink DCI 602. Similarly, as described above in connection with the fourth example indicated by reference number 610, a codepoint of 11 may indicate an mTRP mode associated with a transmission order of TRP2, TRP1 (e.g., the first and third PUSCH repetitions are associated with the second SRS resource set and/or targeted toward TRP2, and the second and fourth PUSCH repetitions are associated with the first SRS resource set and/or targeted toward TRP1). In such examples, both the first SRI field and/or the first TPMI and the second SRS field and/or the second TPMI field may be used in the uplink DCI 602.

As indicated above, FIGS. 6A-6B are provided as an example. Other examples may differ from what is described with respect to FIGS. 6A-6B.

Figure 7B:
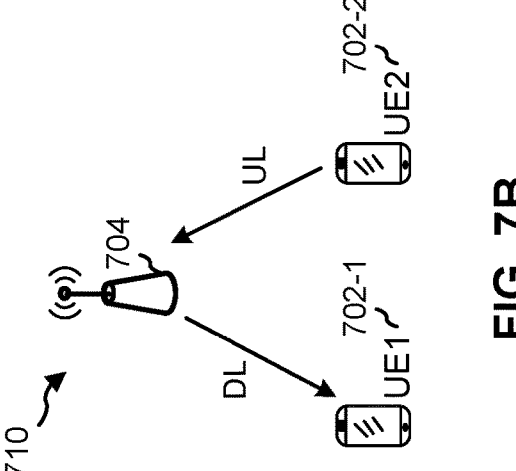
FIGS. 7A-7C are diagrams illustrating examples of full duplex (FD) communication in accordance with the present disclosure.
Figure 7C:
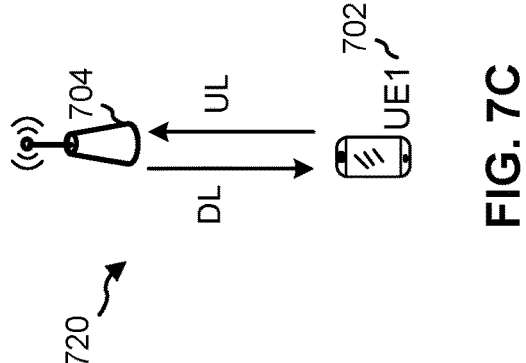
Figure 7A:
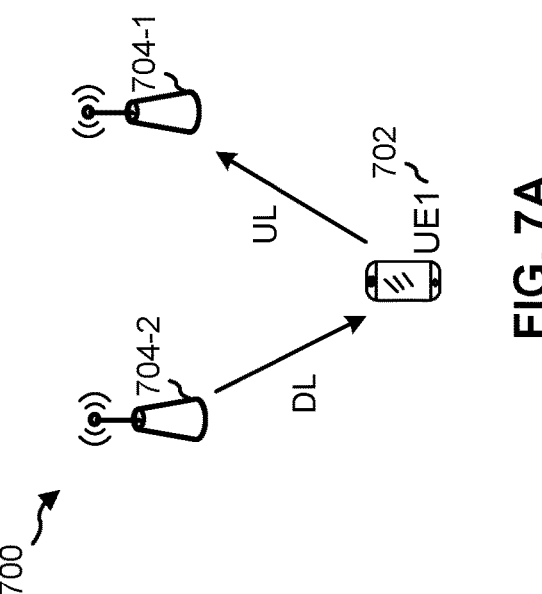

FIGS. 7A-7C are diagrams illustrating examples 700, 710, 720 of FD communication in accordance with the present disclosure. FD communication in a wireless network refers to simultaneous bi-directional communication between devices in the wireless network. For example, a UE operating in an FD mode may transmit an uplink communication and receive a downlink communication at the same time (e.g., in the same slot or the same symbol). Half duplex (HD) communication in a wireless network refers to unidirectional communications (e.g., only downlink communication or only uplink communication) between devices at a given time (e.g., in a given slot or a given symbol).

The example 700 of FIG. 7A includes a UE1 702 (e.g., UE 120) and two network nodes (e.g., TRPs) 704-1, 704-2 (e.g., network nodes 110), where the UE1 702 is sending UL transmissions to the network node 704-1 and is receiving DL transmissions from the network node 704-2. In the example 700 of FIG. 7A, FD is enabled for the UE1 702, but not for the network nodes 704-1, 704-2. Put another way, the network nodes 704-1, 704-2 are operating in an HD mode. The example 710 of FIG. 7B includes two UEs, shown as UE1 702-1 and UE2 702-2, and a network node 704, where the UE1 702-1 is receiving a DL transmission from the network node 704 and the UE2 702-2 is transmitting an UL transmission to the network node 704. In the example 710 of FIG. 7B, FD is enabled for the network node 704, but not for the UE1 702-1 and the UE2 702-2 (e.g., the UE1 702-1 and the UE2 702-2 are operating in an HD mode). The example 720 of FIG. 7C includes a UE1 702 and a network node 704, where the UE1 702 is receiving a DL transmission from the network node 704 and the UE1 702 is transmitting an UL transmission to the network node 704. In the example 720 of FIG. 7C, FD is enabled for both the UE1 702 and the network node 704.

In some examples, a wireless communication device operating in an FD mode (e.g., the UE1 702 in examples 700 and/or 720, and/or the network node 704 in examples 710 and/or 720), may be operating in an in-band FD (IBFD) mode or a sub-band FD (SBFD) mode. In an IBFD mode, a wireless communication device May transmit and receive communications on the same time and frequency resources (e.g., DL resources and UL resources may at least partially overlap in the time and frequency domains). In an SBFD mode, a wireless communication device may transmit and receive communications at the same time but on different frequency resources. In such examples, a DL resource may be separated from an UL resource by a guard band. Examples of IBFD operation and SBFD operation are described in more detail below in connection with FIG. 8.

As indicated above, FIGS. 7A-7C are provided as one or more examples. Other examples may differ from what is described with regard to FIGS. 7A-7C.

Figure 8:
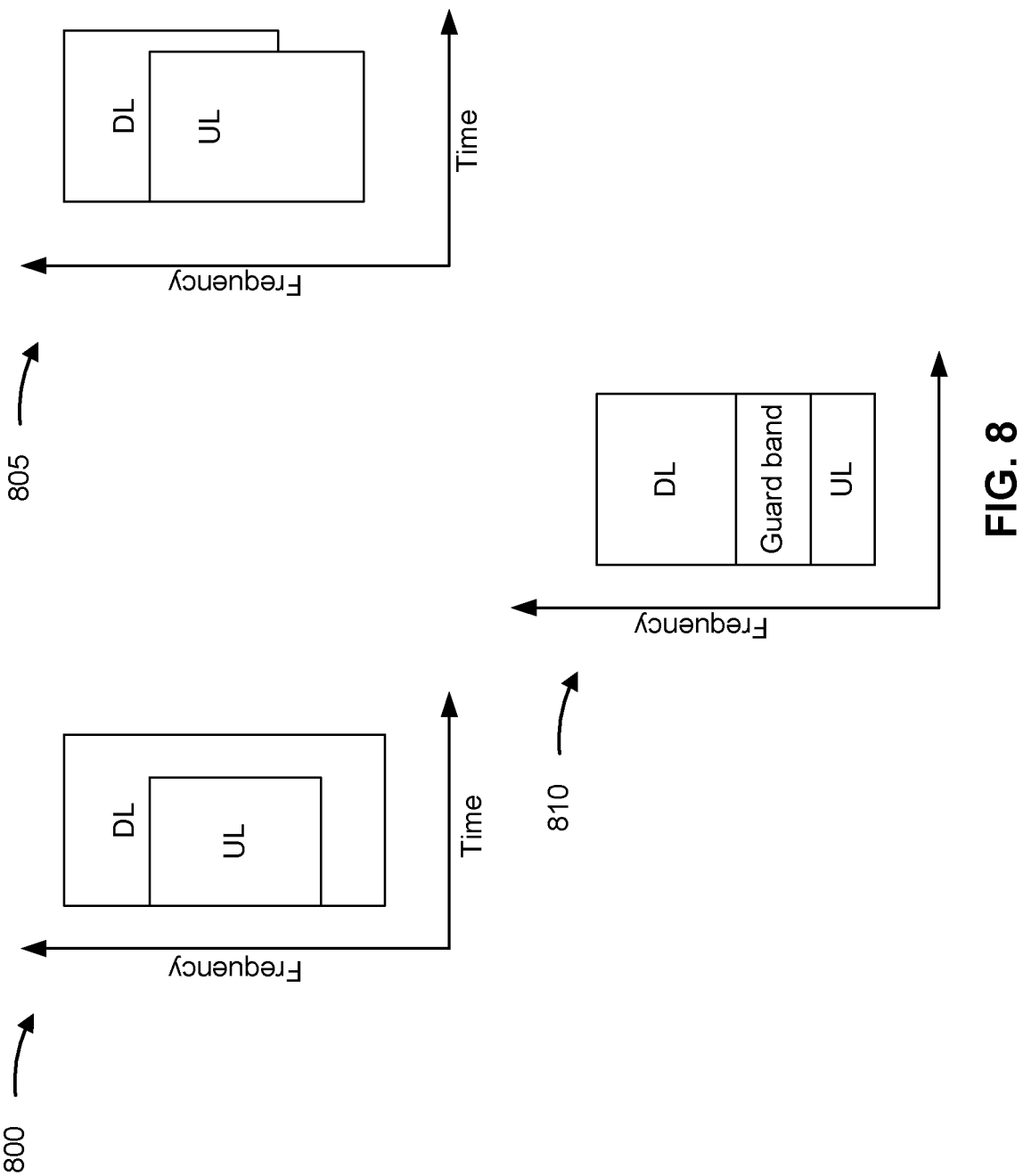
FIG. 8 is a diagram illustrating examples of FD communication in a wireless network, in accordance with the present disclosure.

FIG. 8 is a diagram illustrating examples 800, 805, and 810 of FD communication in a wireless network, in accordance with the present disclosure.

As shown in FIG. 8, examples 800 and 805 show examples of IBFD communication. In IBFD, a UE may transmit an uplink communication to a network node and receive a downlink communication from the network node on the same time and frequency resources. As shown in example 800, in a first example of IBFD, the time and frequency resources for uplink communication may fully overlap with the time and frequency resources for downlink communication. As shown in example 805, in a second example of IBFD, the time and frequency resources for uplink communication may partially overlap with the time and frequency resources for downlink communication.

As further shown in FIG. 8, example 810 shows an example of SBFD communication, which may also be referred to as sub-band frequency division duplex (SBFDD) or flexible duplex. In SBFD, a network node may transmit a downlink communication to a UE and receive an uplink communication from the same UE or a different UE at the same time, but on different frequency resources. For example, the different frequency resources may be sub-bands of a frequency band, such as a time division duplexing (TDD) band. In this case, the frequency resources used for downlink communication may be separated from the frequency resources used for uplink communication, in the frequency domain, by a guard band.

In some examples, channel characteristics, communication parameters, and similar properties may differ between an FD set of symbols (e.g., slots), such as slots semi-statically configured as SBFD slots, and a non-FD set of symbols (sometimes referred to as a TDD set of symbols), such as slots semi-statically configured as non-SBFD slots. For example, a link quality between an FD set of symbols and a non-FD set of symbols may differ because in an FD set of symbols there may be residual interference (sometimes referred to as crosslink interference (CLI)) in addition to inter-network-node interference, while a non-FD set of symbols may only experience inter-network-node interference. Moreover, a network node may use a different reception combiner or different reception beam in the FD set of symbols than is used in the non-FD set of symbols because a reception combiner or reception beam used in the non-FD set of symbols may be jammed by interference and/or CLI in the FD set of symbols. Moreover, uplink frequency resources associated with the FD set of symbols and the non-FD set of symbols may be different, such as where frequency resources associated with an SBFD slot may have a smaller span than a span of frequency resources associated with the non-SBFD slot. Additionally, or alternatively, a UE 120 may use a different transmission power or per-RB power in the FD set of symbols and the non-FD set of symbols. Moreover, a reception (e.g., uplink) panel at a network node 110 may be different in the FD set of symbols and the non-FD set of symbols, and/or the virtualization of port to antenna elements may be different in the FD set of symbols and the non-FD set of symbols, such as for a purpose of utilizing a baseband transceiver unit (TXRU) more efficiently.

Accordingly, in some examples, a UE 120 may be configured with different SRS resource sets for the FD set of symbols and the non-FD set of symbols, or else may be configured with different groups of SRS resource for the FD set of symbols and the non-FD set of symbols. More particularly, in some examples, a UE 120 may be configured with two SRS resource sets, with a first SRS resource set corresponding to the FD set of symbols and a second SRS resource set corresponding to the non-FD set of symbols. In some examples, this may be referred to as "duplex-specific SRS resource sets configuration." In some other examples, a UE 120 may be configured with a single SRS resource set, with a first group of SRS resources of the SRS resource set (e.g., a group of N SRS resources) corresponding to the FD set of symbols and a second group of SRS resources of the SRS resource set (e.g., a group of M SRS resources) corresponding to the non-FD set of symbols (e.g., the UE 120 may be configured with a single SRS resource set with different parameters for the N SRS resources associated with the FD set of symbols and the M SRS resources associated with the non-FD set of symbols). In some examples, this may be referred to as "shared SRS resources for FD and non-FD."

In examples in which a UE 120 is to transmit an uplink transmission repetition (e.g., a PUSCH repetition or a PUCCH repetition, such as one of the uplink transmission repetitions described above in connection with FIGS. 5-6B), potential repetition occasions may extend across FD sets of symbols (e.g., SBFD slots) and non-FD sets of symbols (e.g., non-SBFD slots or TDD slots). Accordingly, SRS resources associated with the potential repetition occasions may differ, such as being associated with different SRS resource sets (in the case of duplex-specific SRS resource sets configuration) or being associated with different groups of SRS resources within an SRS resource set (in the case of shared SRS resources for FD and non-FD). However, there is no mechanism for a network node 110 to signal to a UE 120 which SRS resources are to be used for a given uplink transmission repetition and/or whether a given uplink trans- mission repetition is to extend across the FD set of symbols and the non-FD set of symbols. This may result in commu- nication errors when a UE 120 that is configured with the SRS resources associated with the FD set of symbols and the SRS resources associated with the non-FD set of symbols performs an uplink transmission repetition, leading to high power, computing, and network resource consumption to correct communication errors and otherwise inefficient usage of network resources.

Some techniques and apparatuses described herein enable signaling of SRS resources that are to be used for a given uplink transmission repetition and/or an indication of whether a given uplink transmission repetition is to extend across an FD set of symbols and a non-FD set of symbols. In some aspects, a UE may be configured with SRS resources associated with an FD set of symbols (e.g., one or more SBFD slots) and SRS resources associated with a non-FD set of symbols (e.g., one or more non-SBFD slots). For example, the UE may be configured with two SRS resource sets, one corresponding to the FD set of symbols and one corresponding to the non-FD set of symbols, or else the UE may be configured with one SRS resource set that includes a first group of SRS resources associated with the FD set of symbols and a second group of resources associ- ated with the non-FD set of symbols. The UE may transmit multiple SRSs using the configured resources (e.g., one using the SRS resources associated with the FD set of symbols and another using the SRS resources associated with the non-FD set of symbols), and, based at least in part on the SRS transmissions, receive a downlink communica- tion (e.g., an RRC communication and/or a DCI communi- cation) indicating one or more SRS resources that are to be used for an uplink transmission repetition (e.g., a PUSCH repetition or a PUCCH repetition). Based at least in part on the downlink communication, the UE may identify whether the uplink transmission repetition is to extend across the FD set of symbols and the non-FD set of symbols, or else whether the uplink transmission repetition is to be confined to one of only the FD set of symbols or only the non-FD set of symbols. Accordingly, the UE may transmit the uplink transmission repetition in one of only the FD set of symbols, only the non-FD set of symbols, or both the FD set of symbols and the non-FD set of symbols. As a result, the network node and the UE may communicate with a reduced error rate, resulting in reduced power, computing, and network resource consumption that may otherwise be required to correct communication errors, and otherwise more efficient usage of network resources.

As indicated above, FIG. 8 is provided as an example. Other examples may differ from what is described with respect to FIG. 8.

FIGS. 9A-9F are diagrams illustrating an example 900 associated with uplink transmission repetition for FD and non-FD sets of symbols, in accordance with the present disclosure. Example 900 includes communication between a network node 110 and a UE 120. In some aspects, the network node 110 and the UE 120 may be included in a wireless network, such as wireless network 100. The net- work node 110 and the UE 120 may communicate via a wireless access link, which may include an uplink and a downlink. In some aspects, one or both of the network node 110 and the UE 120 may be capable of communicating in an FD mode. Moreover, in some aspects, the UE 120 may have a capability of identifying when the network node 110 is communicating in an FD mode. In that regard, in some aspects, the UE 120 may be referred to as an SBFD-aware UE.

Figure 9A:
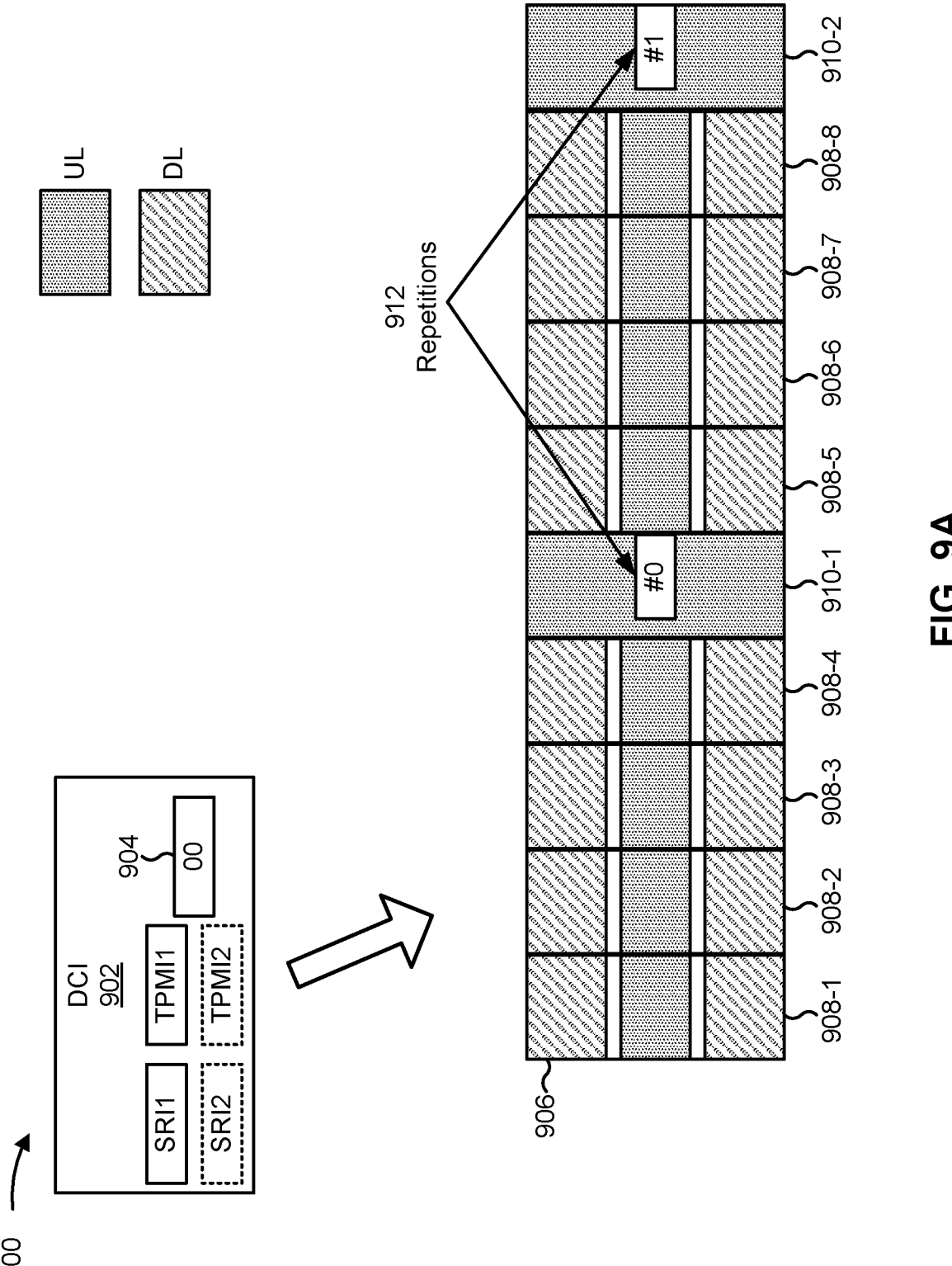
FIGS. 9A-9F are diagrams illustrating an example associated with uplink transmission repetition for FD and non-FD sets of symbols, in accordance with the present disclosure.

As shown in FIG. 9A, the network node 110 may transmit, and the UE 120 may receive, a downlink communication indicating certain parameters associated with an uplink transmission repetition, such as a PUSCH repetition or a PUCCH repetition. In some aspects, the network node 110 may transmit, and the UE 120 may receive, a DCI commu- nication 902 indicating certain parameters associated with the uplink transmission repetition, as shown in FIG. 9A. Additionally, or alternatively, the network node 110 may transmit, and the UE 120 may receive, an RRC communi- cation indicating certain parameters associated with the uplink transmission repetition, which may be transmitted instead of the DCI communication 902 and/or which may indicate certain of the parameters described herein as being indicated by the DCI communication 902. For example, in aspects associated with a Type 1 CG PUSCH and/or a periodic or semi-persistent PUCCH, certain parameters described herein as being indicated by the DCI communi- cation 902 may instead be indicated by an RRC communi- cation.

In some aspects, the DCI communication 902 (and/or an RRC communication, as described above) may include one or more SRIs associated with the uplink transmission rep- etition (shown as SRI1 and SRI2 in FIG. 9A), one or more TPMIs associated with the uplink transmission repetition (shown as TPMI1 and TPMI2 in FIG. 9A), and a duplex repetition indicator field 904. In some aspects, only one SRI field and/or TPMI field may be needed and/or included in the DCI communication 902, which is described in more detail below. This is shown in FIG. 9A using dashed lines for the SRI2 and TPMI2, indicating that, in this aspect, the DCI communication 902 may omit the second SRI field and/or the second TPMI field.

In some aspects, the duplex repetition indicator field 904 may be a dedicated bitfield used to indicate whether an uplink transmission repetition is to span repetition occasions in FD slots and non-FD slots. In some other aspects, the duplex repetition indicator field 904 may be an existing field of a downlink communication (e.g., the DCI communication 902 or an RRC communication) that is used to indicate whether an uplink transmission repetition is to span repeti- tion occasions in FD slots and non-FD slots. For example, in some aspects the duplex repetition indicator field 904 may be an SRS resource set indicator field that is reused for a purpose of indicating whether an uplink transmission rep- etition is to span repetition occasions in FD slots and non-FD slots.

In some aspects, a codepoint or similar parameter may be indicated by the duplex repetition indicator field 904, which may indicate whether an uplink transmission repetition is duplex-specific (e.g., whether the uplink transmission rep- etition is to be transmitted using repetition occasions in only one of the FD set of symbols or the non-FD set of symbols), or whether an uplink transmission repetition is not duplex- specific (e.g., whether the uplink transmission repetition is to be transmitted using repetition occasions in both the FD set of symbols or the non-FD set of symbols). For example, in the aspect shown in FIG. 9A, the duplex repetition indicator field 904 indicates a codepoint of "00," which may indicate non-FD repetition (e.g., which may indicate that the uplink transmission repetition is to be transmitted using only repetition occasions in the non-FD set of symbols). In that regard, when transmitting the uplink transmission repetition, the UE 120 may use only occasions occurring in the non-FD set of symbols (e.g., non-SBFD slots).

More particularly, as shown in FIG. 9A, and as indicated by reference number 906, the UE 120 may be configured with a slot pattern including both FD slots 908 (e.g., SBFD slots, shown as a first FD slot 908-1 through an eighth FD slot 908-8) and non-FD slots 910 (e.g., non-SBFD slots, shown as a first non-FD slot 910-1 and a second non-FD slot 910-2). Based at least in part on receiving the DCI communication 902 that schedules an uplink transmission repetition and that indicates the codepoint "00" in the duplex repetition indicator field 904, the UE 120 may identify that the uplink transmission repetition is to be transmitted using only non-FD slots 910. Accordingly, as indicated by reference number 912, the UE 120 may transmit a first repetition (shown as repetition #0) in the first non-FD slot 910-1, and a second repetition (shown as repetition #1) in the second non-FD slot 910-2, skipping any repetition occasions occurring in FD slots 908 (e.g., skipping repetition occasions occurring in the fifth FD slot 908-5 through the eighth FD slot 908-8).

In aspects in which the UE 120 is configured with two SRS resource sets with usage set to codebook or non-codebook, with one SRS resource set associated with the FD slots 908 and another SRS resource set associated with the non-FD slots 910, the indication in the duplex repetition indicator field 904 (e.g., the codepoint "00" in the example depicted in FIG. 9A) may serve to indicate that the SRS resource set corresponding to the non-FD slots 910 is associated with the uplink transmission repetition. Put another way, in aspects involving two SRS resource sets, with a first SRS resource set associated with the FD set of symbols and the second SRS resource set associated with the non-FD set of symbols, the codepoint "00" may indicate that the second SRS resource set is associated with the uplink transmission repetition. Moreover, in such aspects, the DCI communication 902 may include a single SRI (e.g., SRI1) and/or a single TPMI (e.g., TPMI1, for CB based transmissions) that are associated with the SRS resource set corresponding to the non-FD slots 910. The DCI communication 902 may indicate additional parameters, such as a number of layers parameter (sometimes referred to as numLayers) that is associated with the SRS resource set corresponding to the non-FD slots 910.

In aspects in which the UE 120 is configured with a single SRS resource set with usage set to codebook or non-codebook, with a first group of SRS resources (e.g., N SRS resources) associated with the FD slots 908 and a second group of SRS resources (e.g., M SRS resources) associated with the non-FD slots 910, the indication in the duplex repetition indicator field 904 (e.g., the codepoint "00" in the example depicted in FIG. 9A) may serve to indicate that the group of SRS resources corresponding to the non-FD slots 910 (e.g., the M SRS resources) are associated with the uplink transmission repetition. Put another way, in aspects involving a single SRS resource set, with a first group of SRS resources of the SRS resource set associated with the FD set of symbols and a second group of SRS resources of the SRS resource set associated with the non-FD set of symbols, the codepoint "00" may indicate that the second group of SRS resources is associated with the uplink transmission repetition. Moreover, in such aspects, the DCI communication 902 may include a single SRI (e.g., SRI1) and/or a single TPMI (e.g., TPMI1, for CB based transmissions) that are associated with the group of SRS resources (e.g., the M SRS resources) corresponding to the non-FD slots 910. The DCI communication 902 may indicate additional parameters, such as a number of layers parameter (e.g., numLayers) that is associated with the group of SRS resources (e.g., the M SRS resources) corresponding to the non-FD slots 910.

Figure 9B:
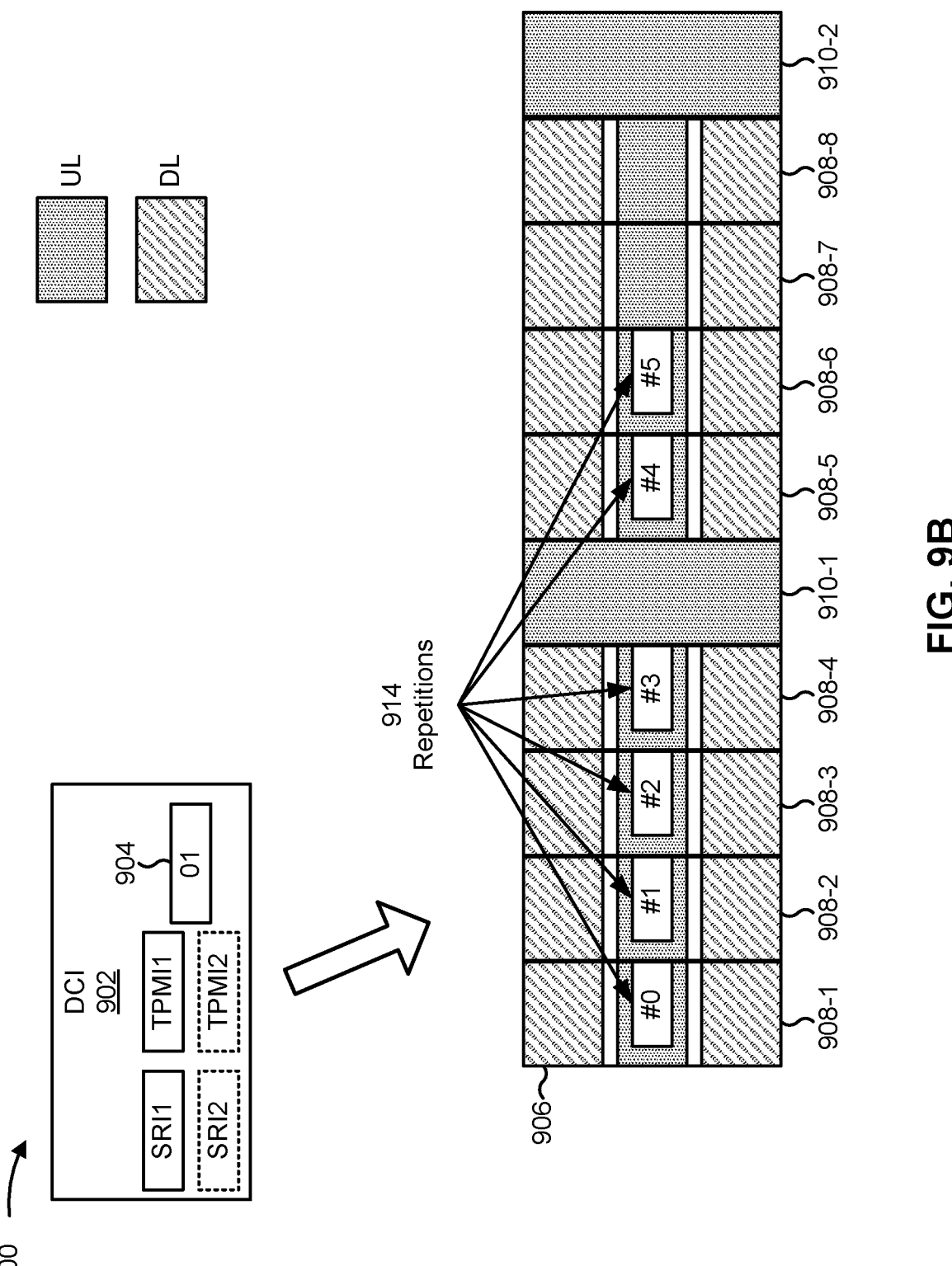

In the aspect shown in FIG. 9B, the duplex repetition indicator field 904 indicates a codepoint of "01," which may indicate FD repetition (e.g., which may indicate that the uplink transmission repetition is to be transmitted using only repetition occasions in the FD set of symbols). In that regard, when transmitting the uplink transmission repetition, the UE 120 may use only occasions occurring in FD sets of symbols (e.g., SBFD slots). More particularly, based at least in part on receiving the DCI communication 902 that schedules an uplink transmission repetition and that indicates the codepoint "01" in the duplex repetition indicator field 904, the UE 120 may identify that the uplink transmission repetition is to be transmitted using only FD slots 908. Accordingly, as indicated by reference number 914, the UE 120 may transmit a first repetition (shown as repetition #0) in the first FD slot 908-1, a second repetition (shown as repetition #1) in the second FD slot 908-2, and so forth (shown through a sixth repetition, repetition #5, in the sixth FD slot 908-6), skipping any repetition occasions occurring in non-FD slots 910 (e.g., skipping a repetition occasion occurring in the first non-FD slot 910-1).

In aspects in which the UE 120 is configured with two SRS resource sets with usage set to codebook or non-codebook, one associated with the FD slots 908 and another one associated with the non-FD slots 910, the indication in the duplex repetition indicator field 904 (e.g., the codepoint "01" in the example depicted in FIG. 9B) may indicate that the SRS resource set corresponding to the FD slots 908 is associated with the uplink transmission repetition. Put another way, in aspects involving two SRS resource sets, with a first SRS resource set associated with the FD set of symbols and the second SRS resource set associated with the non-FD set of symbols, the codepoint "01" may indicate that the first SRS resource set is associated with the uplink transmission repetition. Moreover, in such aspects, the DCI communication 902 may include a single SRI (e.g., SRI1), a single TPMI (e.g., TPMI1, for CB based transmissions), and/or a number of layers parameter (e.g., numLayers) that are associated with the SRS resource set corresponding to the FD slots 908.

In aspects in which the UE 120 is configured with a single SRS resource set with usage set to codebook or non-codebook, with a first group of SRS resources (e.g., N SRS resources) associated with the FD slots 908 and a second group of SRS resources (e.g., M SRS resources) associated with the non-FD slots 910, the indication in the duplex repetition indicator field 904 (e.g., the codepoint "01" in the example depicted in FIG. 9B) may indicate that the group of SRS resources corresponding to the FD slots 910 (e.g., the N SRS resources) are associated with the uplink transmission repetition. Put another way, in aspects involving a single SRS resource set, with a first group of SRS resources of the SRS resource set associated with the FD set of symbols and a second group of SRS resources of the SRS resource set associated with the non-FD set of symbols, the codepoint "01" may indicate that the first group of SRS resources are associated with the uplink transmission repetition. Moreover, in such aspects, the DCI communication 902 may include a single SRI (e.g., SRI1), a single TPMI (e.g., TPMI1, for CB-based transmissions), and/or a number of layers parameter (e.g., numLayers) that are associated with the group of SRS resources (e.g., the N SRS resources) corresponding to the FD slots 908.

Figure 9C:
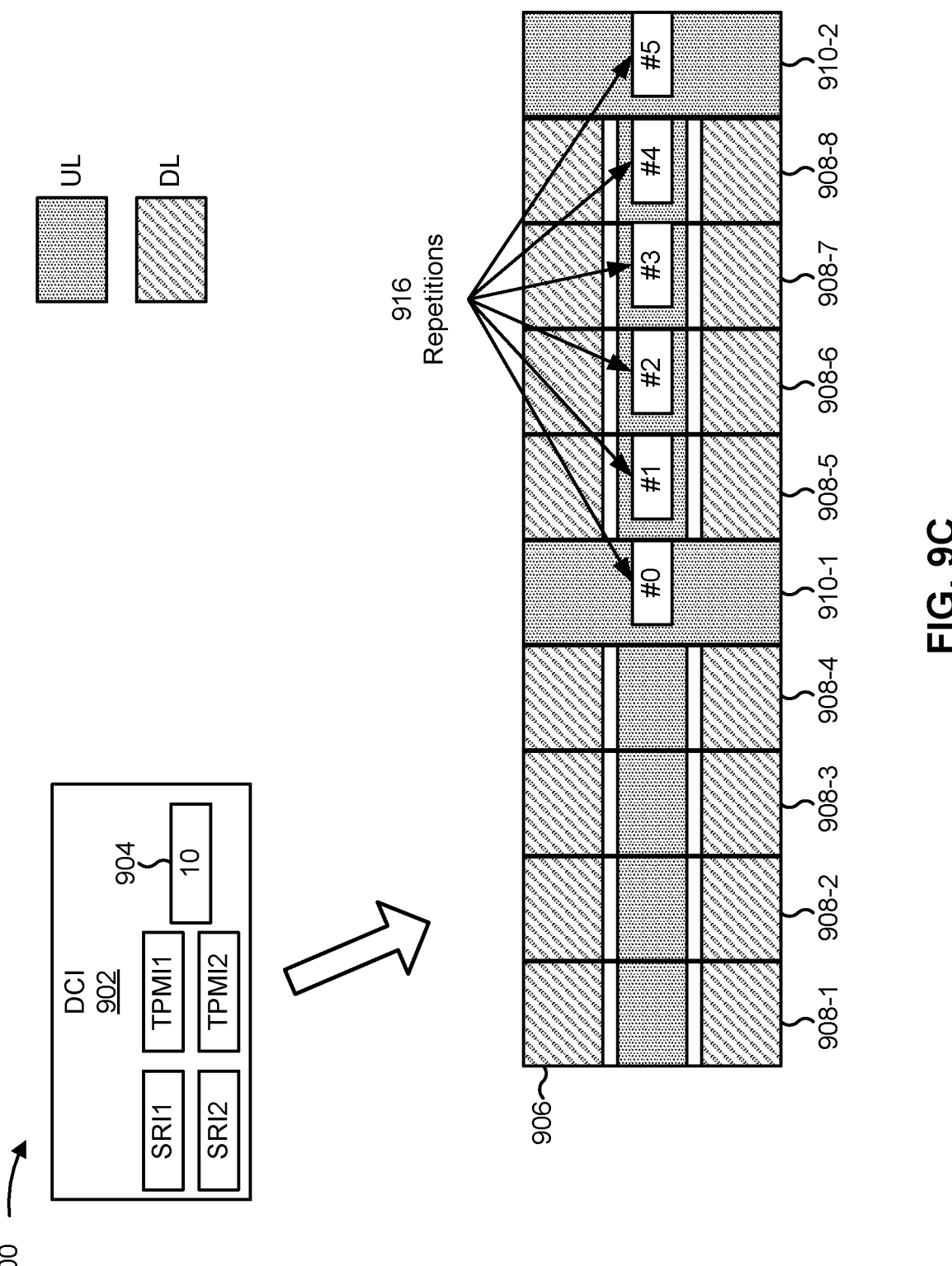

In the aspect shown in FIG. 9C, the duplex repetition indicator field 904 indicates a codepoint of "10," which may indicate non-duplex-specific repetition (e.g., which may indicate that the uplink transmission repetition is to be transmitted using repetition occasions across the FD set of symbols and the non-FD set of symbols). In that regard, when transmitting the uplink transmission repetition, the UE 120 may use occasions occurring in both FD sets of symbols (e.g., SBFD slots) and non-FD sets of symbols (e.g., non-SBFD slots). More particularly, based at least in part on receiving the DCI communication 902 that schedules an uplink transmission repetition and that indicates the codepoint "10" in the duplex repetition indicator field 904, the UE 120 may identify that the uplink transmission repetition is to be transmitted using both FD slots 908 and non-FD slots. Moreover, the codepoint "10" may further indicate that a first slot for transmission (e.g., when available slot counting is enabled for repetition) is mapped to a first available non-FD slot 910. Accordingly, as indicated by reference number 916, the UE 120 may transmit a first repetition (shown as repetition #0) in the first non-FD slot 910-1, a second repetition (shown as repetition #1) in the next available repetition occasion, which in this example is the fifth FD slot 908-5, and so forth for each consecutive repetition (shown through a sixth repetition, repetition #5, in the second non-FD slot 910-2), without skipping any available repetition occasions.

In aspects in which the UE 120 is configured with two SRS resource sets with usage set to codebook or non-codebook, one associated with the FD slots 908 and another one associated with the non-FD slots 910, the indication in the duplex repetition indicator field 904 (e.g., the codepoint "10" in the example depicted in FIG. 9C) may indicate that both SRS resource sets are associated with the uplink transmission repetition. Put another way, in aspects involving two SRS resource sets, with a first SRS resource set associated with the FD set of symbols and the second SRS resource set associated with the non-FD set of symbols, the codepoint "10" may indicate that both the first SRS resource set and the second SRS resource set are associated with the uplink transmission repetition. Moreover, in such aspects, the DCI communication 902 may include two SRIs (e.g., SRI1 and SRI2), with the first SRI corresponding to the first SRS resource set and the second SRI corresponding to the second SRS resource set, and two TPMIs (e.g., TPMI1 and TPMI2, for CB based transmissions), with the first TPMI corresponding to the first SRS resource set and the second TPMI corresponding to the second SRS resource set. In some aspects, the DCI communication may further indicate a timing offset (e.g., in number of slots) between a slot containing the DCI communication 902 (e.g., a slot carrying a grant that schedules a PUSCH repetition) and a first slot containing the scheduled transmission (e.g., the PUSCH repetition scheduled via the DCI communication 902), which is sometimes referred to as a K2 value. In such aspects, the timing offset (e.g., the K2 value) may serve as a reference for a first available slot based on the codepoint. Aspects of the K2 value are described in more detail below. In this aspect, the repetitions #0 and #5 of the uplink transmission may be associated with the non-FD SRS resource set with one SRI and one TPMI. The uplink repetitions #1. #2. #3, and #4 may be associated with the FD SRS resource set with a different SRI and a different TPMI.

In aspects in which the UE 120 is configured with a single SRS resource set with usage set to codebook or non-codebook, with a first group of SRS resources (e.g., N SRS resources) associated with the FD slots 908 and a second group of SRS resources (e.g., M SRS resources) associated with the non-FD slots 910, the indication in the duplex repetition indicator field 904 (e.g., the codepoint "10" in the example depicted in FIG. 9B) may indicate that both the group of SRS resources associated with the FD slots 908 (e.g., the N SRS resources) and the group of SRS resources associated with the non-FD slots 910 (e.g., the M SRS resources) are associated with the uplink transmission repetition. Put another way, in aspects involving a single SRS resource set, with a first group of SRS resources of the SRS resource set associated with the FD set of symbols and a second group of SRS resources of the SRS resource set associated with the non-FD set of symbols, the codepoint "10" may indicate that both the first group of SRS resources and the second group of SRS resources are associated with the uplink transmission repetition. Moreover, in such aspects, the DCI communication 902 may include two SRIs (e.g., SRI1 and SRI2), with the first SRI corresponding to the first group of SRS resources (e.g., the N resources) and the second SRI corresponding to the second group of SRS resources (e.g., the M resources), and two TPMIs (e.g., TPMI1 and TPMI2, for CB based transmissions), with the first TPMI corresponding to the first group of SRS resources (e.g., the N resources) and the second TPMI corresponding to the second group of SRS resources (e.g., the M resources). In some aspects, a size of the SRI bitfields and/or the TPMI bitfields may be based on a maximum value between a quantity of SRS resources included in the first group of SRS resources (e.g., N) and a quantity of SRS resources included in the second group of SRS resources (e.g., M). The first SRI (e.g., SRI1) may be interpreted with a number of SRS resources (sometimes referred to as $N_{SRS}$ or $N_{SRS_{0,2}}$) equal to the quantity of SRS resources included in the first group of SRS resources (e.g., N), and the second SRI (e.g., SRI2) may be interpreted with a number of SRS resources (e.g., $N_{SRS}$ or $N_{SRS_{0,2}}$) equal to the quantity of SRS resources included in the second group of SRS resources (e.g., M). In some aspects, the DCI communication 902 may further indicate a timing offset (e.g., a K2 value) that serves as a reference for a first available slot based on the codepoint, which is described in more detail below. In this aspect, the repetitions #0 and #5 of the uplink transmission may be associated with the non-FD group of resources with one SRI and one TPMI. The uplink repetitions #1, #2. #3, and #4 may be associated with the FD group of resources with a different SRI and a different TPMI.

Figure 9D:
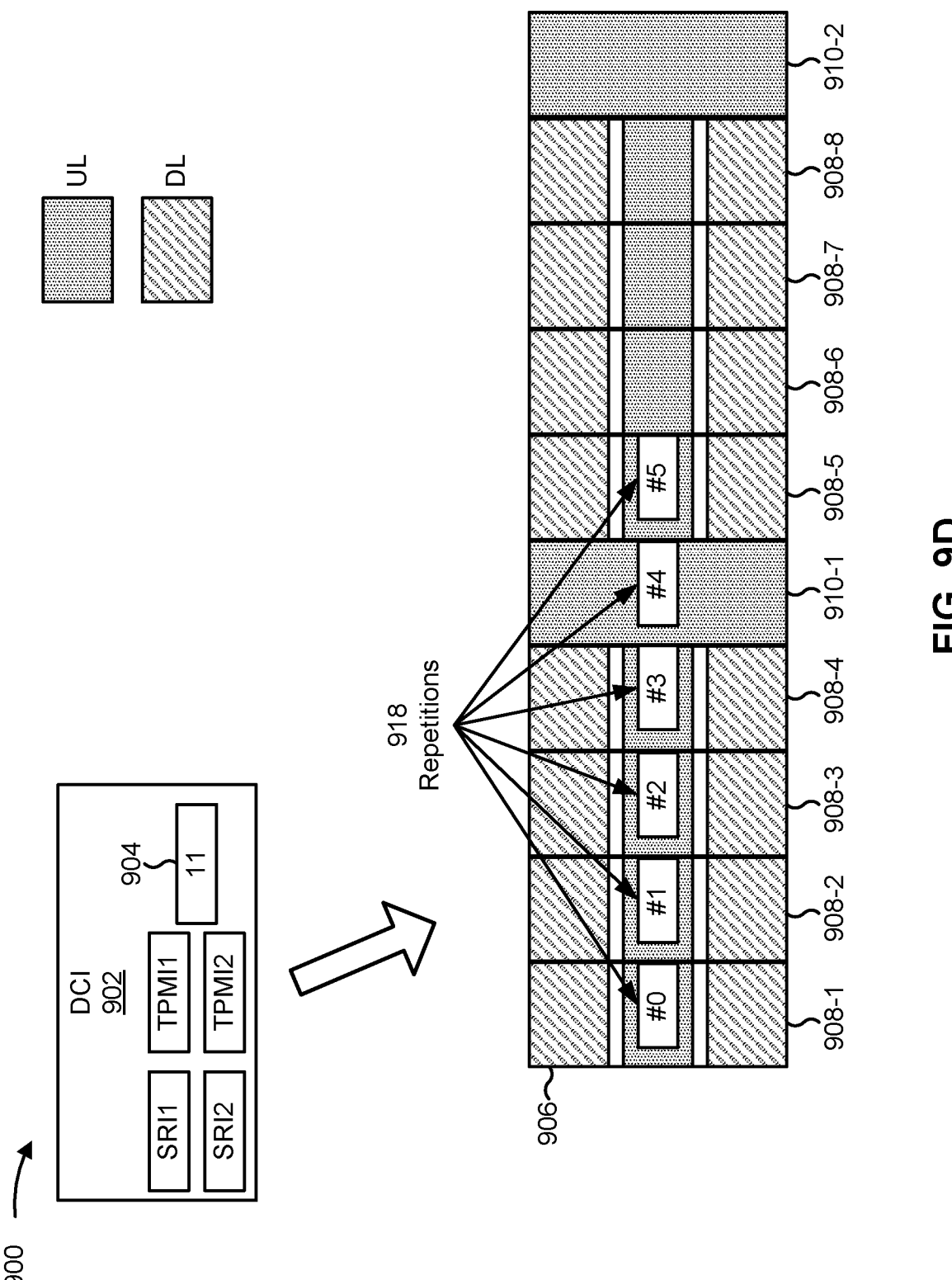
Figure 9E:
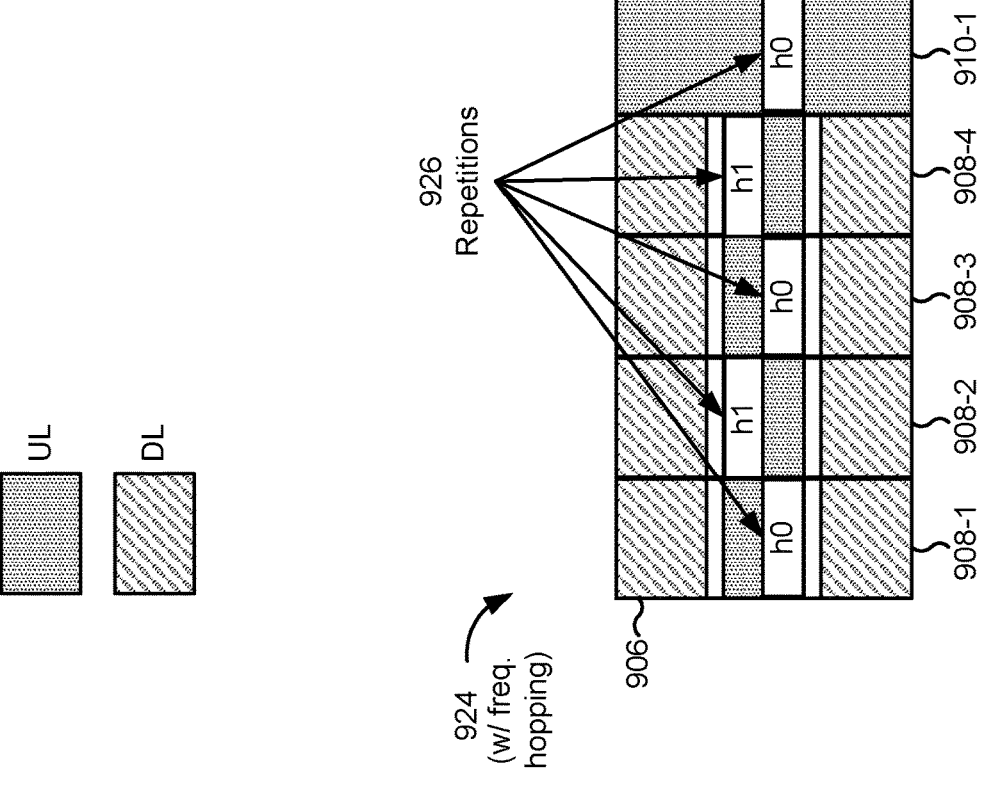

In the aspect shown in FIG. 9D, the duplex repetition indicator field 904 indicates a codepoint of "11," which may indicate non-duplex-specific repetition (e.g., which may indicate that the uplink transmission repetition is to be transmitted using repetition occasions across the FD set of symbols and the non-FD set of symbols). In that regard, when transmitting the uplink transmission repetition, the UE 120 may use occasions occurring in both FD sets of symbols (e.g., SBFD slots) and non-FD sets of symbols (e.g., non-SBFD slots). More particularly, based at least in part on receiving the DCI communication 902 that schedules an uplink transmission repetition and that indicates the codepoint "11" in the duplex repetition indicator field 904, the UE 120 may identify that the uplink transmission repetition is to be transmitted using both FD slots 908 and non-FD slots. Moreover, the codepoint "11" may further indicate that a first slot for transmission (e.g., when available slot counting is enabled for repetition) is mapped to a first available FD slot 908. Accordingly, as indicated by reference number 918, the UE 120 may transmit a first repetition (shown as repetition #0) in the first FD slot 908-1, a second repetition (shown as repetition #1) in the next available repetition occasion, which in this example is the second FD slot 908-2, and so forth for each consecutive repetition (shown through a sixth repetition, repetition #5, in the fifth FD slot 908-5), without skipping any available repetition occasions.

In aspects in which the UE 120 is configured with two SRS resource sets with usage set to codebook or non-codebook, one associated with the FD slots 908 and one associated with the non-FD slots 910, the indication in the duplex repetition indicator field 904 (e.g., the codepoint "11" in the example depicted in FIG. 9D) may indicate that both SRS resource sets are associated with the uplink transmission repetition. Put another way, in aspects involving two SRS resource sets, with a first SRS resource set associated with the FD set of symbols and the second SRS resource set associated with the non-FD set of symbols, the codepoint "11" may indicate that both the first SRS resource set and the second SRS resource set are associated with the uplink transmission repetition. Moreover, in such aspects, the DCI communication 902 may include two SRIs (e.g., SRI1 and SRI2), with the first SRI corresponding to the first SRS resource set and the second SRI corresponding to the second SRS resource set, and two TPMIs (e.g., TPMI1 and TPMI2, for CB based transmissions), with the first TPMI corresponding to the first SRS resource set and the second TPMI corresponding to the second SRS resource set. In some aspects, the DCI communication may further indicate a timing offset (e.g., a K2 value), which may serve as a reference for a first available slot based on the codepoint, as described in more detail below. In this aspect, the repetitions #0, #1, #2, #3, and #5 of the uplink transmission may be associated with the FD SRS resource set with one SRI and one TPMI. The uplink repetition #4 may be associated with the non-FD SRS resource set with a different SRI and a different TPMI.

In aspects in which the UE 120 is configured with a single SRS resource set with usage set to codebook or non-codebook, with a first group of SRS resources (e.g., N SRS resources) associated with the FD slots 908 and a second group of SRS resources (e.g., M SRS resources) associated with the non-FD slots 910, the indication in the duplex repetition indicator field 904 (e.g., the codepoint "11" in the example depicted in FIG. 9D) may indicate that both the group of SRS resources associated with the FD slots 908 (e.g., the N SRS resources) and the group of SRS resources associated with the non-FD slots 910 (e.g., the M SRS resources) are associated with the uplink transmission repetition. Put another way, in aspects involving a single SRS resource set, with a first group of SRS resources of the SRS resource set associated with the FD set of symbols and a second group of SRS resources of the SRS resource set associated with the non-FD set of symbols, the codepoint "11" may indicate that both the first group of SRS resources and the second group of SRS resources are associated with the uplink transmission repetition. Moreover, in such aspects, the DCI communication 902 may include two SRIs (e.g., SRI1 and SRI2), with the first SRI corresponding to the first group of SRS resources (e.g., the N resources) and the second SRI corresponding to the second group of SRS resources (e.g., the M resources), and two TPMIs (e.g., TPMI1 and TPMI2, for CB based transmissions), with the first TPMI corresponding to the first group of SRS resources (e.g., the N resources) and the second TPMI corresponding to the second group of SRS resources (e.g., the M resources). In some aspects, a size of the SRI bitfields and/or the TPMI bitfields may be based on a maximum value between a quantity of SRS resources included in the first group of SRS resources (e.g., N) and a quantity of SRS resources included in the second group of SRS resources (e.g., M). The first SRI (e.g., SRI1) may be interpreted with a number of SRS resources (e.g., $N_{SRS}$ or $N_{SRS_{0,2}}$) equal to the quantity of SRS resources included in the first group of SRS resources (e.g., N), and the second SRI (e.g., SRI2) may be interpreted with a number of SRS resources (e.g., $N_{SRS}$ or $N_{SRS_{0,2}}$) equal to the quantity of SRS resources included in the second group of SRS resources (e.g., M). In some aspects, the DCI communication may further indicate a timing offset (e.g., a K2 parameter) that serves as a reference for a first available slot based on the codepoint, which is described in more detail below. In this aspect, the repetitions #0, #1, #2, #3, and #5 of the uplink transmission may be associated with the FD group of resources with one SRI and one TPMI. The uplink repetition #4 may be associated with the non-FD group of resources with a different SRI and a different TPMI.

In some aspects, one or more indications (e.g., code-points) may be included in the DCI communication 902 or another downlink communication (e.g., an RRC communication) in order to indicate whether a frequency offset is to be applied to repetitions occurring in different slot types. For example, in the aspect shown in FIG. 9E, the duplex repetition indicator field 904 indicates a codepoint of "10," which may indicate non-duplex-specific repetition (e.g., which may indicate that the uplink transmission repetition is to be transmitted using repetition occasions across the FD set of symbols and the non-FD set of symbols). Moreover, in the example depicted in FIG. 9E, the codepoint "10" may further indicate that no frequency offset should be added to repetitions. Accordingly, the UE 120 may transmit all repetitions, whether in FD slots 908 or non-FD slots 910, using the same frequency resources.

More particularly, as shown by reference number 920, in examples in which frequency hopping is not configured, each repetition may be transmitted using the same frequency resources. More particularly, as indicated by reference number 922, the UE 120 may transmit a first repetition (shown as repetition #0) in the first FD slot 908-1 using certain frequency resources, a second repetition (shown as repetition #1) in the next available repetition occasion, which in this example is the second FD slot 908-2, using the same frequency resources, and so forth for each consecutive repetition (shown through a fifth repetition, repetition #4, in the first non-FD slot 910-1), without applying a frequency offset to repetitions occurring in different slot types. Similarly, as shown by reference number 924, in examples in which frequency hopping is configured, each instance of a given frequency hop may be transmitted using the same frequency resources. More particularly, as indicated by reference number 926, the UE 120 may transmit a first instance of a first frequency hop (shown as h0) in the first FD slot 908-1, a second instance of the first frequency hop in the third FD slot 908-3, and a third instance of the first frequency hop in the first non-FD slot 910-1, using the same frequency resources in the FD slots 908 and the non-FD slot 910. Similarly, the UE 120 may transmit a first instance of a second frequency hop (shown as h1) in the second FD slot 908-2, and a second instance of the second frequency hop in the fourth FD slot 908-4, using the same frequency resources for each hop.

Figure 9F:
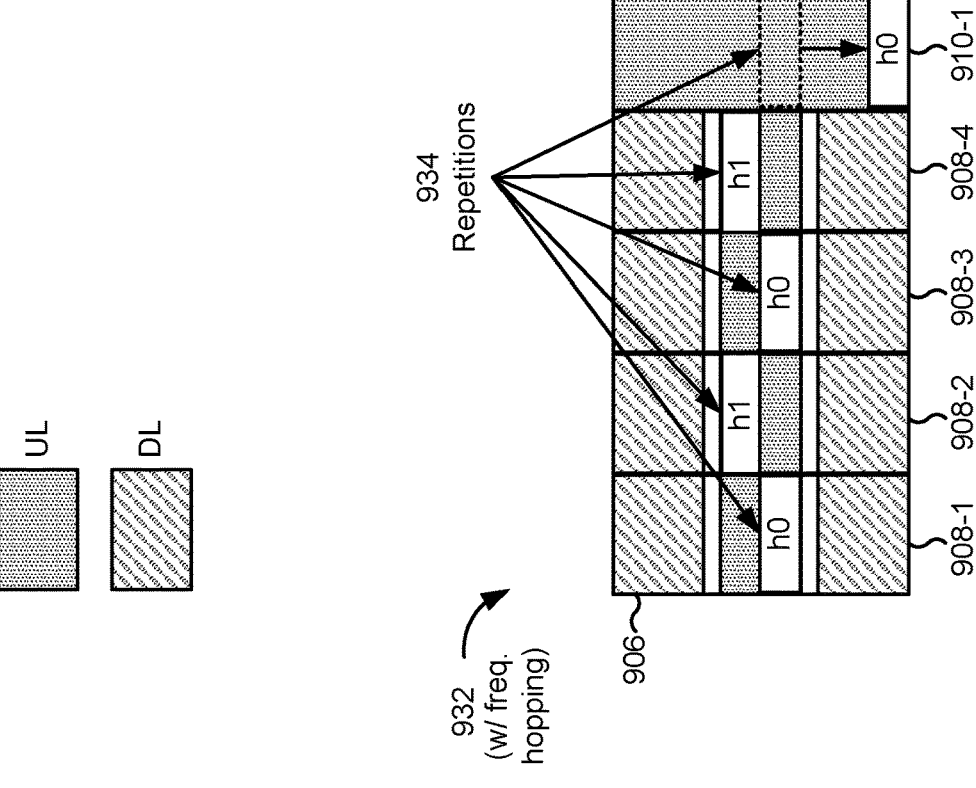

In the aspect shown in FIG. 9F, the duplex repetition indicator field 904 indicates a codepoint of "11," which may indicate non-duplex-specific repetition (e.g., which may indicate that the uplink transmission repetition is to be transmitted using repetition occasions across the FD set of symbols and the non-FD set of symbols). Moreover, in the example depicted in FIG. 9F, the codepoint "11" may further indicate that a frequency offset should be added to repetitions occurring in different slot types. Accordingly, the UE 120 may transmit repetitions occurring in FD slots 908 using a first set of frequency resources and repetitions occurring in non-FD slots 910 using a second set of frequency resources different from the first set of frequency resources.

More particularly, reference number 928 shows an example in which frequency hopping is not configured and a frequency offset is applied to repetitions occurring in different slot types. More particularly, as indicated by reference number 930, the UE 120 may transmit a first repetition (shown as repetition #0) in the first FD slot 908-1 using a first set of frequency resources, a second repetition (shown as repetition #1) in the next available repetition occasion, which in this example is the second FD slot 908-2, using the first set of frequency resources, and so forth for each consecutive repetition in the same slot type (shown through a fourth repetition, repetition #3, in the fourth FD slot 908-4). When a repetition occasion occurs in a different slot type (e.g., a non-FD slot 910), the UE 120 may apply a frequency offset. More particularly, the UE 120 may transmit a fifth repetition (shown as repetition #4) in the first non-FD slot 910-1 by applying a frequency offset, such that the fifth repetition occurs at a bottom of bandwidth associated with the first non-FD slot 910-1. This may permit more efficient allocation of uplink resources among various UEs 120, because the fifth repetition does not occur in the middle of the uplink bandwidth as is the case for the example shown in FIG. 9E. Similarly, as shown by reference number 932, in examples in which frequency hopping is configured, instances of a given frequency hop may be transmitted using a frequency offset. More particularly, as indicated by reference number 934, the UE 120 may transmit a first instance of a first frequency hop (shown as h0) in the first FD slot 908-1 using a first set of frequency resources, a second instance of the first frequency hop in the third FD slot 908-3 using the first set of frequency resources, and a third instance of the first frequency hop in the first non-FD slot 910-1 using a second set of frequency resources by applying a frequency offset to the first set of frequency resources. Similarly, the UE 120 may transmit a first instance of a second frequency hop (shown as h1) in the second FD slot 908-2, and a second instance of the second frequency hop in the fourth FD slot 908-4, using the same frequency resources for each hop (e.g., using a third set of frequency resources).

In some aspects, a single codepoint may be used to signal non-duplex-specific repetition (e.g., to signal that the uplink transmission repetition is to be transmitted using repetition occasions across the FD set of symbols and the non-FD set of symbols), and another parameter, such as a timing offset (e.g., a K2 value) may be used to indicate which slot type should be used for a first repetition of the uplink transmission repetition. For example, in some aspects, the duplex repetition indicator field 904 may indicate a codepoint of "10" to indicate non-duplex-specific repetition (e.g., which may indicate that the uplink transmission repetition is to be transmitted using repetition occasions across the FD set of symbols and the non-FD set of symbols), and the DCI communication 902 may indicate a timing offset (e.g., a K2 value) to indicate a first slot for transmission. Accordingly, when a slot that is offset from a slot containing the DCI communication 902 by the timing offset amount is an FD slot 908, the UE 120 may begin the uplink transmission repetition in an FD slot 908. Similarly, when a slot that is offset from a slot containing DCI communication 902 by the timing offset amount is a non-FD slot 910, the UE 120 may begin the uplink transmission repetition in a non-FD slot 910. In some aspects, a single codepoint with a timing offset (e.g., a K2 value) may be used to indicate non-duplex-specific transmission in instances in which available slot counting is enabled for repetition and/or in aspects in which repetitions are based on physical slot counting.

In some aspects, a single codepoint may be used to signal duplex-specific repetition (e.g., to signal that the uplink transmission repetition is to be transmitted using repetition occasions in only one of the FD set of symbols or the non-FD set of symbols) with a timing offset (e.g., a K2 value) used to indicate which slot type should be used for each repetition of the uplink transmission repetition. Additionally, or alternatively, a single codepoint may be used to signal non-duplex-specific repetition (e.g., to signal that the uplink transmission repetition is to be transmitted using repetition occasions across the FD set of symbols and the non-FD set of symbols) with a timing offset (e.g., a K2 value) used to indicate which slot type should be used for a first repetition of the uplink transmission repetition.

For example, the duplex repetition indicator field 904 may be a dedicated one-bit bitfield (or else may be associated with one-bit of the SRS resource set indicator field) to indicate whether repetition is duplex-specific or not duplex-specific by signaling one of codepoint "0" or codepoint "1." When the duplex repetition indicator field 904 indicates the codepoint "0," the UE 120 may transmit the uplink transmission repetition using only FD slots 908 or only non-FD slots 910. The type of slots to be used (e.g., whether to use only FD slots 908 or only non-FD slots 910) may be indicated via a timing offset (e.g., a K2 value). For example, when a slot that is offset from a slot containing DCI communication 902 by the timing offset amount is an FD slot 908, the UE 120 may use only FD slots 908 for the uplink transmission repetition. Similarly, when a slot that is offset from a slot containing DCI communication 902 by the timing offset amount is a non-FD slot 910, the UE 120 may use only non-FD slots 910 for the uplink transmission repetition.

Similarly, when the duplex repetition indicator field 904 indicates the codepoint "1," the UE 120 may transmit the uplink transmission repetition using both FD slots 908 and non-FD slots 910 (e.g., the codepoint "1" may indicate that the uplink transmission repetition should extend across both FD slots 908 and non-FD slots 908). In such aspects, the DCI communication 902 may indicate a timing offset (e.g., a K2 value) to indicate a first slot for transmission. Accordingly, when a slot that is offset from a slot containing DCI communication 902 by the timing offset amount is an FD slot 908, the UE 120 may begin the uplink transmission repetition in an FD slot 908. Similarly, when a slot that is offset from a slot containing DCI communication 902 by the timing offset amount is a non-FD slot 910, the UE 120 may begin the uplink transmission repetition in a non-FD slot 910.

In some aspects, the DCI communication 902 or a similar downlink communication (e.g., an RRC communication) may be used to signal to the UE 120 that a PUCCH repetition should be transmitted using only the FD set of symbols (e.g., using repetition occasion occurring only in FD slots 908), only the non-FD set of symbols (e.g., using repetition occasions occurring only non-FD slots 910), or using both the FD set of symbols and the non-FD set of symbols (e.g., using repetition occasions occurring in both FD slots 908 and non-FD slots 910). In some aspects, a UE 120 may identify a quantity of repetitions associated with a PUCCH repetitions based at least in part on RRC configurations of a PUCCH repetition number of slots parameter (sometimes referred to as pucch-RepetitionNrofSlots) per PUCCH resource and/or based at least in part an RRC configuration of number of slots parameter (sometimes referred to as nrofSlots) per a PUCCH format configuration. In some aspects, a PUCCH repetition may be an aperiodic PUCCH repetition triggered by a DCI communication (e.g., DCI communication 902), or a periodic or semi-persistent PUCCH repetition configured by an RRC communication.

In some aspects, such as when the DCI communication 902 or another downlink communication (e.g., an RRC communication) is used to trigger a PUCCH repetition, the DCI communication 902 or other downlink communication may include a bitfield to indicate whether the PUCCH repetition is a duplex-specific PUCCH repetition (e.g., whether the PUCCH repetition is to be transmitted using one of only repetition occasions occurring in FD sets of symbols or only repetition occasions occurring in non-FD sets of symbols) or whether the PUCCH repetition is a non-duplex-specific PUCCH repetition (e.g., whether the PUCCH repetition is to be transmitted using repetition occasions occurring in both FD sets of symbols and non-FD sets of symbols). For example, the DCI communication 902 may include a codepoint of "0" to indicate that the PUCCH repetition is a duplex-specific PUCCH repetition. In such aspects, the DCI communication may further indicate a timing offset (e.g., in number of slots) between a slot containing the DCI communication 902 (e.g., a slot carrying a grant that schedules a PUCCH repetition) and a first slot containing the scheduled PUCCH repetition (scheduled via the DCI communication 902), which is sometimes referred to as a K1 value. In such aspects, the timing offset (e.g., the K1 value) may determine the duplex type for the PUCCH repetition. For example, when a slot that is offset from a slot containing the DCI communication 902 by the timing offset amount is an FD slot 908, the UE 120 may use repetition occasions occurring only in FD slots 908 for the PUCCH repetition. Similarly, when a slot that is offset from a slot containing DCI communication 902 by the timing offset amount is a non-FD slot 910, the UE 120 may use repetition occasions occurring only in non-FD slots 910 for the PUCCH repetition.

Similarly, the DCI communication 902 may include a codepoint of "1" to indicate that the PUCCH repetition is a non-duplex-specific PUCCH repetition. In such aspects, the DCI communication may further indicate a timing offset (e.g., the K1 value) to identify a first slot to be used for the PUCCH repetition. For example, when a slot that is offset from a slot containing the DCI communication 902 by the timing offset amount is an FD slot 908, the UE 120 may begin the PUCCH repetition in an FD slot 908. Similarly, when a slot that is offset from a slot containing DCI communication 902 by the timing offset amount is a non-FD slot 910, the UE 120 may being the PUCCH repetition in a non-FD slot 910.

Additional aspects of signaling between a network node 110 and UE 120 in connection with uplink transmission repetition for FD and non-FD sets of symbols are described in more detail below in connection with FIG. 10.

As indicated above, FIG. 9 is provided as an example. Other examples may differ from what is described with respect to FIG. 9.

FIG. 10 is a diagram of an example 1000 associated with uplink transmission repetition for FD and non-FD sets of symbols, in accordance with the present disclosure. As shown in FIG. 10, a network node 110 (e.g., a CU, a DU, and/or an RU) may communicate with a UE 120. In some aspects, the network node 110 and the UE 120 may be part of a wireless network (e.g., wireless network 100). The UE 120 and the network node 110 may have established a wireless connection prior to operations shown in FIG. 10. In some aspects, the network node 110 and/or the UE 120 may be capable of FD communication, and/or the UE 120 may be an SBFD-aware UE 120.

As shown by reference number 1005, the UE 120 may transmit, and the network node 110 may receive, capability information (e.g., a capabilities report). In some aspects, the capability information may indicate UE 120 support for uplink transmission repetition (e.g., PUSCH repetition and/or PUCCH repetition) across both the FD set of symbols and the non-FD set of symbols. More particularly, the capability information may indicate a capability of uplink transmission repetition across an FD set of symbols only (e.g., the FD slots 908), a capability of uplink transmission repetition across a non-FD set of symbols only (e.g., the non-FD slots 910), or a capability of uplink transmission repetition across both the FD set of symbols and the non-FD set of symbols.

As shown by reference number 1010, the network node 110 may transmit, and the UE 120 may receive, configuration information. In some aspects, the UE 120 may receive the configuration information via one or more of RRC signaling, one or more MAC-CEs, and/or DCI, among other examples. In some aspects, the configuration information may include an indication of one or more configuration parameters (e.g., already known to the UE 120 and/or previously indicated by the network node 110 or other network device) for selection by the UE 120, and/or explicit configuration information for the UE 120 to use to configure the UE 120, among other examples.

In some aspects, the configuration information may configure one or more SRS resource sets, with the one or more SRS resource sets including one or more SRS resources associated with the FD set of symbols and one or more SRS resources associated with the non-FD set of symbols. As described above in connection with FIGS. 8-9F, in some aspects the one or more SRS resource sets may include a first SRS resource set associated with repetition occasions in the FD set of symbols and a second SRS resource set associated with repetition occasions in the non-FD set of symbols (e.g., the configuration information may configure two SRS resource sets, one set associated with FD slots and a different set associated with non-FD slots). In some other aspects, the one or more SRS resource sets may include a single SRS resource set associated with a first group of SRS resources (e.g., N SRS resources) associated with repetition occasions in the FD set of symbols, and a second group of SRS resources (e.g., M SRS resources) associated with repetition occasions in the non-FD set of symbols (e.g., the configuration information may configure a single SRS resource set having two groups of SRS resources, one group associated with FD slots and a different group associated with non-FD slots).

The UE 120 may configure itself based at least in part on the configuration information. In some aspects, the UE 120 may be configured to perform one or more operations described herein based at least in part on the configuration information.

Aa shown by reference numbers 1015 and 1020, the UE 120 may transmit, and the network node 110 may receive, multiple SRSs based at least in part on the configuration information. For example, as shown by reference number 1015, the UE 120 may transmit, and the network node 110 may receive, a first SRS using the one or more SRS resources associated with the FD set of symbols (e.g., the SRS resources associated with the first SRS resource set when two SRS resource sets are configured, or the first group of SRS resources (e.g., N SRS resources) associated with the SRS resource set when a single SRS resource set is configured). Moreover, as shown by reference number 1020, the UE 120 may transmit, and the network node 110 may receive, a second SRS using the one or more SRS resources associated with the non-FD set of symbols (e.g., the SRS resources associated with the second SRS resource set when two SRS resource sets are configured, or the second group of SRS resources (e.g., M SRS resources) associated with the SRS resource set when a single SRS resource set is configured).

As shown by reference number 1025, the network node 110 may transmit, and the UE 120 may receive, a downlink communication indicating at least one of the one or more SRS resources associated with the FD set of symbols or the one or more SRS resources associated with the non-FD set of symbols that are to be used for an uplink transmission repetition (e.g., a PUSCH repetition or a PUCCH repetition). For example, in some aspects, the network node 110 may transmit, and the UE 120 may receive, an RRC communication indicating at least one of the one or more SRS resources associated with the FD set of symbols or the one or more SRS resources associated with the non-FD set of symbols that are to be used for an uplink transmission repetition, such as in the case of Type 1 CG PUSCH repetition. In some other aspects, the network node 110 may transmit, and the UE 120 may receive, a DCI communication (e.g., DCI communication 902) indicating at least one of the one or more SRS resources associated with the FD set of symbols or the one or more SRS resources associated with the non-FD set of symbols that are to be used for an uplink transmission repetition. Moreover, as described above in connection with FIGS. 9A-9F, the RRC communication and/or the DCI communication may use an SRS resource set indicator field or a dedicated bitfield (e.g., a duplex repetition indicator field, such as the duplex repetition indicator field 904) to indicate the at least one of the one or more SRS resources associated with the FD set of symbols or the one or more SRS resources associated with the non-FD set of symbols that is to be used for the uplink transmission repetition in at least one of the FD set of symbols or the non-FD set of symbols.

In some aspects, the RRC communication and/or the DCI communication may indicate that the second SRS resource set or the second group of SRS resources (e.g., the SRS resource set or group of SRS resources associated with the non-FD set of symbols) is associated with the uplink transmission repetition (e.g., the uplink communication repetition is to be transmitted using only repetition occasions in the non-FD set of symbols). For example, the RRC communication and/or the DCI communication may indicate the codepoint "00" as described above in connection with FIG. 9A. In some other aspects, the RRC communication and/or the DCI communication may indicate that the first SRS resource set or the first group of SRS resources (e.g., the SRS resource set or group of SRS resources associated with the FD set of symbols) is associated with the uplink transmission repetition (e.g., the uplink communication repetition is to be transmitted using only repetition occasions in the FD set of symbols). For example, the RRC communication and/or the DCI communication may indicate the codepoint "01" as described above in connection with FIG. 9B.

In some other aspects, the RRC communication and/or the DCI communication may indicate that the first SRS resource set/first group of SRS resources (e.g., the SRS resource set or group of SRS resources associated with the FD set of symbols) and the second SRS resource set/second group of SRS resources (e.g., the SRS resource set or group of SRS resources associated with the non-FD set of symbols) are associated with the uplink transmission repetition (e.g., the uplink communication repetition is to be transmitted using both repetition occasions in the FD set of symbols and the non-FD set of symbols), and that the uplink transmission repetition is to begin in a slot associated with the non-FD set of symbols. For example, the RRC communication and/or the DCI communication may indicate the codepoint "10" as described above in connection with FIG. 9C. In some other aspects, the RRC communication and/or the DCI communication may indicate that the first SRS resource set/first group of SRS resources (e.g., the SRS resource set or group of SRS resources associated with the FD set of symbols) and the second SRS resource set/second group of SRS resources (e.g., the SRS resource set or group of SRS resources associated with the non-FD set of symbols) are associated with the uplink transmission repetition (e.g., the uplink communication repetition is to be transmitted using both repetition occasions in the FD set of symbols and the non-FD set of symbols), and that the uplink transmission repetition is to begin in a slot associated with the FD set of symbols. For example, the RRC communication and/or the DCI communication may indicate the codepoint "11" as described above in connection with FIG. 9D.

In some other aspects, the RRC communication and/or the DCI communication may indicate that the first SRS resource set/first group of SRS resources (e.g., the SRS resource set or group of SRS resources associated with the FD set of symbols) and the second SRS resource set/second group of SRS resources (e.g., the SRS resource set or group of SRS resources associated with the non-FD set of symbols) are associated with the uplink transmission repetition (e.g., the uplink communication repetition is to be transmitted using both repetition occasions in the FD set of symbols and the non-FD set of symbols), and that the uplink transmission repetition is not associated with a frequency offset. For example, the RRC communication and/or the DCI communication may indicate the codepoint "10" as described above in connection with FIG. 9E. In some other aspects, the RRC communication and/or the DCI communication may indicate that the first SRS resource set/first group of SRS resources (e.g., the SRS resource set or group of SRS resources associated with the FD set of symbols) and the second SRS resource set/second group of SRS resources (e.g., the SRS resource set or group of SRS resources associated with the non-FD set of symbols) are associated with the uplink transmission repetition (e.g., the uplink communication repetition is to be transmitted using both repetition occasions in the FD set of symbols and the non-FD set of symbols), and that the uplink transmission repetition is associated with a frequency offset. For example, the RRC communication and/or the DCI communication may indicate the codepoint "11" as described above in connection with FIG. 9F.

In some other aspects, the RRC communication and/or the DCI communication may indicate that the first SRS resource set/first group of SRS resources (e.g., the SRS resource set or group of SRS resources associated with the FD set of symbols) and the second SRS resource set/second group of SRS resources (e.g., the SRS resource set or group of SRS resources associated with the non-FD set of symbols) are associated with the uplink transmission repetition (e.g., the uplink communication repetition is to be transmitted using both repetition occasions in the FD set of symbols and the non-FD set of symbols), and a timing offset (e.g., a K2 value) associated with a slot in which the uplink transmission repetition is to begin. For example, the RRC communication and/or the DCI communication may indicate the codepoint "10" to indicate the uplink communication repetition is to be transmitted using both repetition occasions in the FD set of symbols and the non-FD set of symbols regardless of a slot type of a first repetition, and then utilize the K2 value to indicate the slot type of the first transmission.

In some other aspects, the RRC communication and/or the DCI communication may indicate that the uplink transmission repetition is a duplex-specific transmission repetition, such as by using a one-bit bitfield indicating the codepoint "0." In such aspects, the RRC communication and/or the DCI communication may indicate a timing offset (e.g., a K2 value) associated with a slot in which the uplink transmission repetition is to begin, the slot being associated with one of the FD set of symbols or the non-FD set of symbols (e.g., the K2 value may be used to indicate the duplex type, either FD or non-FD, associated with the duplex-specific transmission repetition). In some other aspects, the RRC communication and/or the DCI communication may indicate that the uplink transmission repetition is not a duplex-specific transmission repetition, such as by using a one-bit bitfield indicating the codepoint "1." In such aspects, the RRC communication and/or the DCI communication may indicate a timing offset (e.g., a K2 value) associated with a slot in which the uplink transmission repetition is to begin (e.g., the K2 value may be used to indicate a starting slot for an uplink transmission repetition that spans the FD set of symbols and the non-FD set of symbols).

In some aspects, such as in aspects in which the uplink transmission repetition is associated with a PUSCH repetition, the RRC communication and/or the DCI communication may indicate that the PUSCH repetition is to be transmitted in both the FD set of symbols and the non-FD set of symbols (e.g., by using the codepoint "10," "11," or "1," as described above), and the RRC communication and/or the DCI communication may indicate a first SRI associated with the FD set of symbols (e.g., SRI1 described above in connection with FIGS. 9A-9F), a first TPMI associated with the FD set of symbols (e.g., TPMI1 described above in connection with FIGS. 9A-9F), a second SRI associated with the non-FD set of symbols (e.g., SRI2 described above in connection with FIGS. 9A-9F), and/or a second TPMI associated with the non-FD set of symbols (e.g., TPMI2 described above in connection with FIGS. 9A-9F).

In some aspects, such as in aspects in which the RRC communication and/or the DCI communication schedules a PUCCH repetition, the RRC communication and/or the DCI communication may indicate (e.g., by using a one-bit bitfield) that the PUCCH repetition is a duplex-specific PUCCH repetition (e.g., by indicating the codepoint "0"). In such aspects, the RRC communication and/or the DCI communication may indicate a timing offset (e.g., a K1 value) associated with a slot in which the PUCCH repetition is to begin, the slot being associated with one of the FD set of symbols or the non-FD set of symbols (e.g., the K1 value may be used to indicate the duplex type, either FD or non-FD, associated with the duplex-specific PUCCH repetition). In some other aspects, the RRC communication and/or the DCI communication may indicate that the PUCCH repetition is not a duplex-specific PUCCH repetition (e.g., by indicating the codepoint "1" in a dedicated one-bit bitfield). In such aspects, the RRC communication and/or the DCI communication may indicate a timing offset (e.g., a K1 value) associated with a slot in which the PUCCH repetition is to begin, the slot being associated with one of the FD set of symbols or the non-FD set of symbols (e.g., the K1 value may be used to indicate a begging slot of the PUCCH repetition).

As shown by reference number 1030, the UE 120 may transmit, and the network node 110 may receive, the uplink transmission repetition in one of only the FD set of symbols, only the non-FD set of symbols, or both the FD set of symbols and the non-FD set of symbols. For example, in aspects in which the RRC communication and/or the DCI communication indicates that the second SRS resource set or the second group of SRS resources (e.g., the SRS resource set or group of SRS resources associated with the non-FD set of symbols) is associated with the uplink transmission repetition (e.g., the uplink communication repetition is to be transmitted using only repetition occasions in the non-FD set of symbols), the UE 120 may transmit, and the network node 110 may receive, the uplink transmission repetition (e.g., a PUSCH repetition or a PUCCH repetition) using only the non-FD set of symbols, beginning in a slot associated with the non-FD set of symbols (e.g., as indicated by a K2 parameter or otherwise, as described above in connection with the various codepoints). In aspects in which the RRC communication and/or the DCI communication indicates that the first SRS resource set or the first group of SRS resources (e.g., the SRS resource set or group of SRS resources associated with the FD set of symbols) is associated with the uplink transmission repetition (e.g., the uplink communication repetition is to be transmitted using only repetition occasions in the FD set of symbols), the UE 120 may transmit, and the network node 110 may receive, the uplink transmission repetition (e.g., a PUSCH repetition or a PUCCH repetition) using only the FD set of symbols, beginning in a slot associated with the FD set of symbols (e.g., as indicated by a K2 parameter or otherwise, as described above in connection with the various codepoints).

In aspects in which the RRC communication and/or the DCI communication indicates both the first SRS resource set/first group of SRS resources and the second SRS resource set/second group of SRS resources are associated with the uplink transmission repetition (e.g., the uplink communication repetition is to be transmitted using repetition occasions in both the FD set of symbols and the non-FD set of symbols), the UE 120 may transmit, and the network node 110 may receive, the uplink transmission repetition (e.g., a PUSCH repetition or a PUCCH repetition) using both the FD set of symbols and the non-FD set of symbols, beginning in a slot indicated by the codepoint, a K2 value, or otherwise, as described above in connection with the various codepoints. Additionally, or alternatively, the UE 120 may transmit, and the network node 110 may receive, the uplink transmission repetition (e.g., a PUSCH repetition or a PUCCH repetition) using both the FD set of symbols and the non-FD set of symbols, by applying a frequency offset, such as described above in connection with FIGS. 9E and 9F. For example, in aspects in which no frequency offset is used, the UE 120 may transmit, and the network node 110 may receive, the uplink transmission repetition using a set of frequency resources in the FD set of symbols and using a same set of frequency resources in the non-FD set of symbols. In aspects in which the frequency offset is used, the UE 120 may transmit, and the network node may receive, the uplink transmission repetition using a first set of frequency resources in the FD set of symbols and using a second set of frequency resources in the non-FD set of symbols, with the first set of frequency resources being separated from the second set of frequency resources by the frequency offset.

Based at least in part on the network node 110 signaling, to the UE 120, SRS resources to be used for an uplink transmission repetition across FD and non-FD sets of symbols, the UE and/or the network node may conserve computing, power, network, and/or communication resources that may have otherwise been consumed traditional uplink transmission repetitions. For example, based at least in part on the network node 110 signaling, to the UE 120, SRS resources to be used for an uplink transmission repetition across FD and non-FD sets of symbols, the UE 120 and the network node 110 may communicate with a reduced error rate, which may conserve computing, power, network, and/or communication resources that may have otherwise been consumed to detect and/or correct communication errors.

As indicated above, FIG. 10 is provided as an example. Other examples may differ from what is described with respect to FIG. 10.

FIG. 11 is a diagram illustrating an example process 1100 performed, for example, by a UE, in accordance with the present disclosure. Example process 1100 is an example where the UE (e.g., UE 120) performs operations associated with uplink transmission repetition for FD and non-FD sets of symbols.

As shown in FIG. 11, in some aspects, process 1100 may include receiving configuration information that configures one or more SRS resource sets, the one or more SRS resource sets including one or more SRS resources associated with an FD set of symbols and one or more SRS resources associated with a non-FD set of symbols (block 1110). For example, the UE (e.g., using reception component 1302 and/or communication manager 1306, depicted in FIG. 13) may receive configuration information that configures one or more SRS resource sets, the one or more SRS resource sets including one or more SRS resources associated with an FD set of symbols and one or more SRS resources associated with a non-FD set of symbols, as described above.

As further shown in FIG. 11, in some aspects, process 1100 may include transmitting a first SRS using the one or more SRS resources associated with the FD set of symbols and a second SRS using the one or more SRS resources associated with the non-FD set of symbols (block 1120). For example, the UE (e.g., using transmission component 1304 and/or communication manager 1306, depicted in FIG. 13) may transmit a first SRS using the one or more SRS resources associated with the FD set of symbols and a second SRS using the one or more SRS resources associated with the non-FD set of symbols, as described above.

As further shown in FIG. 11, in some aspects, process 1100 may include receiving at least one of an RRC communication or a DCI communication indicating at least one of the one or more SRS resources associated with the FD set of symbols or the one or more SRS resources associated with the non-FD set of symbols that are to be used for an uplink transmission repetition (block 1130). For example, the UE (e.g., using reception component 1302 and/or communication manager 1306, depicted in FIG. 13) may receive at least one of an RRC communication or a DCI communication indicating at least one of the one or more SRS resources associated with the FD set of symbols or the one or more SRS resources associated with the non-FD set of symbols that are to be used for an uplink transmission repetition, as described above.

As further shown in FIG. 11, in some aspects, process 1100 may include transmitting, based at least in part on the at least one of the RRC communication or the DCI communication, the uplink transmission repetition in one of: only the FD set of symbols, only the non-FD set of symbols, or both the FD set of symbols and the non-FD set of symbols (block 1140). For example, the UE (e.g., using transmission component 1304 and/or communication manager 1306, depicted in FIG. 13) may transmit, based at least in part on the at least one of the RRC communication or the DCI communication, the uplink transmission repetition in one of: only the FD set of symbols, only the non-FD set of symbols, or both the FD set of symbols and the non-FD set of symbols, as described above.

Process 1100 may include additional aspects, such as any single aspect or any combination of aspects described below and/or in connection with one or more other processes described elsewhere herein.

In a first aspect, the at least one of the RRC communication or the DCI communication indicates, using one of an SRS resource set indicator field or a duplex repetition indicator field, the at least one of the one or more SRS resources associated with the FD set of symbols or the one or more SRS resources associated with the non-FD set of symbols that is to be used for the uplink transmission repetition in at least one of the FD set of symbols or the non-FD set of symbols.

In a second aspect, alone or in combination with the first aspect, the one or more SRS resource sets include a first SRS resource set associated with repetition occasions in the FD set of symbols and a second SRS resource set associated with repetition occasions in the non-FD set of symbols.

In a third aspect, alone or in combination with one or more of the first and second aspects, the at least one of the RRC communication or the DCI communication indicates that the second SRS resource set is associated with the uplink transmission repetition, and transmitting the uplink transmission repetition includes transmitting the uplink transmission repetition using only the non-FD set of symbols.

In a fourth aspect, alone or in combination with one or more of the first through third aspects, the at least one of the RRC communication or the DCI communication indicates that the first SRS resource set is associated with the uplink transmission repetition, and transmitting the uplink transmission repetition includes transmitting the uplink transmission repetition using only the FD set of symbols.

In a fifth aspect, alone or in combination with one or more of the first through fourth aspects, the at least one of the RRC communication or the DCI communication indicates that the first SRS resource set and the second SRS resource set are associated with the uplink transmission repetition, the at least one of the RRC communication or the DCI communication indicates that the uplink transmission repetition is to begin in a slot associated with the non-FD set of symbols, and transmitting the uplink transmission repetition includes transmitting the uplink transmission repetition using the FD set of symbols and the non-FD set of symbols, beginning in the slot associated with the non-FD set of symbols.

In a sixth aspect, alone or in combination with one or more of the first through fifth aspects, the at least one of the RRC communication or the DCI communication indicates that the first SRS resource set and the second SRS resource set are associated with the uplink transmission repetition, the at least one of the RRC communication or the DCI communication indicates that the uplink transmission repetition is to begin in a slot associated with the FD set of symbols, and transmitting the uplink transmission repetition includes transmitting the uplink transmission repetition using the FD set of symbols and the non-FD set of symbols, beginning in the slot associated with the FD set of symbols.

In a seventh aspect, alone or in combination with one or more of the first through sixth aspects, the at least one of the RRC communication or the DCI communication indicates that the first SRS resource set and the second SRS resource set are associated with the uplink transmission repetition, the at least one of the RRC communication or the DCI communication indicates that the uplink transmission repetition is not associated with a frequency offset, and transmitting the uplink transmission repetition includes transmitting the uplink transmission repetition using a set of frequency resources in the FD set of symbols and using the set of frequency resources in the non-FD set of symbols.

In an eighth aspect, alone or in combination with one or more of the first through seventh aspects, the at least one of the RRC communication or the DCI communication indicates that the first SRS resource set and the second SRS resource set are associated with the uplink transmission repetition, the at least one of the RRC communication or the DCI communication indicates that the uplink transmission repetition is associated with a frequency offset, and transmitting the uplink transmission repetition includes transmitting the uplink transmission repetition using a first set of frequency resources in the FD set of symbols and using a second set of frequency resources in the non-FD set of symbols, the first set of frequency resources being separated from the second set of frequency resources by the frequency offset.

In a ninth aspect, alone or in combination with one or more of the first through eighth aspects, the at least one of the RRC communication or the DCI communication indicates that the first SRS resource set and the second SRS resource set are associated with the uplink transmission repetition, the at least one of the RRC communication or the DCI communication indicates a timing offset associated with a slot in which the uplink transmission repetition is to begin, and transmitting the uplink transmission repetition includes transmitting the uplink transmission repetition using the FD set of symbols and the non-FD set of symbols, beginning in the slot indicated by the timing offset.

In a tenth aspect, alone or in combination with one or more of the first through ninth aspects, the at least one of the RRC communication or the DCI communication indicates that the uplink transmission repetition is a duplex-specific transmission repetition, the at least one of the RRC communication or the DCI communication indicates a timing offset associated with a slot in which the uplink transmission repetition is to begin, the slot being associated with one of the FD set of symbols or the non-FD set of symbols, and transmitting the uplink transmission repetition includes transmitting the uplink transmission repetition using the one of the FD set of symbols or the non-FD set of symbols.

In an eleventh aspect, alone or in combination with one or more of the first through tenth aspects, the at least one of the RRC communication or the DCI communication indicates that the uplink transmission repetition is not a duplex-specific transmission repetition, the at least one of the RRC communication or the DCI communication indicates a timing offset associated with a slot in which the uplink transmission repetition is to begin, and transmitting the uplink transmission repetition includes transmitting the uplink transmission repetition using both of the FD set of symbols and the non-FD set of symbols, beginning in the slot indicated by the timing offset.

In a twelfth aspect, alone or in combination with one or more of the first through eleventh aspects, the one or more SRS resource sets include an SRS resource set associated with a first group of SRS resources associated with repetition occasions in the FD set of symbols and a second group of SRS resources associated with repetition occasions in the non-FD set of symbols.

In a thirteenth aspect, alone or in combination with one or more of the first through twelfth aspects, the at least one of the RRC communication or the DCI communication indicates that the second group of SRS resources are associated with the uplink transmission repetition, and transmitting the uplink transmission repetition includes transmitting the uplink transmission repetition using only the non-FD set of symbols.

In a fourteenth aspect, alone or in combination with one or more of the first through thirteenth aspects, the at least one of the RRC communication or the DCI communication indicates that the first group of SRS resources are associated with the uplink transmission repetition, and transmitting the uplink transmission repetition includes transmitting the uplink transmission repetition using only the FD set of symbols.

In a fifteenth aspect, alone or in combination with one or more of the first through fourteenth aspects, the at least one of the RRC communication or the DCI communication indicates that the first group of SRS resources and the second group of SRS resources are associated with the uplink transmission repetition, the at least one of the RRC communication or the DCI communication indicates that the uplink transmission repetition is to begin in a slot associated with the non-FD set of symbols, and transmitting the uplink transmission repetition includes transmitting the uplink transmission repetition using the FD set of symbols and the non-FD set of symbols, beginning in the slot associated with the non-FD set of symbols.

In a sixteenth aspect, alone or in combination with one or more of the first through fifteenth aspects, the at least one of the RRC communication or the DCI communication indicates that the first group of SRS resources and the second group of SRS resources are associated with the uplink transmission repetition, the at least one of the RRC communication or the DCI communication indicates that the uplink transmission repetition is to begin in a slot associated with the FD set of symbols, and transmitting the uplink transmission repetition includes transmitting the uplink transmission repetition using the FD set of symbols and the non-FD set of symbols, beginning in the slot associated with the FD set of symbols.

In a seventeenth aspect, alone or in combination with one or more of the first through sixteenth aspects, the at least one of the RRC communication or the DCI communication indicates that the first group of SRS resources and the second group of SRS resources are associated with the uplink transmission repetition, the at least one of the RRC communication or the DCI communication indicates that the uplink transmission repetition is not associated with a frequency offset, and transmitting the uplink transmission repetition includes transmitting the uplink transmission repetition using a set of frequency resources in the FD set of symbols and using the set of frequency resources in the non-FD set of symbols.

In an eighteenth aspect, alone or in combination with one or more of the first through seventeenth aspects, the at least one of the RRC communication or the DCI communication indicates that the first group of SRS resources and the second group of SRS resources are associated with the uplink transmission repetition, the at least one of the RRC communication or the DCI communication indicates that the uplink transmission repetition is associated with a frequency offset, and transmitting the uplink transmission repetition includes transmitting the uplink transmission repetition using a first set of frequency resources in the FD set of symbols and using a second set of frequency resources in the non-FD set of symbols, the first set of frequency resources being separated from the second set of frequency resources by the frequency offset.

In a nineteenth aspect, alone or in combination with one or more of the first through eighteenth aspects, the at least one of the RRC communication or the DCI communication indicates that the first group of SRS resources and the second group of SRS resources are associated with the uplink transmission repetition, the at least one of the RRC communication or the DCI communication indicates a timing offset associated with a slot in which the uplink transmission repetition is to begin, and transmitting the uplink transmission repetition includes transmitting the uplink transmission repetition using the FD set of symbols and the non-FD set of symbols, beginning in the slot indicated by the timing offset.

In a twentieth aspect, alone or in combination with one or more of the first through nineteenth aspects, the at least one of the RRC communication or the DCI communication indicates that the uplink transmission repetition is a duplex-specific transmission repetition, the at least one of the RRC communication or the DCI communication indicates a timing offset associated with a slot in which the uplink transmission repetition is to begin, the slot being associated with one of the FD set of symbols or the non-FD set of symbols, and transmitting the uplink transmission repetition includes transmitting the uplink transmission repetition using the one of the FD set of symbols or the non-FD set of symbols.

In a twenty-first aspect, alone or in combination with one or more of the first through twentieth aspects, the at least one of the RRC communication or the DCI communication indicates that the uplink transmission repetition is not a duplex-specific transmission repetition, the at least one of the RRC communication or the DCI communication indicates a timing offset associated with a slot in which the uplink transmission repetition is to begin, and transmitting the uplink transmission repetition includes transmitting the uplink transmission repetition using both of the FD set of symbols and the non-FD set of symbols, beginning in the slot indicated by the timing offset.

In a twenty-second aspect, alone or in combination with one or more of the first through twenty-first aspects, the uplink transmission repetition is associated with a PUSCH repetition, the at least one of the RRC communication or the DCI communication indicates that the PUSCH repetition is to be transmitted in both the FD set of symbols and the non-FD set of symbols, and the at least one of the RRC communication or the DCI communication indicates a first SRI associated with the FD set of symbols, a first TPMI associated with the FD set of symbols, a second SRI associated with the non-FD set of symbols, and a second TPMI associated with the non-FD set of symbols.

In a twenty-third aspect, alone or in combination with one or more of the first through twenty-second aspects, the uplink transmission repetition is associated with a PUCCH repetition, the at least one of the RRC communication or the DCI communication indicates that the PUCCH repetition is a duplex-specific PUCCH repetition, the at least one of the RRC communication or the DCI communication indicates a timing offset associated with a slot in which the PUCCH repetition is to begin, the slot being associated with one of the FD set of symbols or the non-FD set of symbols, and transmitting the uplink transmission repetition includes transmitting the PUCCH repetition using the one of the FD set of symbols or the non-FD set of symbols.

In a twenty-fourth aspect, alone or in combination with one or more of the first through twenty-third aspects, the uplink transmission repetition is associated with a PUCCH repetition, the at least one of the RRC communication or the DCI communication indicates that the PUCCH repetition is not a duplex-specific transmission repetition, and transmitting the uplink transmission repetition includes transmitting the PUCCH repetition using both of the FD set of symbols and the non-FD set of symbols.

In a twenty-fifth aspect, alone or in combination with one or more of the first through twenty-fourth aspects, process 1100 includes transmitting capability information indicating one of a capability of uplink transmission repetition across the FD set of symbols only, a capability of uplink transmission repetition across the non-FD set of symbols only, or a capability of uplink transmission repetition across both the FD set of symbols and the non-FD set of symbols, wherein the at least one of the RRC communication or the DCI communication is based at least in part on the capability information.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a diagram illustrating an example process 1200 performed, for example, by a network node, in accordance with the present disclosure. Example process 1200 is an example where the network node (e.g., network node 110) performs operations associated with uplink transmission repetition for FD and non-FD sets of symbols.

As shown in FIG. 12, in some aspects, process 1200 may include transmitting, to a UE, configuration information that configures one or more SRS resource sets, the one or more SRS resource sets including one or more SRS resources associated with an FD set of symbols and one or more SRS resources associated with a non-FD set of symbols (block 1210). For example, the network node (e.g., using transmission component 1404 and/or communication manager 1406, depicted in FIG. 14) may transmit, to a UE, configuration information that configures one or more SRS resource sets, the one or more SRS resource sets including one or more SRS resources associated with an FD set of symbols and one or more SRS resources associated with a non-FD set of symbols, as described above.

As further shown in FIG. 12, in some aspects, process 1200 may include receiving, from the UE, a first SRS using the one or more SRS resources associated with the FD set of symbols and a second SRS using the one or more SRS resources associated with the non-FD set of symbols (block 1220). For example, the network node (e.g., using reception component 1402 and/or communication manager 1406, depicted in FIG. 14) may receive, from the UE, a first SRS using the one or more SRS resources associated with the FD set of symbols and a second SRS using the one or more SRS resources associated with the non-FD set of symbols, as described above.

As further shown in FIG. 12, in some aspects, process 1200 may include transmitting, to the UE, at least one of an RRC communication or a DCI communication indicating at least one of the one or more SRS resources associated with the FD set of symbols or the one or more SRS resources associated with the non-FD set of symbols that are to be used for an uplink transmission repetition (block 1230). For example, the network node (e.g., using transmission component 1404 and/or communication manager 1406, depicted in FIG. 14) may transmit, to the UE, at least one of an RRC communication or a DCI communication indicating at least one of the one or more SRS resources associated with the FD set of symbols or the one or more SRS resources associated with the non-FD set of symbols that are to be used for an uplink transmission repetition, as described above.

As further shown in FIG. 12, in some aspects, process 1200 may include receiving, from the UE and based at least in part on the at least one of the RRC communication or the DCI communication, the uplink transmission repetition in one of: only the FD set of symbols, only the non-FD set of symbols, or both the FD set of symbols and the non-FD set of symbols (block 1240). For example, the network node (e.g., using reception component 1402 and/or communication manager 1406, depicted in FIG. 14) may receive, from the UE and based at least in part on the at least one of the RRC communication or the DCI communication, the uplink transmission repetition in one of: only the FD set of symbols, only the non-FD set of symbols, or both the FD set of symbols and the non-FD set of symbols, as described above.

Process 1200 may include additional aspects, such as any single aspect or any combination of aspects described below and/or in connection with one or more other processes described elsewhere herein.

In a first aspect, the at least one of the RRC communication or the DCI communication indicates, using one of an SRS resource set indicator field or a duplex repetition indicator field, the at least one of the one or more SRS resources associated with the FD set of symbols or the one or more SRS resources associated with the non-FD set of symbols that is to be used for the uplink transmission repetition in at least one of the FD set of symbols or the non-FD set of symbols.

In a second aspect, alone or in combination with the first aspect, the one or more SRS resource sets include a first SRS resource set associated with repetition occasions in the FD set of symbols and a second SRS resource set associated with repetition occasions in the non-FD set of symbols.

In a third aspect, alone or in combination with one or more of the first and second aspects, the at least one of the RRC communication or the DCI communication indicates that the second SRS resource set is associated with the uplink transmission repetition, and receiving the uplink transmission repetition includes receiving the uplink transmission repetition using only the non-FD set of symbols.

In a fourth aspect, alone or in combination with one or more of the first through third aspects, the at least one of the RRC communication or the DCI communication indicates that the first SRS resource set is associated with the uplink transmission repetition, and receiving the uplink transmission repetition includes receiving the uplink transmission repetition using only the FD set of symbols.

In a fifth aspect, alone or in combination with one or more of the first through fourth aspects, the at least one of the RRC communication or the DCI communication indicates that the first SRS resource set and the second SRS resource set are associated with the uplink transmission repetition, the at least one of the RRC communication or the DCI communication indicates that the uplink transmission repetition is to begin in a slot associated with the non-FD set of symbols, and receiving the uplink transmission repetition includes receiving the uplink transmission repetition using the FD set of symbols and the non-FD set of symbols, beginning in the slot associated with the non-FD set of symbols.

In a sixth aspect, alone or in combination with one or more of the first through fifth aspects, the at least one of the RRC communication or the DCI communication indicates that the first SRS resource set and the second SRS resource set are associated with the uplink transmission repetition, the at least one of the RRC communication or the DCI communication indicates that the uplink transmission repetition is to begin in a slot associated with the FD set of symbols, and receiving the uplink transmission repetition includes receiving the uplink transmission repetition using the FD set of symbols and the non-FD set of symbols, beginning in the slot associated with the FD set of symbols.

In a seventh aspect, alone or in combination with one or more of the first through sixth aspects, the at least one of the RRC communication or the DCI communication indicates that the first SRS resource set and the second SRS resource set are associated with the uplink transmission repetition, the at least one of the RRC communication or the DCI communication indicates that the uplink transmission repetition is not associated with a frequency offset, and receiving the uplink transmission repetition includes receiving the uplink transmission repetition using a set of frequency resources in the FD set of symbols and using the set of frequency resources in the non-FD set of symbols.

In an eighth aspect, alone or in combination with one or more of the first through seventh aspects, the at least one of the RRC communication or the DCI communication indicates that the first SRS resource set and the second SRS resource set are associated with the uplink transmission repetition, the at least one of the RRC communication or the DCI communication indicates that the uplink transmission repetition is associated with a frequency offset, and receiving the uplink transmission repetition includes receiving the uplink transmission repetition using a first set of frequency resources in the FD set of symbols and using a second set of frequency resources in the non-FD set of symbols, the first set of frequency resources being separated from the second set of frequency resources by the frequency offset.

In a ninth aspect, alone or in combination with one or more of the first through eighth aspects, the at least one of the RRC communication or the DCI communication indicates that the first SRS resource set and the second SRS resource set are associated with the uplink transmission repetition, the at least one of the RRC communication or the DCI communication indicates a timing offset associated with a slot in which the uplink transmission repetition is to begin, and receiving the uplink transmission repetition includes receiving the uplink transmission repetition using the FD set of symbols and the non-FD set of symbols, beginning in the slot indicated by the timing offset.

In a tenth aspect, alone or in combination with one or more of the first through ninth aspects, the at least one of the RRC communication or the DCI communication indicates that the uplink transmission repetition is a duplex-specific transmission repetition, the at least one of the RRC communication or the DCI communication indicates a timing offset associated with a slot in which the uplink transmission repetition is to begin, the slot being associated with one of the FD set of symbols or the non-FD set of symbols, and receiving the uplink transmission repetition includes receiving the uplink transmission repetition using the one of the FD set of symbols or the non-FD set of symbols.

In an eleventh aspect, alone or in combination with one or more of the first through tenth aspects, the at least one of the RRC communication or the DCI communication indicates that the uplink transmission repetition is not a duplex-specific transmission repetition, the at least one of the RRC communication or the DCI communication indicates a timing offset associated with a slot in which the uplink transmission repetition is to begin, and receiving the uplink transmission repetition includes receiving the uplink transmission repetition using both of the FD set of symbols and the non-FD set of symbols, beginning in the slot indicated by the timing offset.

In a twelfth aspect, alone or in combination with one or more of the first through eleventh aspects, the one or more SRS resource sets include an SRS resource set associated with a first group of SRS resources associated with repetition occasions in the FD set of symbols and a second group of SRS resources associated with repetition occasions in the non-FD set of symbols.

In a thirteenth aspect, alone or in combination with one or more of the first through twelfth aspects, the at least one of the RRC communication or the DCI communication indicates that the second group of SRS resources are associated with the uplink transmission repetition, and receiving the uplink transmission repetition includes receiving the uplink transmission repetition using only the non-FD set of symbols.

In a fourteenth aspect, alone or in combination with one or more of the first through thirteenth aspects, the at least one of the RRC communication or the DCI communication indicates that the first group of SRS resources are associated with the uplink transmission repetition, and receiving the uplink transmission repetition includes receiving the uplink transmission repetition using only the FD set of symbols.

In a fifteenth aspect, alone or in combination with one or more of the first through fourteenth aspects, the at least one of the RRC communication or the DCI communication indicates that the first group of SRS resources and the second group of SRS resources are associated with the uplink transmission repetition, the at least one of the RRC communication or the DCI communication indicates that the uplink transmission repetition is to begin in a slot associated with the non-FD set of symbols, and receiving the uplink transmission repetition includes receiving the uplink transmission repetition using the FD set of symbols and the non-FD set of symbols, beginning in the slot associated with the non-FD set of symbols.

In a sixteenth aspect, alone or in combination with one or more of the first through fifteenth aspects, the at least one of the RRC communication or the DCI communication indicates that the first group of SRS resources and the second group of SRS resources are associated with the uplink transmission repetition, the at least one of the RRC communication or the DCI communication indicates that the uplink transmission repetition is to begin in a slot associated with the FD set of symbols, and receiving the uplink transmission repetition includes receiving the uplink transmission repetition using the FD set of symbols and the non-FD set of symbols, beginning in the slot associated with the FD set of symbols.

In a seventeenth aspect, alone or in combination with one or more of the first through sixteenth aspects, the at least one of the RRC communication or the DCI communication indicates that the first group of SRS resources and the second group of SRS resources are associated with the uplink transmission repetition, the at least one of the RRC communication or the DCI communication indicates that the uplink transmission repetition is not associated with a frequency offset, and receiving the uplink transmission repetition includes receiving the uplink transmission repetition using a set of frequency resources in the FD set of symbols and using the set of frequency resources in the non-FD set of symbols.

In an eighteenth aspect, alone or in combination with one or more of the first through seventeenth aspects, the at least one of the RRC communication or the DCI communication indicates that the first group of SRS resources and the second group of SRS resources are associated with the uplink transmission repetition, the at least one of the RRC communication or the DCI communication indicates that the uplink transmission repetition is associated with a frequency offset, and receiving the uplink transmission repetition includes receiving the uplink transmission repetition using a first set of frequency resources in the FD set of symbols and using a second set of frequency resources in the non-FD set of symbols, the first set of frequency resources being separated from the second set of frequency resources by the frequency offset.

In a nineteenth aspect, alone or in combination with one or more of the first through eighteenth aspects, the at least one of the RRC communication or the DCI communication indicates that the first group of SRS resources and the second group of SRS resources are associated with the uplink transmission repetition, the at least one of the RRC communication or the DCI communication indicates a timing offset associated with a slot in which the uplink transmission repetition is to begin, and receiving the uplink transmission repetition includes receiving the uplink transmission repetition using the FD set of symbols and the non-FD set of symbols, beginning in the slot indicated by the timing offset.

In a twentieth aspect, alone or in combination with one or more of the first through nineteenth aspects, the at least one of the RRC communication or the DCI communication indicates that the uplink transmission repetition is a duplex-specific transmission repetition, the at least one of the RRC communication or the DCI communication indicates a timing offset associated with a slot in which the uplink transmission repetition is to begin, the slot being associated with one of the FD set of symbols or the non-FD set of symbols, and receiving the uplink transmission repetition includes receiving the uplink transmission repetition using the one of the FD set of symbols or the non-FD set of symbols.

In a twenty-first aspect, alone or in combination with one or more of the first through twentieth aspects, the at least one of the RRC communication or the DCI communication indicates that the uplink transmission repetition is not a duplex-specific transmission repetition, the at least one of the RRC communication or the DCI communication indicates a timing offset associated with a slot in which the uplink transmission repetition is to begin, and receiving the uplink transmission repetition includes receiving the uplink transmission repetition using both of the FD set of symbols and the non-FD set of symbols, beginning in the slot indicated by the timing offset.

In a twenty-second aspect, alone or in combination with one or more of the first through twenty-first aspects, the uplink transmission repetition is associated with a PUSCH repetition, the at least one of the RRC communication or the DCI communication indicates that the PUSCH repetition is to be transmitted in both the FD set of symbols and the non-FD set of symbols, and the at least one of the RRC communication or the DCI communication indicates a first SRI associated with the FD set of symbols, a first TPMI associated with the FD set of symbols, a second SRI associated with the non-FD set of symbols, and a second TPMI associated with the non-FD set of symbols.

In a twenty-third aspect, alone or in combination with one or more of the first through twenty-second aspects, the uplink transmission repetition is associated with a PUCCH repetition, the at least one of the RRC communication or the DCI communication indicates that the PUCCH repetition is a duplex-specific PUCCH repetition, the at least one of the RRC communication or the DCI communication indicates a timing offset associated with a slot in which the PUCCH repetition is to begin, the slot being associated with one of the FD set of symbols or the non-FD set of symbols, and receiving the uplink transmission repetition includes receiving the PUCCH repetition using the one of the FD set of symbols or the non-FD set of symbols.

In a twenty-fourth aspect, alone or in combination with one or more of the first through twenty-third aspects, the uplink transmission repetition is associated with a PUCCH repetition, the at least one of the RRC communication or the DCI communication indicates that the PUCCH repetition is not a duplex-specific transmission repetition, and receiving the uplink transmission repetition includes receiving the PUCCH repetition using both of the FD set of symbols and the non-FD set of symbols.

In a twenty-fifth aspect, alone or in combination with one or more of the first through twenty-fourth aspects, process 1200 includes receiving capability information indicating one of a UE capability of uplink transmission repetition across the FD set of symbols only, a UE capability of uplink transmission repetition across the non-FD set of symbols only, or a UE capability of uplink transmission repetition across both the FD set of symbols and the non-FD set of symbols, wherein the at least one of the RRC communication or the DCI communication is based at least in part on the capability information.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
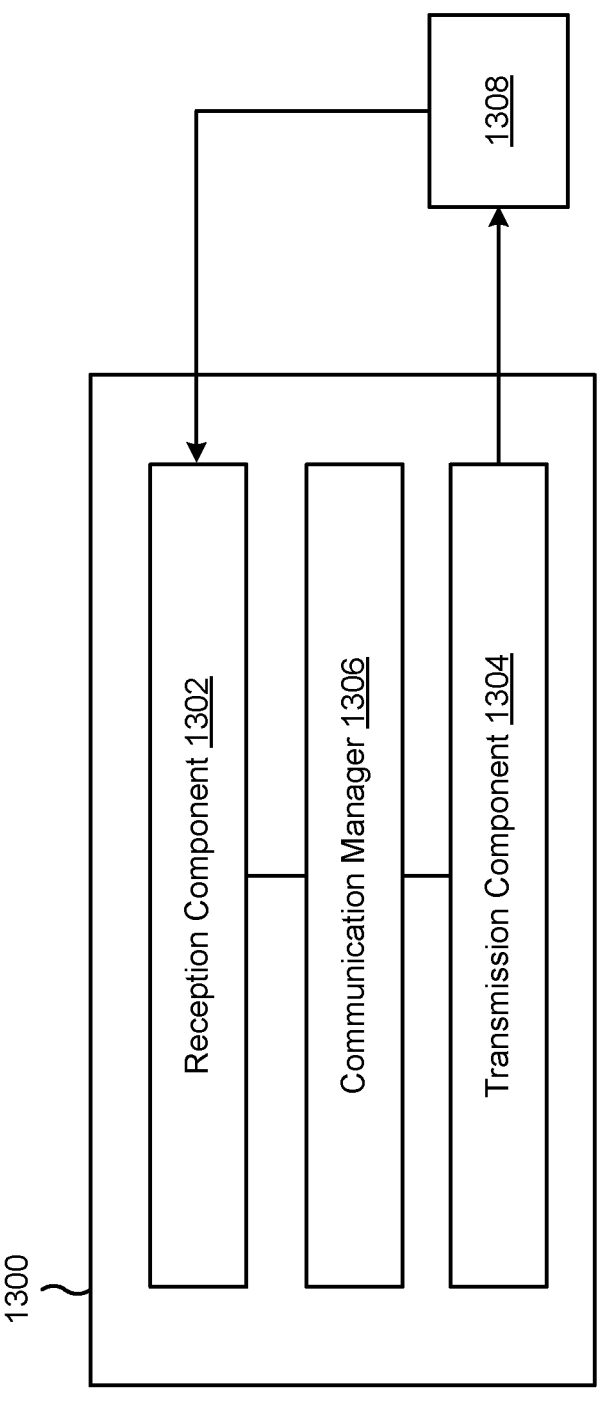
FIG. 13 is a diagram of an example apparatus for wireless communication, in accordance with the present disclosure.

FIG. 13 is a diagram of an example apparatus 1300 for wireless communication, in accordance with the present disclosure. The apparatus 1300 may be a UE, or a UE may include the apparatus 1300. In some aspects, the apparatus 1300 includes a reception component 1302, a transmission component 1304, and/or a communication manager 1306, which may be in communication with one another (for example, via one or more buses and/or one or more other components). In some aspects, the communication manager 1306 is the communication manager 140 described in connection with FIG. 1. As shown, the apparatus 1300 may communicate with another apparatus 1308, such as a UE or a network node (such as a CU, a DU, an RU, or a base station), using the reception component 1302 and the transmission component 1304.

In some aspects, the apparatus 1300 may be configured to perform one or more operations described herein in connection with FIGS. 9A-10. Additionally, or alternatively, apparatus 1300 may be configured to perform one or more processes described herein, such as process 1100 of FIG. 11. In some aspects, the apparatus 1300 and/or one or more components shown in FIG. 13 may include one or more components of the UE 120 described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1308. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE 120 described in connection with FIG. 2.

The transmission component 1304 may transmit communications, such as reference signals, control information, data communications, or a combination thereof, to the apparatus 1308. In some aspects, one or more other components of the apparatus 1300 may generate communications and may provide the generated communications to the transmission component 1304 for transmission to the apparatus 1308. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1308. In some aspects, the transmission component 1304 may include one or more antennas, a modem, a modulator, a transmit MIMO processor, a transmit processor, a controller/processor, a memory, or a combination thereof, of the UE 120 described in connection with FIG. 2. In some aspects, the transmission component 1304 may be co-located with the reception component 1302 in a transceiver.

The communication manager 1306 may support operations of the reception component 1302 and/or the transmission component 1304. For example, the communication manager 1306 may receive information associated with configuring reception of communications by the reception component 1302 and/or transmission of communications by the transmission component 1304. Additionally, or alternatively, the communication manager 1306 may generate and/or provide control information to the reception component 1302 and/or the transmission component 1304 to control reception and/or transmission of communications.

The reception component 1302 may receive configuration information that configures one or more SRS resource sets, the one or more SRS resource sets including one or more SRS resources associated with an FD set of symbols and one or more SRS resources associated with a non-FD set of symbols. The transmission component 1304 may transmit a first SRS using the one or more SRS resources associated with the FD set of symbols and a second SRS using the one or more SRS resources associated with the non-FD set of symbols. The reception component 1302 may receive at least one of an RRC communication or a DCI communication indicating at least one of the one or more SRS resources associated with the FD set of symbols or the one or more SRS resources associated with the non-FD set of symbols that are to be used for an uplink transmission repetition. The transmission component 1304 may transmit, based at least in part on the at least one of the RRC communication or the DCI communication, the uplink transmission repetition in one of: only the FD set of symbols, only the non-FD set of symbols, or both the FD set of symbols and the non-FD set of symbols.

The transmission component 1304 may transmit capability information indicating one of a capability of uplink transmission repetition across the FD set of symbols only, a capability of uplink transmission repetition across the non-FD set of symbols only, or a capability of uplink transmission repetition across both the FD set of symbols and the non-FD set of symbols, wherein the at least one of the RRC communication or the DCI communication is based at least in part on the capability information.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
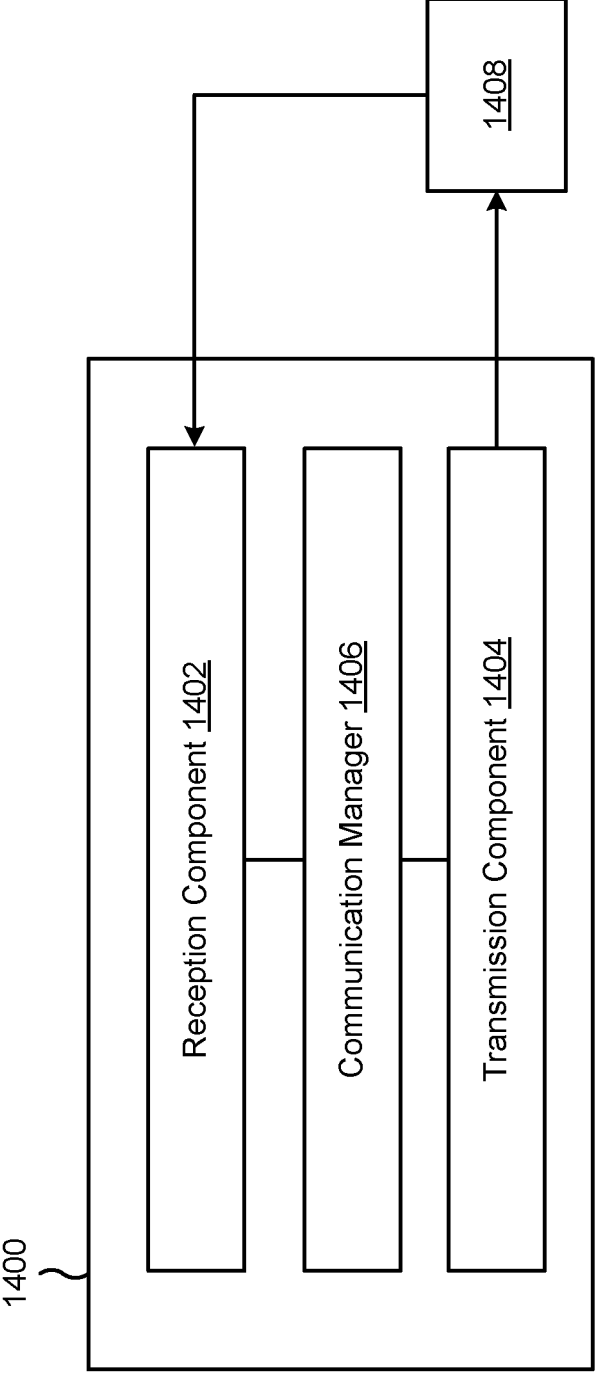
FIG. 14 is a diagram of an example apparatus for wireless communication, in accordance with the present disclosure.

FIG. 14 is a diagram of an example apparatus 1400 for wireless communication, in accordance with the present disclosure. The apparatus 1400 may be a network node, or a network node may include the apparatus 1400. In some aspects, the apparatus 1400 includes a reception component 1402, a transmission component 1404, and/or a communication manager 1406, which may be in communication with one another (for example, via one or more buses and/or one or more other components). In some aspects, the communication manager 1406 is the communication manager 150 described in connection with FIG. 1. As shown, the apparatus 1400 may communicate with another apparatus 1408, such as a UE or a network node (such as a CU, a DU, an RU, or a base station), using the reception component 1402 and the transmission component 1404.

In some aspects, the apparatus 1400 may be configured to perform one or more operations described herein in connection with FIGS. 9A-10. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the network node described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1408. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the network node 110 described in connection with FIG. 2. In some aspects, the reception component 1402 and/or the transmission component 1404 may include or may be included in a network interface. The network interface may be configured to obtain and/or output signals for the apparatus 1400 via one or more communications links, such as a backhaul link, a midhaul link, and/or a fronthaul link.

The transmission component 1404 may transmit communications, such as reference signals, control information, data communications, or a combination thereof, to the apparatus 1408. In some aspects, one or more other components of the apparatus 1400 may generate communications and may provide the generated communications to the transmission component 1404 for transmission to the apparatus 1408. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1408. In some aspects, the transmission component 1404 may include one or more antennas, a modem, a modulator, a transmit MIMO processor, a transmit processor, a controller/processor, a memory, or a combination thereof, of the network node 110 described in connection with FIG. 2. In some aspects, the transmission component 1404 may be co-located with the reception component 1402 in a transceiver.

The communication manager 1406 may support operations of the reception component 1402 and/or the transmission component 1404. For example, the communication manager 1406 may receive information associated with configuring reception of communications by the reception component 1402 and/or transmission of communications by the transmission component 1404. Additionally, or alternatively, the communication manager 1406 may generate and/or provide control information to the reception component 1402 and/or the transmission component 1404 to control reception and/or transmission of communications.

The transmission component 1404 may transmit, to a UE, configuration information that configures one or more SRS resource sets, the one or more SRS resource sets including one or more SRS resources associated with an FD set of symbols and one or more SRS resources associated with a non-FD set of symbols. The reception component 1402 may receive, from the UE, a first SRS using the one or more SRS resources associated with the FD set of symbols and a second SRS using the one or more SRS resources associated with the non-FD set of symbols. The transmission component 1404 may transmit, to the UE, at least one of an RRC communication or a DCI communication indicating at least one of the one or more SRS resources associated with the FD set of symbols or the one or more SRS resources associated with the non-FD set of symbols that are to be used for an uplink transmission repetition. The reception component 1402 may receive, from the UE and based at least in part on the at least one of the RRC communication or the DCI communication, the uplink transmission repetition in one of: only the FD set of symbols, only the non-FD set of symbols, or both the FD set of symbols and the non-FD set of symbols.

The reception component 1402 may receive capability information indicating one of a UE capability of uplink transmission repetition across the FD set of symbols only, a UE capability of uplink transmission repetition across the non-FD set of symbols only, or a UE capability of uplink transmission repetition across both the FD set of symbols and the non-FD set of symbols, wherein the at least one of the RRC communication or the DCI communication is based at least in part on the capability information.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a UE, comprising: receiving configuration information that configures one or more SRS resource sets, the one or more SRS resource sets including one or more SRS resources associated with an FD set of symbols and one or more SRS resources associated with a non-FD set of symbols; transmitting a first SRS using the one or more SRS resources associated with the FD set of symbols and a second SRS using the one or more SRS resources associated with the non-FD set of symbols; receiving at least one of an RRC communication or a DCI communication indicating at least one of the one or more SRS resources associated with the FD set of symbols or the one or more SRS resources associated with the non-FD set of symbols that are to be used for an uplink transmission repetition; and transmitting, based at least in part on the at least one of the RRC communication or the DCI communication, the uplink transmission repetition in one of: only the FD set of symbols, only the non-FD set of symbols, or both the FD set of symbols and the non-FD set of symbols.

Aspect 2: The method of Aspect 1, wherein the at least one of the RRC communication or the DCI communication indicates, using one of an SRS resource set indicator field or a duplex repetition indicator field, the at least one of the one or more SRS resources associated with the FD set of symbols or the one or more SRS resources associated with the non-FD set of symbols that is to be used for the uplink transmission repetition in at least one of the FD set of symbols or the non-FD set of symbols.

Aspect 3: The method of any of Aspects 1-2, wherein the one or more SRS resource sets include a first SRS resource set associated with repetition occasions in the FD set of symbols and a second SRS resource set associated with repetition occasions in the non-FD set of symbols.

Aspect 4: The method of Aspect 3, wherein the at least one of the RRC communication or the DCI communication indicates that the second SRS resource set is associated with the uplink transmission repetition, and wherein transmitting the uplink transmission repetition includes transmitting the uplink transmission repetition using only the non-FD set of symbols.

Aspect 5: The method of Aspect 3, wherein the at least one of the RRC communication or the DCI communication indicates that the first SRS resource set is associated with the uplink transmission repetition, and wherein transmitting the uplink transmission repetition includes transmitting the uplink transmission repetition using only the FD set of symbols.

Aspect 6: The method of Aspect 3, wherein the at least one of the RRC communication or the DCI communication indicates that the first SRS resource set and the second SRS resource set are associated with the uplink transmission repetition, wherein the at least one of the RRC communication or the DCI communication indicates that the uplink transmission repetition is to begin in a slot associated with the non-FD set of symbols, and wherein transmitting the uplink transmission repetition includes transmitting the uplink transmission repetition using the FD set of symbols and the non-FD set of symbols, beginning in the slot associated with the non-FD set of symbols.

Aspect 7: The method of Aspect 3, wherein the at least one of the RRC communication or the DCI communication indicates that the first SRS resource set and the second SRS resource set are associated with the uplink transmission repetition, wherein the at least one of the RRC communication or the DCI communication indicates that the uplink transmission repetition is to begin in a slot associated with the FD set of symbols, and wherein transmitting the uplink transmission repetition includes transmitting the uplink transmission repetition using the FD set of symbols and the non-FD set of symbols, beginning in the slot associated with the FD set of symbols.

Aspect 8: The method of Aspect 3, wherein the at least one of the RRC communication or the DCI communication indicates that the first SRS resource set and the second SRS resource set are associated with the uplink transmission repetition, wherein the at least one of the RRC communication or the DCI communication indicates that the uplink transmission repetition is not associated with a frequency offset, and wherein transmitting the uplink transmission repetition includes transmitting the uplink transmission repetition using a set of frequency resources in the FD set of symbols and using the set of frequency resources in the non-FD set of symbols.

Aspect 9: The method of Aspect 3, wherein the at least one of the RRC communication or the DCI communication indicates that the first SRS resource set and the second SRS resource set are associated with the uplink transmission repetition, wherein the at least one of the RRC communication or the DCI communication indicates that the uplink transmission repetition is associated with a frequency offset, and wherein transmitting the uplink transmission repetition includes transmitting the uplink transmission repetition using a first set of frequency resources in the FD set of symbols and using a second set of frequency resources in the non-FD set of symbols, the first set of frequency resources being separated from the second set of frequency resources by the frequency offset.

Aspect 10: The method of Aspect 3, wherein the at least one of the RRC communication or the DCI communication indicates that the first SRS resource set and the second SRS resource set are associated with the uplink transmission repetition, wherein the at least one of the RRC communication or the DCI communication indicates a timing offset associated with a slot in which the uplink transmission repetition is to begin, and wherein transmitting the uplink transmission repetition includes transmitting the uplink transmission repetition using the FD set of symbols and the non-FD set of symbols, beginning in the slot indicated by the timing offset.

Aspect 11: The method of Aspect 3, wherein the at least one of the RRC communication or the DCI communication indicates that the uplink transmission repetition is a duplex-specific transmission repetition, wherein the at least one of the RRC communication or the DCI communication indicates a timing offset associated with a slot in which the uplink transmission repetition is to begin, the slot being associated with one of the FD set of symbols or the non-FD set of symbols, and wherein transmitting the uplink transmission repetition includes transmitting the uplink transmission repetition using the one of the FD set of symbols or the non-FD set of symbols.

Aspect 12: The method of Aspect 3, wherein the at least one of the RRC communication or the DCI communication indicates that the uplink transmission repetition is not a duplex-specific transmission repetition, wherein the at least one of the RRC communication or the DCI communication indicates a timing offset associated with a slot in which the uplink transmission repetition is to begin, and wherein transmitting the uplink transmission repetition includes transmitting the uplink transmission repetition using both of the FD set of symbols and the non-FD set of symbols, beginning in the slot indicated by the timing offset.

Aspect 13: The method of any of Aspects 1-2, wherein the one or more SRS resource sets include an SRS resource set associated with a first group of SRS resources associated with repetition occasions in the FD set of symbols and a second group of SRS resources associated with repetition occasions in the non-FD set of symbols.

Aspect 14: The method of Aspect 13, wherein the at least one of the RRC communication or the DCI communication indicates that the second group of SRS resources are associated with the uplink transmission repetition, and wherein transmitting the uplink transmission repetition includes transmitting the uplink transmission repetition using only the non-FD set of symbols.

Aspect 15: The method of Aspect 13, wherein the at least one of the RRC communication or the DCI communication indicates that the first group of SRS resources are associated with the uplink transmission repetition, and wherein transmitting the uplink transmission repetition includes transmitting the uplink transmission repetition using only the FD set of symbols.

Aspect 16: The method of Aspect 13, wherein the at least one of the RRC communication or the DCI communication indicates that the first group of SRS resources and the second group of SRS resources are associated with the uplink transmission repetition, wherein the at least one of the RRC communication or the DCI communication indicates that the uplink transmission repetition is to begin in a slot associated with the non-FD set of symbols, and wherein transmitting the uplink transmission repetition includes transmitting the uplink transmission repetition using the FD set of symbols and the non-FD set of symbols, beginning in the slot associated with the non-FD set of symbols.

Aspect 17: The method of Aspect 13, wherein the at least one of the RRC communication or the DCI communication indicates that the first group of SRS resources and the second group of SRS resources are associated with the uplink transmission repetition, wherein the at least one of the RRC communication or the DCI communication indicates that the uplink transmission repetition is to begin in a slot associated with the FD set of symbols, and wherein transmitting the uplink transmission repetition includes transmitting the uplink transmission repetition using the FD set of symbols and the non-FD set of symbols, beginning in the slot associated with the FD set of symbols.

Aspect 18: The method of Aspect 13, wherein the at least one of the RRC communication or the DCI communication indicates that the first group of SRS resources and the second group of SRS resources are associated with the uplink transmission repetition, wherein the at least one of the RRC communication or the DCI communication indicates that the uplink transmission repetition is not associated with a frequency offset, and wherein transmitting the uplink transmission repetition includes transmitting the uplink transmission repetition using a set of frequency resources in the FD set of symbols and using the set of frequency resources in the non-FD set of symbols.

Aspect 19: The method of Aspect 13, wherein the at least one of the RRC communication or the DCI communication indicates that the first group of SRS resources and the second group of SRS resources are associated with the uplink transmission repetition, wherein the at least one of the RRC communication or the DCI communication indicates that the uplink transmission repetition is associated with a frequency offset, and wherein transmitting the uplink transmission repetition includes transmitting the uplink transmission repetition using a first set of frequency resources in the FD set of symbols and using a second set of frequency resources in the non-FD set of symbols, the first set of frequency resources being separated from the second set of frequency resources by the frequency offset.

Aspect 20: The method of Aspect 13, wherein the at least one of the RRC communication or the DCI communication indicates that the first group of SRS resources and the second group of SRS resources are associated with the uplink transmission repetition, wherein the at least one of the RRC communication or the DCI communication indicates a timing offset associated with a slot in which the uplink transmission repetition is to begin, and wherein transmitting the uplink transmission repetition includes transmitting the uplink transmission repetition using the FD set of symbols and the non-FD set of symbols, beginning in the slot indicated by the timing offset.

Aspect 21: The method of Aspect 13, wherein the at least one of the RRC communication or the DCI communication indicates that the uplink transmission repetition is a duplex-specific transmission repetition, wherein the at least one of the RRC communication or the DCI communication indicates a timing offset associated with a slot in which the uplink transmission repetition is to begin, the slot being associated with one of the FD set of symbols or the non-FD set of symbols, and wherein transmitting the uplink transmission repetition includes transmitting the uplink transmission repetition using the one of the FD set of symbols or the non-FD set of symbols.

Aspect 22: The method of Aspect 13, wherein the at least one of the RRC communication or the DCI communication indicates that the uplink transmission repetition is not a duplex-specific transmission repetition, wherein the at least one of the RRC communication or the DCI communication indicates a timing offset associated with a slot in which the uplink transmission repetition is to begin, and wherein transmitting the uplink transmission repetition includes transmitting the uplink transmission repetition using both of the FD set of symbols and the non-FD set of symbols, beginning in the slot indicated by the timing offset.

Aspect 23: The method of any of Aspects 1-22, wherein the uplink transmission repetition is associated with a PUSCH repetition, wherein the at least one of the RRC communication or the DCI communication indicates that the PUSCH repetition is to be transmitted in both the FD set of symbols and the non-FD set of symbols, and wherein the at least one of the RRC communication or the DCI communication indicates: a first SRI associated with the FD set of symbols, a first TPMI associated with the FD set of symbols, a second SRI associated with the non-FD set of symbols, and a second TPMI associated with the non-FD set of symbols.

Aspect 24: The method of any of Aspects 1-23, wherein the uplink transmission repetition is associated with a PUCCH repetition, wherein the at least one of the RRC communication or the DCI communication indicates that the PUCCH repetition is a duplex-specific PUCCH repetition, wherein the at least one of the RRC communication or the DCI communication indicates a timing offset associated with a slot in which the PUCCH repetition is to begin, the slot being associated with one of the FD set of symbols or the non-FD set of symbols, and wherein transmitting the uplink transmission repetition includes transmitting the PUCCH repetition using the one of the FD set of symbols or the non-FD set of symbols.

Aspect 25: The method of any of Aspects 1-24, wherein the uplink transmission repetition is associated with a PUCCH repetition, wherein the at least one of the RRC communication or the DCI communication indicates that the PUCCH repetition is not a duplex-specific transmission repetition, and wherein transmitting the uplink transmission repetition includes transmitting the PUCCH repetition using both of the FD set of symbols and the non-FD set of symbols.

Aspect 26: The method of any of Aspects 1-25, further comprising transmitting capability information indicating one of: a capability of uplink transmission repetition across the FD set of symbols only, a capability of uplink transmission repetition across the non-FD set of symbols only, or a capability of uplink transmission repetition across both the FD set of symbols and the non-FD set of symbols, wherein the at least one of the RRC communication or the DCI communication is based at least in part on the capability information.

Aspect 27: A method of wireless communication performed by a network node, comprising: transmitting, to a UE, configuration information that configures one or more SRS resource sets, the one or more SRS resource sets including one or more SRS resources associated with an FD set of symbols and one or more SRS resources associated with a non-FD set of symbols; receiving, from the UE, a first SRS using the one or more SRS resources associated with the FD set of symbols and a second SRS using the one or more SRS resources associated with the non-FD set of symbols; transmitting, to the UE, at least one of an RRC communication or a DCI communication indicating at least one of the one or more SRS resources associated with the FD set of symbols or the one or more SRS resources associated with the non-FD set of symbols that are to be used for an uplink transmission repetition; and receiving, from the UE and based at least in part on the at least one of the RRC communication or the DCI communication, the uplink transmission repetition in one of: only the FD set of symbols, only the non-FD set of symbols, or both the FD set of symbols and the non-FD set of symbols.

Aspect 28: The method of Aspect 27, wherein the at least one of the RRC communication or the DCI communication indicates, using one of an SRS resource set indicator field or a duplex repetition indicator field, the at least one of the one or more SRS resources associated with the FD set of symbols or the one or more SRS resources associated with the non-FD set of symbols that is to be used for the uplink transmission repetition in at least one of the FD set of symbols or the non-FD set of symbols.

Aspect 29: The method of any of Aspects 27-28, wherein the one or more SRS resource sets include a first SRS resource set associated with repetition occasions in the FD set of symbols and a second SRS resource set associated with repetition occasions in the non-FD set of symbols.

Aspect 30: The method of Aspect 29, wherein the at least one of the RRC communication or the DCI communication indicates that the second SRS resource set is associated with the uplink transmission repetition, and wherein receiving the uplink transmission repetition includes receiving the uplink transmission repetition using only the non-FD set of symbols.

Aspect 31: The method of Aspect 29, wherein the at least one of the RRC communication or the DCI communication indicates that the first SRS resource set is associated with the uplink transmission repetition, and wherein receiving the uplink transmission repetition includes receiving the uplink transmission repetition using only the FD set of symbols.

Aspect 32: The method of Aspect 29, wherein the at least one of the RRC communication or the DCI communication indicates that the first SRS resource set and the second SRS resource set are associated with the uplink transmission repetition, wherein the at least one of the RRC communication or the DCI communication indicates that the uplink transmission repetition is to begin in a slot associated with the non-FD set of symbols, and wherein receiving the uplink transmission repetition includes receiving the uplink transmission repetition using the FD set of symbols and the non-FD set of symbols, beginning in the slot associated with the non-FD set of symbols.

Aspect 33: The method of Aspect 29, wherein the at least one of the RRC communication or the DCI communication indicates that the first SRS resource set and the second SRS resource set are associated with the uplink transmission repetition, wherein the at least one of the RRC communication or the DCI communication indicates that the uplink transmission repetition is to begin in a slot associated with the FD set of symbols, and wherein receiving the uplink transmission repetition includes receiving the uplink transmission repetition using the FD set of symbols and the non-FD set of symbols, beginning in the slot associated with the FD set of symbols.

Aspect 34: The method of Aspect 29, wherein the at least one of the RRC communication or the DCI communication indicates that the first SRS resource set and the second SRS resource set are associated with the uplink transmission repetition, wherein the at least one of the RRC communication or the DCI communication indicates that the uplink transmission repetition is not associated with a frequency offset, and wherein receiving the uplink transmission repetition includes receiving the uplink transmission repetition using a set of frequency resources in the FD set of symbols and using the set of frequency resources in the non-FD set of symbols.

Aspect 35: The method of Aspect 29, wherein the at least one of the RRC communication or the DCI communication indicates that the first SRS resource set and the second SRS resource set are associated with the uplink transmission repetition, wherein the at least one of the RRC communication or the DCI communication indicates that the uplink transmission repetition is associated with a frequency offset, and wherein receiving the uplink transmission repetition includes receiving the uplink transmission repetition using a first set of frequency resources in the FD set of symbols and using a second set of frequency resources in the non-FD set of symbols, the first set of frequency resources being separated from the second set of frequency resources by the frequency offset.

Aspect 36: The method of Aspect 29, wherein the at least one of the RRC communication or the DCI communication indicates that the first SRS resource set and the second SRS resource set are associated with the uplink transmission repetition, wherein the at least one of the RRC communication or the DCI communication indicates a timing offset associated with a slot in which the uplink transmission repetition is to begin, and wherein receiving the uplink transmission repetition includes receiving the uplink transmission repetition using the FD set of symbols and the non-FD set of symbols, beginning in the slot indicated by the timing offset.

Aspect 37: The method of Aspect 29, wherein the at least one of the RRC communication or the DCI communication indicates that the uplink transmission repetition is a duplex-specific transmission repetition, wherein the at least one of the RRC communication or the DCI communication indicates a timing offset associated with a slot in which the uplink transmission repetition is to begin, the slot being associated with one of the FD set of symbols or the non-FD set of symbols, and wherein receiving the uplink transmission repetition includes receiving the uplink transmission repetition using the one of the FD set of symbols or the non-FD set of symbols.

Aspect 38: The method of Aspect 29, wherein the at least one of the RRC communication or the DCI communication indicates that the uplink transmission repetition is not a duplex-specific transmission repetition, wherein the at least one of the RRC communication or the DCI communication indicates a timing offset associated with a slot in which the uplink transmission repetition is to begin, and wherein receiving the uplink transmission repetition includes receiving the uplink transmission repetition using both of the FD set of symbols and the non-FD set of symbols, beginning in the slot indicated by the timing offset.

Aspect 39: The method of any of Aspects 27-28, wherein the one or more SRS resource sets include an SRS resource set associated with a first group of SRS resources associated with repetition occasions in the FD set of symbols and a second group of SRS resources associated with repetition occasions in the non-FD set of symbols.

Aspect 40: The method of Aspect 39, wherein the at least one of the RRC communication or the DCI communication indicates that the second group of SRS resources are associated with the uplink transmission repetition, and wherein receiving the uplink transmission repetition includes receiving the uplink transmission repetition using only the non-FD set of symbols.

Aspect 41: The method of Aspect 39, wherein the at least one of the RRC communication or the DCI communication indicates that the first group of SRS resources are associated with the uplink transmission repetition, and wherein receiving the uplink transmission repetition includes receiving the uplink transmission repetition using only the FD set of symbols.

Aspect 42: The method of Aspect 39, wherein the at least one of the RRC communication or the DCI communication indicates that the first group of SRS resources and the second group of SRS resources are associated with the uplink transmission repetition, wherein the at least one of the RRC communication or the DCI communication indicates that the uplink transmission repetition is to begin in a slot associated with the non-FD set of symbols, and wherein receiving the uplink transmission repetition includes receiving the uplink transmission repetition using the FD set of symbols and the non-FD set of symbols, beginning in the slot associated with the non-FD set of symbols.

Aspect 43: The method of Aspect 39, wherein the at least one of the RRC communication or the DCI communication indicates that the first group of SRS resources and the second group of SRS resources are associated with the uplink transmission repetition, wherein the at least one of the RRC communication or the DCI communication indicates that the uplink transmission repetition is to begin in a slot associated with the FD set of symbols, and wherein receiving the uplink transmission repetition includes receiving the uplink transmission repetition using the FD set of symbols and the non-FD set of symbols, beginning in the slot associated with the FD set of symbols.

Aspect 44: The method of Aspect 39, wherein the at least one of the RRC communication or the DCI communication indicates that the first group of SRS resources and the second group of SRS resources are associated with the uplink transmission repetition, wherein the at least one of the RRC communication or the DCI communication indicates that the uplink transmission repetition is not associated with a frequency offset, and wherein receiving the uplink transmission repetition includes receiving the uplink transmission repetition using a set of frequency resources in the FD set of symbols and using the set of frequency resources in the non-FD set of symbols.

Aspect 45: The method of Aspect 39, wherein the at least one of the RRC communication or the DCI communication indicates that the first group of SRS resources and the second group of SRS resources are associated with the uplink transmission repetition, wherein the at least one of the RRC communication or the DCI communication indicates that the uplink transmission repetition is associated with a frequency offset, and wherein receiving the uplink transmission repetition includes receiving the uplink transmission repetition using a first set of frequency resources in the FD set of symbols and using a second set of frequency resources in the non-FD set of symbols, the first set of frequency resources being separated from the second set of frequency resources by the frequency offset.

Aspect 46: The method of Aspect 39, wherein the at least one of the RRC communication or the DCI communication indicates that the first group of SRS resources and the second group of SRS resources are associated with the uplink transmission repetition, wherein the at least one of the RRC communication or the DCI communication indicates a timing offset associated with a slot in which the uplink transmission repetition is to begin, and wherein receiving the uplink transmission repetition includes receiving the uplink transmission repetition using the FD set of symbols and the non-FD set of symbols, beginning in the slot indicated by the timing offset.

Aspect 47: The method of Aspect 39, wherein the at least one of the RRC communication or the DCI communication indicates that the uplink transmission repetition is a duplex-specific transmission repetition, wherein the at least one of the RRC communication or the DCI communication indicates a timing offset associated with a slot in which the uplink transmission repetition is to begin, the slot being associated with one of the FD set of symbols or the non-FD set of symbols, and wherein receiving the uplink transmission repetition includes receiving the uplink transmission repetition using the one of the FD set of symbols or the non-FD set of symbols.

Aspect 48: The method of Aspect 39, wherein the at least one of the RRC communication or the DCI communication indicates that the uplink transmission repetition is not a duplex-specific transmission repetition, wherein the at least one of the RRC communication or the DCI communication indicates a timing offset associated with a slot in which the uplink transmission repetition is to begin, and wherein receiving the uplink transmission repetition includes receiving the uplink transmission repetition using both of the FD set of symbols and the non-FD set of symbols, beginning in the slot indicated by the timing offset.

Aspect 49: The method of any of Aspects 27-48, wherein the uplink transmission repetition is associated with a PUSCH repetition, wherein the at least one of the RRC communication or the DCI communication indicates that the PUSCH repetition is to be transmitted in both the FD set of symbols and the non-FD set of symbols, and wherein the at least one of the RRC communication or the DCI communication indicates: a first SRI associated with the FD set of symbols, a first TPMI associated with the FD set of symbols, a second SRI associated with the non-FD set of symbols, and a second TPMI associated with the non-FD set of symbols.

Aspect 50: The method of any of Aspects 27-49, wherein the uplink transmission repetition is associated with a PUCCH repetition, wherein the at least one of the RRC communication or the DCI communication indicates that the PUCCH repetition is a duplex-specific PUCCH repetition, wherein the at least one of the RRC communication or the DCI communication indicates a timing offset associated with a slot in which the PUCCH repetition is to begin, the slot being associated with one of the FD set of symbols or the non-FD set of symbols, and wherein receiving the uplink transmission repetition includes receiving the PUCCH repetition using the one of the FD set of symbols or the non-FD set of symbols.

Aspect 51: The method of any of Aspects 27-50, wherein the uplink transmission repetition is associated with a PUCCH repetition, wherein the at least one of the RRC communication or the DCI communication indicates that the PUCCH repetition is not a duplex-specific transmission repetition, and wherein receiving the uplink transmission repetition includes receiving the PUCCH repetition using both of the FD set of symbols and the non-FD set of symbols.

Aspect 52: The method of any of Aspects 27-51, further comprising receiving capability information indicating one of: a UE capability of uplink transmission repetition across the FD set of symbols only, a UE capability of uplink transmission repetition across the non-FD set of symbols only, or a UE capability of uplink transmission repetition across both the FD set of symbols and the non-FD set of symbols, wherein the at least one of the RRC communication or the DCI communication is based at least in part on the capability information.

Aspect 53: An apparatus for wireless communication at a device, comprising a processor; memory coupled with the processor; and instructions stored in the memory and executable by the processor to cause the apparatus to perform the method of one or more of Aspects 1-52.

Aspect 54: A device for wireless communication, comprising one or more memories and one or more processors, coupled to the one or more memories, which, individually or in any combination, are operable to cause the device to perform the method of one or more of Aspects 1-52.

Aspect 55: An apparatus for wireless communication, comprising at least one means for performing the method of one or more of Aspects 1-52.

Aspect 56: A non-transitory computer-readable medium storing code for wireless communication, the code comprising instructions executable by a processor to perform the method of one or more of Aspects 1-52.

Aspect 57: A non-transitory computer-readable medium storing a set of instructions for wireless communication, the set of instructions comprising one or more instructions that, when executed by one or more processors of a device, cause the device to perform the method of one or more of Aspects 1-52.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and one or more processors, coupled to the one or more memories, which, individually or in any combination, are operable to cause the UE to:

receive configuration information that configures one or more sounding reference signal (SRS) resource sets, the one or more SRS resource sets including one or more SRS resources associated with a full duplex (FD) set of symbols and one or more SRS resources associated with a non-FD set of symbols, wherein the one or more SRS resource sets include a first SRS resource set associated with repetition occasions in the FD set of symbols and a second SRS resource set associated with repetition occasions in the non-FD set of symbols;

transmit a first SRS using the one or more SRS resources associated with the FD set of symbols and a second SRS using the one or more SRS resources associated with the non-FD set of symbols;

receive at least one of a radio resource control (RRC) communication or a downlink control information (DCI) communication indicating that: the first SRS resource set is to be associated with an uplink transmission repetition, the first SRS resource set and the second resource set are associated with the uplink transmission repetition, or the second SRS resource set is to be associated with the uplink transmission repetition; and transmit, based at least in part on the at least one of the RRC communication or the DCI communication, the uplink transmission repetition in one of: only the FD set of symbols, only the non-FD set of symbols, or both the FD set of symbols and the non-FD set of symbols.

2. The UE of claim 1, wherein the at least one of the RRC communication or the DCI communication indicates, using one of an SRS resource set indicator field or a duplex repetition indicator field, the at least one of the one or more SRS resources associated with the FD set of symbols or the one or more SRS resources associated with the non-FD set of symbols that is to be used for the uplink transmission repetition in at least one of the FD set of symbols or the non-FD set of symbols.

3. The UE of claim 1, wherein the at least one of the RRC communication or the DCI communication indicates that the second SRS resource set is associated with the uplink transmission repetition, and wherein the one or more processors, to transmit the uplink transmission repetition, are operable to cause the UE to transmit the uplink transmission repetition using only the non-FD set of symbols.

4. The UE of claim 1, wherein the at least one of the RRC communication or the DCI communication indicates that the first SRS resource set is associated with the uplink transmission repetition, and wherein the one or more processors, to transmit the uplink transmission repetition, are operable to cause the UE to transmit the uplink transmission repetition using only the FD set of symbols.

5. The UE of claim 1, wherein the at least one of the RRC communication or the DCI communication indicates that the first SRS resource set and the second SRS resource set are associated with the uplink transmission repetition, wherein the at least one of the RRC communication or the DCI communication indicates that the uplink transmission repetition is to begin in a slot associated with the non-FD set of symbols, and wherein the one or more processors, to transmit the uplink transmission repetition, are operable to cause the UE to transmit the uplink transmission repetition using the FD set of symbols and the non-FD set of symbols, beginning in the slot associated with the non-FD set of symbols.

6. The UE of claim 1, wherein the at least one of the RRC communication or the DCI communication indicates that the first SRS resource set and the second SRS resource set are associated with the uplink transmission repetition, wherein the at least one of the RRC communication or the DCI communication indicates that the uplink transmission repetition is to begin in a slot associated with the FD set of symbols, and wherein the one or more processors, to transmit the uplink transmission repetition, are operable to cause the UE to transmit the uplink transmission repetition using the FD set of symbols and the non-FD set of symbols, beginning in the slot associated with the FD set of symbols.

7. The UE of claim 1, wherein the at least one of the RRC communication or the DCI communication indicates that the first SRS resource set and the second SRS resource set are associated with the uplink transmission repetition, wherein the at least one of the RRC communication or the DCI communication indicates that the uplink transmission repetition is not associated with a frequency offset, and wherein the one or more processors, to transmit the uplink transmission repetition, are operable to cause the UE to transmit the uplink transmission repetition using a set of frequency resources in the FD set of symbols and using the set of frequency resources in the non-FD set of symbols.

8. The UE of claim 1, wherein the at least one of the RRC communication or the DCI communication indicates that the first SRS resource set and the second SRS resource set are associated with the uplink transmission repetition, wherein the at least one of the RRC communication or the DCI communication indicates that the uplink transmission repetition is associated with a frequency offset, and wherein the one or more processors, to transmit the uplink transmission repetition, are operable to cause the UE to transmit the uplink transmission repetition using a first set of frequency resources in the FD set of symbols and using a second set of frequency resources in the non-FD set of symbols, the first set of frequency resources being separated from the second set of frequency resources by the frequency offset.

9. The UE of claim 1, wherein the at least one of the RRC communication or the DCI communication indicates that the first SRS resource set and the second SRS resource set are associated with the uplink transmission repetition, wherein the at least one of the RRC communication or the DCI communication indicates a timing offset associated with a slot in which the uplink transmission repetition is to begin, and wherein the one or more processors, to transmit the uplink transmission repetition, are operable to cause the UE to transmit the uplink transmission repetition using the FD set of symbols and the non-FD set of symbols, beginning in the slot indicated by the timing offset.

10. The UE of claim 1, wherein the at least one of the RRC communication or the DCI communication indicates that the uplink transmission repetition is a duplex-specific transmission repetition, wherein the at least one of the RRC communication or the DCI communication indicates a timing offset associated with a slot in which the uplink transmission repetition is to begin, the slot being associated with one of the FD set of symbols or the non-FD set of symbols, and wherein the one or more processors, to transmit the uplink transmission repetition, are operable to cause the UE to transmit the uplink transmission repetition using the one of the FD set of symbols or the non-FD set of symbols.

11. The UE of claim 1, wherein the at least one of the RRC communication or the DCI communication indicates that the uplink transmission repetition is not a duplex-specific transmission repetition, wherein the at least one of the RRC communication or the DCI communication indicates a timing offset associated with a slot in which the uplink transmission repetition is to begin, and wherein the one or more processors, to transmit the uplink transmission repetition, are operable to cause the UE to transmit the uplink transmission repetition using both of the FD set of symbols and the non-FD set of symbols, beginning in the slot indicated by the timing offset.

12. The UE of claim 1, wherein the one or more SRS resource sets include an SRS resource set associated with a first group of SRS resources associated with repetition occasions in the FD set of symbols and a second group of SRS resources associated with repetition occasions in the non-FD set of symbols.

13. The UE of claim 12, wherein the at least one of the RRC communication or the DCI communication indicates that the second group of SRS resources are associated with the uplink transmission repetition, and wherein the one or more processors, to transmit the uplink transmission repetition, are operable to cause the UE to transmit the uplink transmission repetition using only the non-FD set of symbols.

14. The UE of claim 12, wherein the at least one of the RRC communication or the DCI communication indicates that the first group of SRS resources are associated with the uplink transmission repetition, and wherein the one or more processors, to transmit the uplink transmission repetition, are operable to cause the UE to transmit the uplink transmission repetition using only the FD set of symbols.

15. The UE of claim 12, wherein the at least one of the RRC communication or the DCI communication indicates that the first group of SRS resources and the second group of SRS resources are associated with the uplink transmission repetition, wherein the at least one of the RRC communication or the DCI communication indicates that the uplink transmission repetition is to begin in a slot associated with the non-FD set of symbols, and wherein the one or more processors, to transmit the uplink transmission repetition, are operable to cause the UE to transmit the uplink transmission repetition using the FD set of symbols and the non-FD set of symbols, beginning in the slot associated with the non-FD set of symbols.

16. The UE of claim 12, wherein the at least one of the RRC communication or the DCI communication indicates that the first group of SRS resources and the second group of SRS resources are associated with the uplink transmission repetition, wherein the at least one of the RRC communication or the DCI communication indicates that the uplink transmission repetition is to begin in a slot associated with the FD set of symbols, and wherein the one or more processors, to transmit the uplink transmission repetition, are operable to cause the UE to transmit the uplink transmission repetition using the FD set of symbols and the non-FD set of symbols, beginning in the slot associated with the FD set of symbols.

17. The UE of claim 12, wherein the at least one of the RRC communication or the DCI communication indicates that the first group of SRS resources and the second group of SRS resources are associated with the uplink transmission repetition, wherein the at least one of the RRC communication or the DCI communication indicates that the uplink transmission repetition is not associated with a frequency offset, and wherein the one or more processors, to transmit the uplink transmission repetition, are operable to cause the UE to transmit the uplink transmission repetition using a set of frequency resources in the FD set of symbols and using the set of frequency resources in the non-FD set of symbols.

18. The UE of claim 12, wherein the at least one of the RRC communication or the DCI communication indicates that the first group of SRS resources and the second group of SRS resources are associated with the uplink transmission repetition, wherein the at least one of the RRC communication or the DCI communication indicates that the uplink transmission repetition is associated with a frequency offset, and wherein the one or more processors, to transmit the uplink transmission repetition, are operable to cause the UE to transmit the uplink transmission repetition using a first set of frequency resources in the FD set of symbols and using a second set of frequency resources in the non-FD set of symbols, the first set of frequency resources being separated from the second set of frequency resources by the frequency offset.

19. The UE of claim 12, wherein the at least one of the RRC communication or the DCI communication indicates that the first group of SRS resources and the second group of SRS resources are associated with the uplink transmission repetition, wherein the at least one of the RRC communication or the DCI communication indicates a timing offset associated with a slot in which the uplink transmission repetition is to begin, and wherein the one or more processors, to transmit the uplink transmission repetition, are operable to cause the UE to transmit the uplink transmission repetition using the FD set of symbols and the non-FD set of symbols, beginning in the slot indicated by the timing offset.

20. The UE of claim 12, wherein the at least one of the RRC communication or the DCI communication indicates that the uplink transmission repetition is a duplex-specific transmission repetition, wherein the at least one of the RRC communication or the DCI communication indicates a timing offset associated with a slot in which the uplink transmission repetition is to begin, the slot being associated with one of the FD set of symbols or the non-FD set of symbols, and wherein the one or more processors, to transmit the uplink transmission repetition, are operable to cause the UE to transmit the uplink transmission repetition using the one of the FD set of symbols or the non-FD set of symbols.

21. The UE of claim 12, wherein the at least one of the RRC communication or the DCI communication indicates that the uplink transmission repetition is not a duplex-specific transmission repetition, wherein the at least one of the RRC communication or the DCI communication indicates a timing offset associated with a slot in which the uplink transmission repetition is to begin, and wherein the one or more processors, to transmit the uplink transmission repetition, are operable to cause the UE to transmit the uplink transmission repetition using both of the FD set of symbols and the non-FD set of symbols, beginning in the slot indicated by the timing offset.

22. The UE of claim 1, wherein the uplink transmission repetition is associated with a physical uplink shared channel (PUSCH) repetition, wherein the at least one of the RRC communication or the DCI communication indicates that the PUSCH repetition is to be transmitted in both the FD set of symbols and the non-FD set of symbols, and wherein the at least one of the RRC communication or the DCI communication indicates:

a first SRS resource indicator (SRI) associated with the FD set of symbols, a first transmitted precoding matrix indicator (TPMI) associated with the FD set of symbols, a second SRI associated with the non-FD set of symbols, and a second TPMI associated with the non-FD set of symbols.

23. The UE of claim 1, wherein the uplink transmission repetition is associated with a physical uplink control channel (PUCCH) repetition, wherein the at least one of the RRC communication or the DCI communication indicates that the PUCCH repetition is a duplex-specific PUCCH repetition, wherein the at least one of the RRC communication or the DCI communication indicates a timing offset associated with a slot in which the PUCCH repetition is to begin, the slot being associated with one of the FD set of symbols or the non-FD set of symbols, and wherein the one or more processors, to transmit the uplink transmission repetition, are operable to cause the UE to transmit the PUCCH repetition using the one of the FD set of symbols or the non-FD set of symbols.

24. The UE of claim 1, wherein the uplink transmission repetition is associated with a physical uplink control channel (PUCCH) repetition, wherein the at least one of the RRC communication or the DCI communication indicates that the PUCCH repetition is not a duplex-specific transmission repetition, and wherein the one or more processors, to transmit the uplink transmission repetition, are operable to cause the UE to transmit the PUCCH repetition using both of the FD set of symbols and the non-FD set of symbols.

25. The UE of claim 1, wherein the one or more processors are further operable to cause the UE to transmit capability information indicating one of:

a capability of uplink transmission repetition across the FD set of symbols only, a capability of uplink transmission repetition across the non-FD set of symbols only, or a capability of uplink transmission repetition across both the FD set of symbols and the non-FD set of symbols, wherein the at least one of the RRC communication or the DCI communication is based at least in part on the capability information.

26. A network node for wireless communication, comprising:

one or more memories; and one or more processors, coupled to the one or more memories, which, individually or in any combination, are operable to cause the network node to:

transmit, to a user equipment (UE), configuration information that configures one or more sounding reference signal (SRS) resource sets, the one or more SRS resource sets including one or more SRS resources associated with a full duplex (FD) set of symbols and one or more SRS resources associated with a non-FD set of symbols, wherein the one or more SRS resource sets include a first SRS resource set associated with repetition occasions in the FD set of symbols and a second SRS resource set associated with repetition occasions in the non-FD set of symbols;

receive, from the UE, a first SRS using the one or more SRS resources associated with the FD set of symbols and a second SRS using the one or more SRS resources associated with the non-FD set of symbols;

transmit, to the UE, at least one of a radio resource control (RRC) communication or a downlink control information (DCI) communication indicating that: the first SRS resource set is to be associated with an uplink transmission repetition, the first SRS resource set and the second resource set are associated with the uplink transmission repetition, or the second SRS resource set is to be associated with the uplink transmission repetition; and receive, from the UE and based at least in part on the at least one of the RRC communication or the DCI communication, the uplink transmission repetition in one of: only the FD set of symbols, only the non-FD set of symbols, or both the FD set of symbols and the non-FD set of symbols.

27. A method of wireless communication performed by a user equipment (UE), comprising:

receiving configuration information that configures one or more sounding reference signal (SRS) resource sets, the one or more SRS resource sets including one or more SRS resources associated with a full duplex (FD) set of symbols and one or more SRS resources associated with a non-FD set of symbols, wherein the one or more SRS resource sets include a first SRS resource set associated with repetition occasions in the FD set of symbols and a second SRS resource set associated with repetition occasions in the non-FD set of symbols;

transmitting a first SRS using the one or more SRS resources associated with the FD set of symbols and a second SRS using the one or more SRS resources associated with the non-FD set of symbols;

receiving at least one of a radio resource control (RRC) communication or a downlink control information (DCI) communication indicating that: the first SRS resource set is to be associated with an uplink transmission repetition, the first SRS resource set and the second resource set are associated with the uplink transmission repetition, or the second SRS resource set is to be associated with the uplink transmission repetition; and transmitting, based at least in part on the at least one of the RRC communication or the DCI communication, the uplink transmission repetition in one of: only the FD set of symbols, only the non-FD set of symbols, or both the FD set of symbols and the non-FD set of symbols.

28. A method of wireless communication performed by a network node, comprising:

transmitting, to a user equipment (UE), configuration information that configures one or more sounding reference signal (SRS) resource sets, the one or more SRS resource sets including one or more SRS resources associated with a full duplex (FD) set of symbols and one or more SRS resources associated with a non-FD set of symbols, wherein the one or more SRS resource sets include a first SRS resource set associated with repetition occasions in the FD set of symbols and a second SRS resource set associated with repetition occasions in the non-FD set of symbols;

receiving, from the UE, a first SRS using the one or more SRS resources associated with the FD set of symbols and a second SRS using the one or more SRS resources associated with the non-FD set of symbols;

transmitting, to the UE, at least one of a radio resource control (RRC) communication or a downlink control information (DCI) communication indicating that: the first SRS resource set is to be associated with an uplink transmission repetition, the first SRS resource set and the second resource set are associated with the uplink transmission repetition, or the second SRS resource set is to be associated with the uplink transmission repetition; and receiving, from the UE and based at least in part on the at least one of the RRC communication or the DCI communication, the uplink transmission repetition in one of: only the FD set of symbols, only the non-FD set of symbols, or both the FD set of symbols and the non-FD set of symbols.

29. The network node of claim 26, wherein the at least one of the RRC communication or the DCI communication indicates that the second SRS resource set is associated with the uplink transmission repetition, and wherein the one or more processors, to transmit the uplink transmission repetition, are operable to cause the UE to transmit the uplink transmission repetition using only the non-FD set of symbols.

30. The network node of claim 26, wherein the at least one of the RRC communication or the DCI communication indicates that the first SRS resource set is associated with the uplink transmission repetition, and wherein the one or more processors, to transmit the uplink transmission repetition, are operable to cause the UE to transmit the uplink transmission repetition using only the FD set of symbols.

* * * * *